（12）United States Patent
Chen et al.

(10) Patent No.: US 12,556,815 B2
(45) Date of Patent: Feb. 17, 2026

(54) SPOT ERROR HANDLING FOR FOCUS TRACKING

(71) Applicant: ILLUMINA, INC., San Diego, CA (US)

(72) Inventors: Yu Chen, Irvine, CA (US); Gregory Holst, San Diego, CA (US); John Earney, San Diego, CA (US); Patrick Wen, Encinitas, CA (US); Chia-Hsi Liu, San Diego, CA (US); Daeyong Sim, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 227 days.

(21) Appl. No.: 18/474,026

(22) Filed: Sep. 25, 2023

(65) Prior Publication Data

US 2024/0114243 A1 Apr. 4, 2024

Related U.S. Application Data

(60) Provisional application No. 63/424,771, filed on Nov. 11, 2022, provisional application No. 63/410,961, filed on Sep. 28, 2022.

(51) Int. Cl.
*H04N 23/67* (2023.01)
*G06V 10/141* (2022.01)
*G06V 10/60* (2022.01)
*G06V 10/74* (2022.01)

(52) U.S. Cl.
CPC ......... *H04N 23/675* (2023.01); *G06V 10/141* (2022.01); *G06V 10/60* (2022.01); *G06V 10/761* (2022.01)

(58) Field of Classification Search
CPC .... H04N 23/675; G06V 10/141; G06V 10/60; G06V 10/761; G02B 7/28; G02B 21/241
See application file for complete search history.

(56) References Cited

U.S. PATENT DOCUMENTS

| | | | |
|---|---|---|---|
| 2011/0188053 A1* | 8/2011 | Buermann | G02B 21/245 356/624 |
| 2017/0023409 A1 | 1/2017 | Sonehara et al. | |
| 2019/0075247 A1 | 3/2019 | Vink et al. | |
| 2022/0334497 A1* | 10/2022 | Pandey | G03F 7/70633 |

OTHER PUBLICATIONS

International Search Report and Written Opinion mailed Feb. 7, 2024 for PCT/US2023/033632.

* cited by examiner

*Primary Examiner* — Yogesh K Aggarwal
(74) *Attorney, Agent, or Firm* — Sheppard, Mullin, Richter & Hampton LLP

(57) ABSTRACT

Some implementations of the disclosure relate to an imaging system including one or more image sensors and a Z-stage. The imaging system is configured to perform operations including: capturing, using the one or more image sensors, a first image of a first pair of spots projected at a first sample location of a sample; determining whether or not the first image of the first pair of spots is valid; and when the first image is determined to be valid: obtaining, based on the first image, a current separation distance measurement of the first pair of spots; and controlling, based at least on the current separation distance measurement, the Z-stage to focus the imaging system at the first sample location.

24 Claims, 53 Drawing Sheets

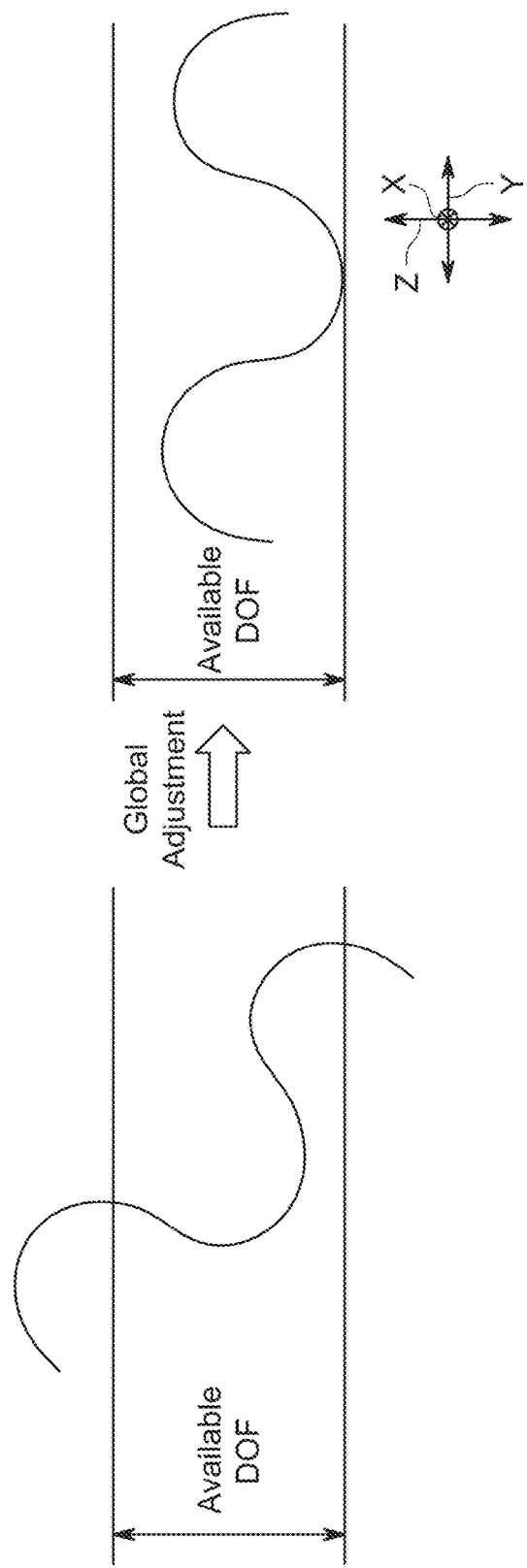
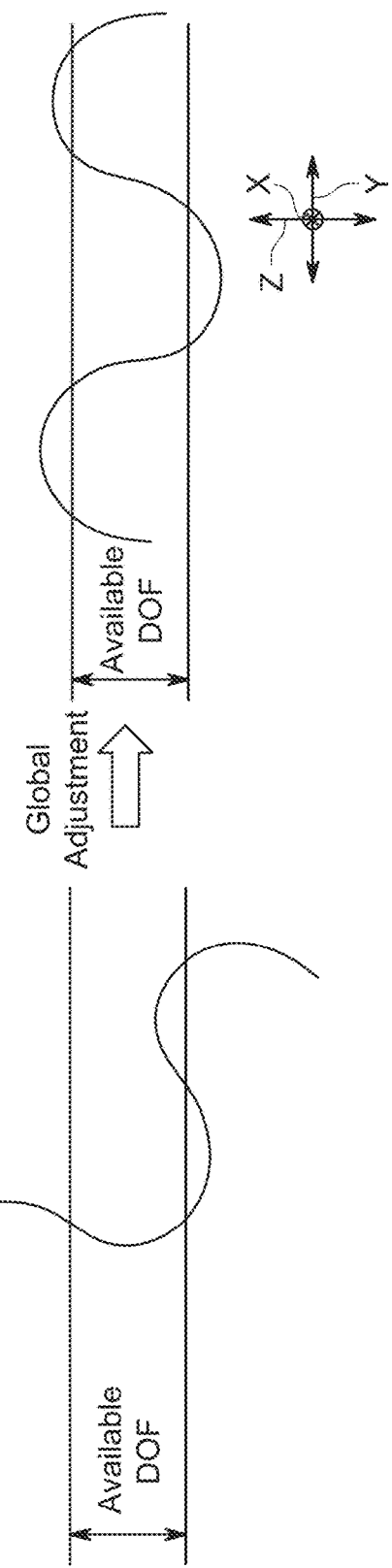

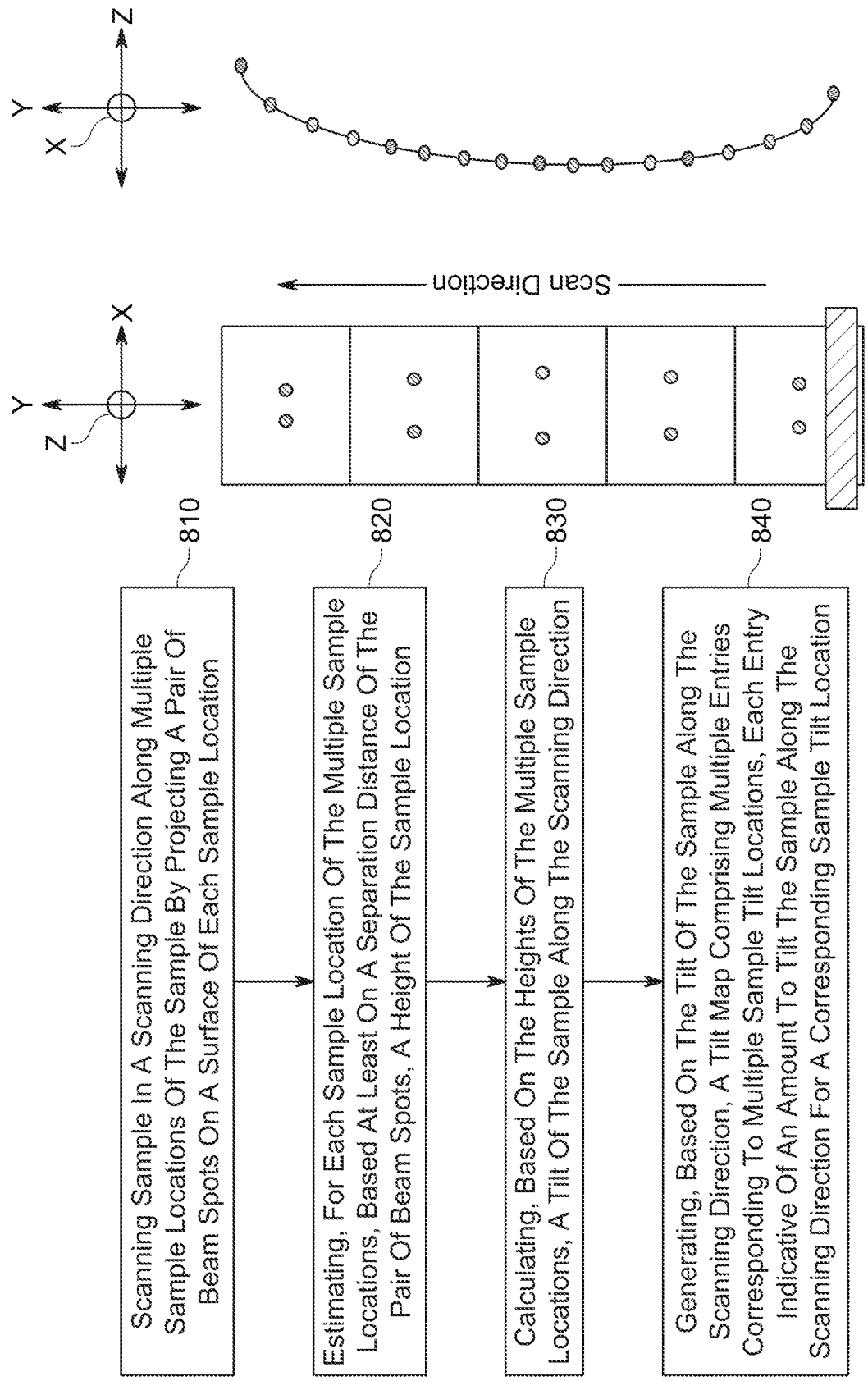

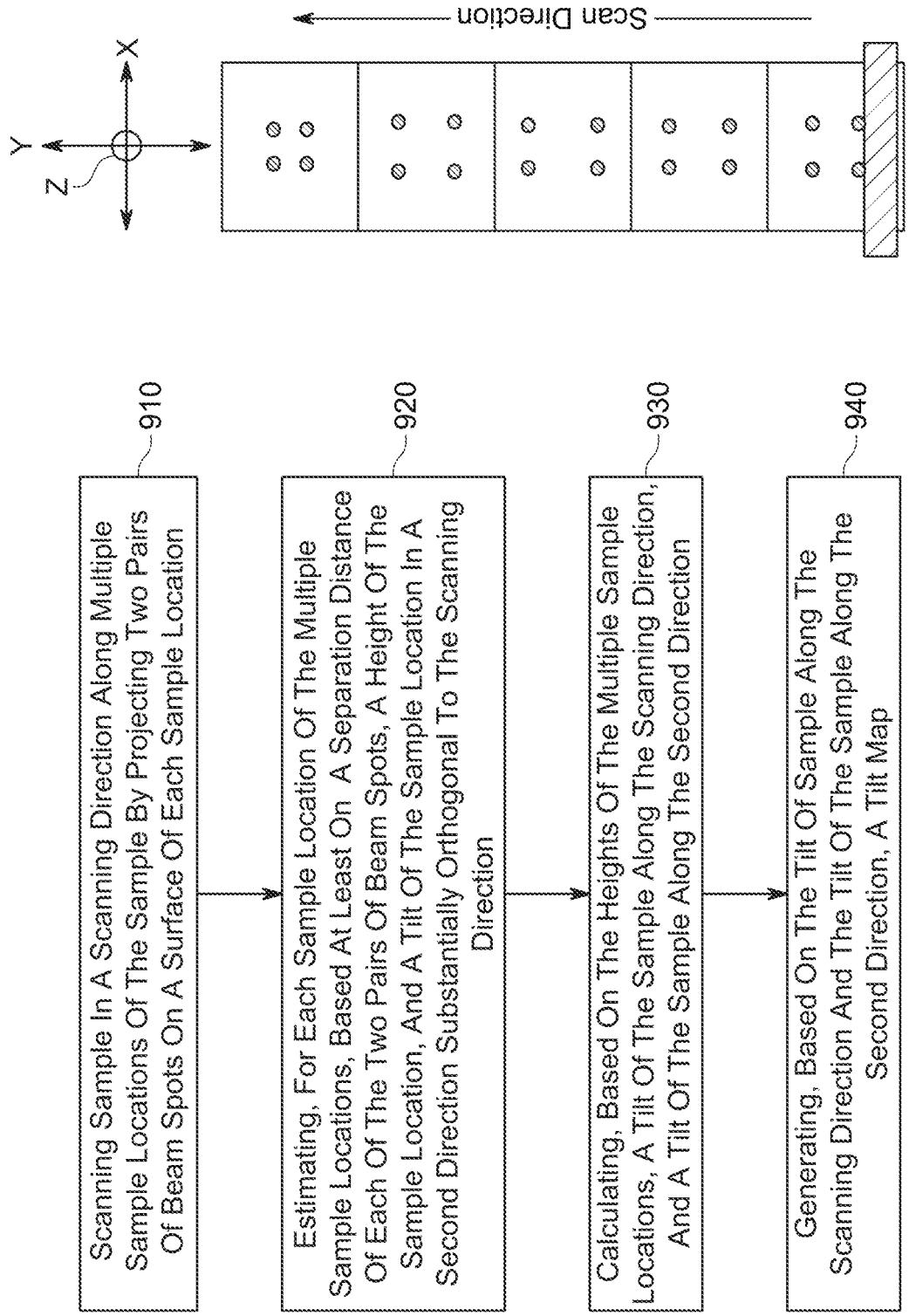

SPOT ERROR HANDLING FOR FOCUS TRACKING

CROSS-REFERENCE TO RELATED APPLICATIONS

The present application claims the benefit of U.S. Provisional Patent Application No. 63/410,961 filed on Sep. 28, 2022 and titled "SPOT ERROR HANDLING FOR FOCUS TRACKING", and U.S. Provisional Patent Application No. 63/424,771 filed on Nov. 11, 2022 and titled "SPOT ERROR HANDLING FOR FOCUS TRACKING". All of the above applications are incorporated herein by reference in their entirety.

BACKGROUND

Increasing the numerical aperture (NA) of optical imaging systems improves optical imaging resolution. In sequencing applications, this reduces sequencing cluster pitches and increases cluster density, enabling lower cost sequencing. However, increasing the NA also reduces the depth of field (DoF)—the distance over which the imaged object (e.g., cluster) remains in focus as an object is translated along an optical axis of the optical imaging system.

As optical imaging systems with higher NAs continue to be used in imaging applications to reduce costs (e.g., to reduce sequencing costs), it becomes more difficult to ensure that an imaged sample will remain in focus as it is translated along an optical axis. For example, as illustrated by FIG. 1A, some current sequencers are able to detilt a sample by establishing a best fit plane for the entire sample such that the entire sample remains within the DoF of the optical imaging system. However, as illustrated by FIG. 1B, with the reduction in the available DoF of the optical imaging system, and even with global adjustment of the sample tilt, local tilt within the sample itself may create DoF excursions large enough to cause at least part of the sequencing image to be out of focus, which causes poor data quality and data loss for the degraded parts of the image.

SUMMARY

Implementations of the disclosure relate to systems and methods for dynamically tilting, based on a sample's local topography, a sample holder in one or more directions to keep the sample in focus during sample imaging. Further implementations of the disclosure describe techniques for handling spot errors during focus tracking, which can enable smoother movement of a Z-stage and/or tilt stage during imaging of a sample.

In one embodiment, an imaging system comprises: a sample holder comprising a surface to support a sample container, the sample container having a plurality of sample locations; an objective; an assembly comprising one or more actuators physically coupled to the sample holder to tilt the sample holder relative to the objective during imaging of the plurality of sample locations to focus the imaging system onto a current sample location; a first light source to project a first pair of spots on the sample container; and a controller to control, based on a sample tilt determined from a first separation measurement of the first pair of spots from an image taken by an image sensor at one or more of the plurality of sample locations, the one or more actuators to tilt the sample holder along a first direction of the imaging or a second direction substantially perpendicular to the first direction.

In some implementations, the first light source is to project the first pair of spots and a second pair of spots on the sample container; and the sample tilt is determined from the first separation measurement and a second separation measurement of the second pair of spots from the image taken by the image sensor at the one or more sample locations.

In some implementations, the sample tilt is determined along at least the second direction substantially perpendicular to the first direction of imaging; and the controller is to control, based on the sample tilt, the one or more actuators to tilt the sample holder along the second direction.

In some implementations, the sample tilt is determined along the first direction and the second direction; and the controller is to control, based on the sample tilt, the one or more actuators to tilt the sample holder along the first direction and the second direction.

In some implementations, the sample tilt along the second direction is determined by the imaging system by: determining, based at least on the first separation measurement, a first sample height; determining, based at least on the second separation measurement, a second sample height; and calculating, based at least on the first sample height and the second sample height, the sample tilt along the second direction.

In some implementations, the one or more actuators comprise a plurality of actuators; and the controller is to control the plurality of actuators to center a tilt axis of the sample holder along the first direction of imaging.

In some implementations, the controller is to control, based on a tilt map determined from multiple separation measurements of the first pair of spots from multiple images taken by the image sensor at multiple sample locations, the one or more actuators to tilt the sample holder along the first direction or the second direction.

In some implementations, the controller is to control, based on a tilt map determined from multiple first separation measurements of the first pair of spots and multiple second separation measurements of the second pair of spots from multiple images taken by the image sensor at multiple sample locations, the one or more actuators to tilt the sample stage along the first direction and the second direction.

In some implementations, the imaging system further comprises a second light source, wherein: the second light source comprises a line scanner to scan the sample during the imaging of the sample container; and the direction of the imaging is a direction that the line scanner scans the sample container.

In some implementations, the one or more actuators comprise multiple linear actuators; the sample holder is a movable platform mounted on the multiple linear actuators; and the multiple linear actuators are to tilt the sample holder along the first direction and the second direction.

In some implementations, each of the linear actuators comprises a carriage driven up and down by a screw of a tilt motor.

In some implementations, the assembly further comprise a stage; the movable platform is mounted on the stage; and the stage is to move the sample holder laterally.

In one embodiment, a method comprises: projecting, using one or more light sources of an imaging system, a first pair of spots and a second pair at a first sample location of the sample; capturing, using an image sensor of the imaging system, an image of the first pair of spots and the second pair of spots at the first sample location; determining, based at least on the image, a first separation distance of the first pair of spots and a second separation distance of the second pair of spots; determining, based at least on the first separation distance, a first sample height; determining, based at least on the second separation distance, a second sample height; and calculating, based at least on the first sample height and the second sample height, a first tilt of the sample at the first sample location along a scanning direction of the imaging system or a direction substantially perpendicular to the scanning direction.

In some implementations, the method further comprises: tilting, based on the first tilt of the sample, using one or more actuators of the imaging system, the sample in the direction substantially perpendicular to the scanning direction of the imaging system.

In some implementations, calculating the first tilt of the sample comprises: calculating, based at least on the first sample height and the second sample height, the first tilt of the sample at the first sample location along the scanning direction of the imaging system and the direction substantially perpendicular to the scanning direction.

In some implementations, the method further comprises: tilting, based on the first tilt of the sample, using one or more actuators of the imaging system, the sample in the scanning direction and the direction substantially perpendicular to the scanning direction.

In some implementations, the method further comprises: generating, based on the first tilt of the sample at the first sample location, and additional tilts of the sample determined at additional sample locations of the sample, a tilt map comprising multiple entries corresponding to multiple sample tilt locations, each entry indicative of an amount to tilt the sample along the scanning direction or a direction substantially perpendicular to the scanning direction for a corresponding sample tilt location.

In some implementations, the method further comprises: tilting, in accordance with the tilt map, using one or more actuators of the imaging system, the sample at each of the multiple sample tilt locations in the direction substantially perpendicular to the scanning direction.

In one embodiment, an imaging system comprises: an image sensor; an assembly comprising one or more actuators to tilt a sample holder during imaging of a plurality of sample locations to focus the imaging system onto a current sample location; a light source to project a first pair of spots and a second pair of spots on a sample container mounted on the sample holder; and a controller to control, based on a sample tilt determined from an image of the first pair of spots and the second pair of spots taken by the image sensor at one or more of the plurality of sample locations, the one or more actuators to tilt the sample holder along a first direction of the imaging or a second direction substantially perpendicular to the first direction.

In some implementations, the imaging system further comprises: a line generation device including: a second light source to emit a first light beam at a first wavelength; a third light source to emit a second light beam at a second wavelength; and one or more line forming optics to shape the first light beam into a first line and the second light beam into a second line.

In one embodiment, a non-transitory computer-readable medium has executable instructions stored thereon that, when executed by a processor, causes an imaging system to perform operations comprising: capturing, using one or more image sensors of the imaging system, a first image of a first pair of spots projected at a first sample location of a sample; determining whether or not the first image of the first pair of spots is valid; and when the first image is determined to be valid: obtaining, based on the first image, a current separation distance measurement of the first pair of spots; and controlling, based at least on the current separation distance measurement, a component of the imaging system to focus the imaging system at the first sample location. For example, a Z-stage of the imaging system can be controlled to focus the imaging system at the first sample location.

In some implementations, determining whether or not the first image of the first pair of spots is valid comprises: determining, based on an intensity distribution of pixels in the first image, whether or not the first image of the first pair of spots is valid.

In some implementations, determining, based on the intensity distribution of the pixels in the first image whether or not the first image of the first pair of spots is valid comprises determining whether: an intensity distribution of each of the first spot and the second spot in the image is Gaussian; there is a first peak intensity in the image corresponding to the first spot and a second peak intensity in the image corresponding to the second spot; a number of intensity peaks in the image matches a valid number; or one or more of the pixels are saturated.

In some implementations, determining whether or not the first image of the first pair of spots is valid comprises determining that the first image is not valid; and in response to determining that the first image is not valid, storing in a memory of the imaging system an identifier indicating a reason the first image is not valid.

In some implementations, the operations further comprise: prior to controlling the Z-stage, determining that the current separation distance measurement of the first pair of spots is within a threshold range determined from a plurality of prior separation distance measurements of the first pair of spots that are associated with other sample locations of the sample.

In some implementations, the threshold range is within a number of standard deviations above or below an average of the plurality of prior separation distance measurements, the number being greater than 0 and less than 4.

In some implementations, the operations further comprise: storing the current separation distance measurement in a circular buffer including the plurality of prior separation distance measurements.

In some implementations, the operations further comprise: when the first image is determined to be invalid, controlling, based at least on one or more prior separation distance measurements of the first pair of spots that are associated with one or more other sample locations of the sample, the Z-stage to focus on the sample at the first sample location.

In some implementations, the one or more prior separation distance measurements are a plurality of prior separation distance measurements stored in a memory of the imaging system; and controlling, based at least on the one or more prior separation distance measurements, the Z-stage to focus on the sample at the first sample location includes: retrieving a most recent one of the plurality of prior separation distance measurements stored in the memory; and controlling, based on the most recent one of the plurality of prior separation distance measurements, the Z-stage to focus on the sample at the first sample location.

In some implementations, the one or more prior separation distance measurements are a plurality of prior separation distance measurements stored in a memory of the imaging system; and controlling, based at least on the one or more prior separation distance measurements, the Z-stage to focus on the sample at the first sample location includes:

controlling, based on a combination of two or more of the prior separation distance measurements, the Z-stage to focus on the sample at the first sample location.

In some implementations, the operations further comprise: capturing, using the one or more image sensors of the imaging system, a second image of a second pair of spots projected at the first sample location substantially parallel to the first pair of spots; determining whether or not the second image of the second pair of spots is valid; and when the second image is determined to be valid, obtaining, based on the second image, a current separation distance measurement of the second pair of spots.

In some implementations, the operations further comprise: when the first image is determined to be invalid and the second image is determined to be valid, controlling, based at least on the current separation distance measurement of the second pair of spots, the Z-stage of the imaging system to focus the imaging system at the first sample location In some implementations, the operations further comprise: when the first image is determined to be invalid and the second image is determined to be valid, controlling, based at least on the current separation distance measurement of the second pair of spots and one or more prior separation distance measurements of the first pair of spots that are associated with one or more other sample locations of the sample, the Z-stage of the imaging system to focus the imaging system at the first sample location.

In some implementations, the operations further comprise: when both the first image and the second image are determined to be valid, controlling, based at least on the current separation distance measurement of the first pair of spots and the current separation distance measurement of the second pair of spots, the Z-stage of the imaging system to focus the imaging system at the first sample location.

In some implementations, controlling, based at least on the current separation distance measurement of the first pair of spots and the current separation distance measurement of the second pair of spots, the Z-stage of the imaging system to focus the imaging system at the first sample location, comprises: determining an average of the current separation distance measurement of the first pair of spots and the current separation distance measurement of the second pair of spots; and controlling, based at least on the average, the Z-stage of the imaging system to focus the imaging system at the first sample location.

In some implementations, the operations further comprise: when both the first image and the second image are determined to be valid, determining a tilt measurement based on a difference between the current separation distance measurement of the first pair of spots and the current separation distance measurement of the second pair of spots.

In some implementations, the operations further comprise: determining whether the current sample tilt measurement is within a threshold range determined from prior sample tilt measurements.

In one embodiment, a system comprises: one or more light sources to project a first pair of spots at a first sample location of a sample; one or more image sensors to capture a first image of the first pair of spots projected at the first sample location; and one or more processors to perform operations comprising: determining whether or not the first image of the first pair of spots is valid; and when the first image is determined to be valid: obtaining, based on the first image, a current separation distance measurement of the first pair of spots; and controlling, based at least on the current separation distance measurement, a Z-stage to focus at the first sample location. In some implementations, other components besides the Z-stage or in addition to the Z-stage can be controlled to focus at the first sample location.

In some implementations, determining whether or not the first image of the first pair of spots is valid comprises: determining, based on an intensity distribution of pixels in the first image, whether or not the first image of the first pair of spots is valid.

In some implementations, the system further comprises a memory to store one or more prior separation distance measurements that are associated with one or more other sample locations of the sample, and the operations further comprise: when the first image is determined to be invalid, controlling, based at least on the one or more prior separation distance measurements, the Z-stage to focus on the sample at the first sample location.

In some implementations, the one or more light sources are to project a second pair of spots at the first sample location substantially parallel to the first pair of spots; and the one or more image sensors are to capture a second image of the second pair of spots projected at the first sample location.

In some implementations, the one or more light sources include a first light source to project the first pair of spots at the first sample location, and a second light source to project the second pair of spots at the first sample location; and the one or more image sensors include a first image sensor to capture the first image and a second image sensor to capture the second image.

In some implementations, the first image sensor and the second image sensor are substantially parallel linear sensors.

In some implementations, the operations further comprise: determining whether or not the second image of the second pair of spots is valid; and when the second image is determined to be valid, obtaining, based on the second image, a current separation distance measurement of the second pair of spots.

In some implementations, the operations further comprise: when the first image is determined to be invalid and the second image is determined to be valid, controlling, based at least on the current separation distance measurement of the second pair of spots, the Z-stage to focus at the first sample location.

In some implementations, the system further comprises a tilt assembly including one or more actuators to tilt a sample holder of the sample during imaging of the sample; and the operations further comprise: when both the first image and the second image are determined to be valid, determining a tilt measurement based on a difference between the current separation distance measurement of the first pair of spots and the current separation distance measurement of the second pair of spots; and controlling, based at least on the tilt measurement, the tilt assembly to tilt the sample holder to focus at the first sample location.

In some implementations, the system further comprises the Z-stage, and the Z-stage includes an objective.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

BRIEF DESCRIPTION OF THE DRAWINGS

The present disclosure, in accordance with one or more implementations, is described in detail with reference to the following figures. The figures are provided for purposes of illustration only and merely depict example implementations. Furthermore, it should be noted that for clarity and ease of illustration, the elements in the figures have not necessarily been drawn to scale.

Some of the figures included herein illustrate various implementations of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

FIG. 1A illustrates detilting of a sample by establishing a best fit plane for the entire sample.

FIG. 1B illustrates local tilt within a sample creating depth of field excursions that cause part of the sample image to be out of focus.

FIG. 23A is an operational flow diagram illustrating an example method of determining a tilt map along a scanning direction, in accordance with some implementations of the disclosure.

FIG. 23B depicts a focus tracking module projecting a pair of spot beams on a surface of the sample over different sample locations in the scanning direction during the process of FIG. 23A.

FIG. 23C illustrates a smooth tilt trajectory generated by interpolating between five entries corresponding to spot beam measurements, in accordance with some implementations of the disclosure.

FIG. 24A is an operational flow diagram illustrating an example method of determining a tilt map along a scanning direction and a direction orthogonal to the scanning direction, in accordance with some implementations of the disclosure.

FIG. 24B depicts a focus tracking module projecting two pairs of spot beams on a surface of the sample over different sample locations in the scanning direction during the process of FIG. 24A.

FIG. 33C depicts plots showing focus tracking performance, including a summary of defocus errors, when performing focus tracking on the flow cell of FIG. 33A with spot error handling on.

FIG. 34B depicts plots showing focus tracking performance, including a summary of defocus errors, when performing focus tracking on the flow cell of FIG. 34A with spot error handling off and a simulation of performing focus tracking on the flow cell of FIG. 34A with spot error handling on.

FIG. 35B depicts plots showing focus tracking performance, including a summary of defocus errors, when performing focus tracking on the flow cell of FIG. 35A with spot error handling off and a simulation of performing focus tracking on the flow cell of FIG. 35A with spot error handling on.

FIG. 36C depicts plots showing focus tracking performance, including a summary of defocus errors, when performing focus tracking on the flow cell of FIG. 36A with spot error handling on.

FIG. 37C depicts plots showing focus tracking performance, including a summary of defocus errors, when performing focus tracking on the flow cell of FIG. 37A with spot error handling on.

Figure 2:
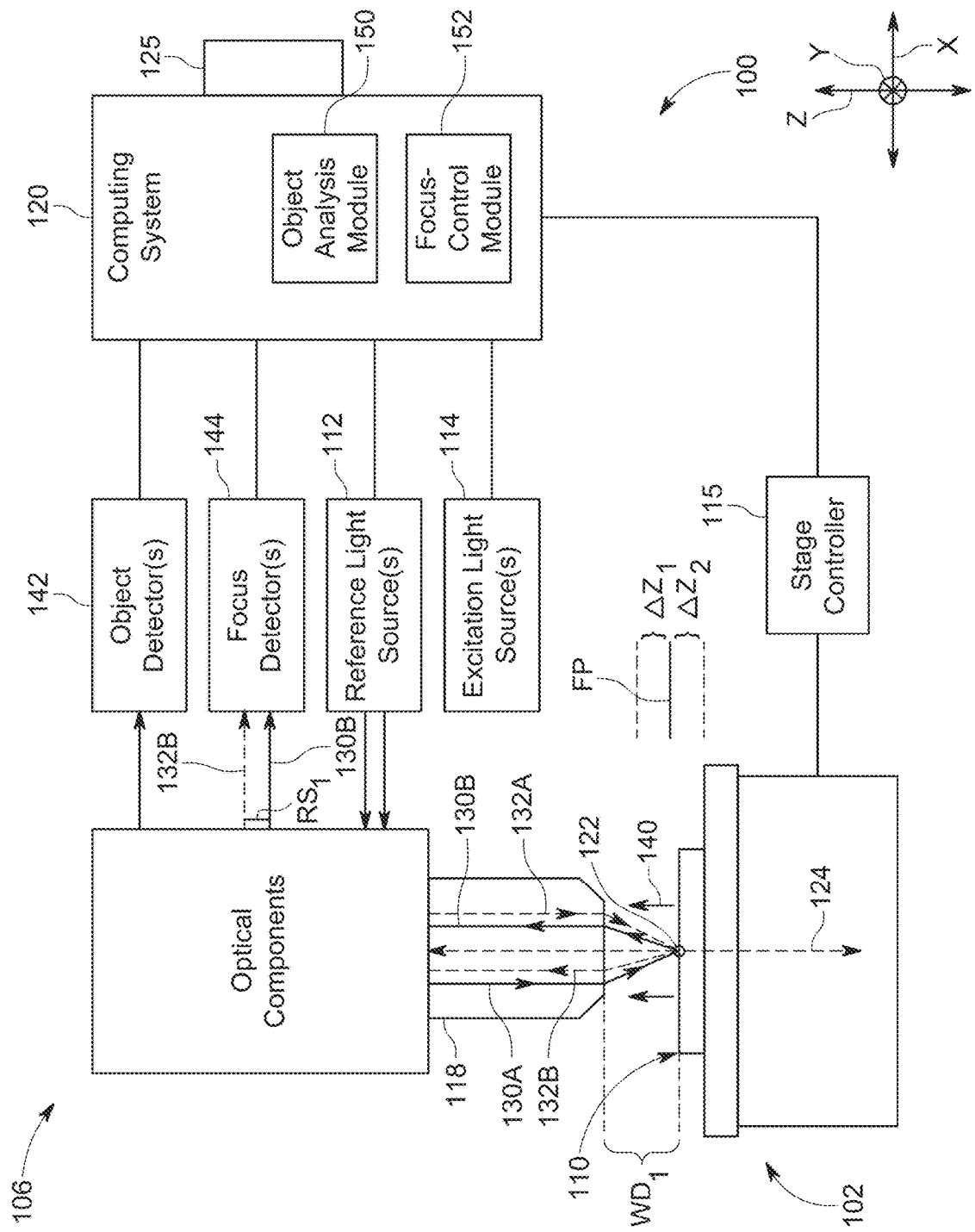
FIG. 2 illustrates a block diagram of an optical imaging system, in accordance with some implementations of the disclosure.

The figures are not exhaustive and do not limit the present disclosure to the precise form disclosed.

DETAILED DESCRIPTION

As used herein to refer to a sample, the term "feature" is intended to mean a point or area in a pattern that can be distinguished from other points or areas according to relative location. An individual feature can include one or more molecules of a particular type. For example, a feature can include a single target nucleic acid molecule having a particular sequence or a feature can include several nucleic acid molecules having the same sequence (and/or complementary sequence, thereof).

As used herein, the term "swath" is intended to mean a rectangular portion of an object. The swath can be an elongated strip that is scanned by relative movement between the object and a detector in a direction that is parallel to the longest dimension of the strip. Generally, the width of the rectangular portion or strip will be constant along its full length. Multiple swaths of an object can be parallel to each other. Multiple swaths of an object can be adjacent to each other, overlapping with each other, abutting each other, or separated from each other by an interstitial area.

As used herein, the term "tile" generally refers to one or more images of the same region of a sample, where each of the one or more images may represent a respective color channel. A tile may form an imaging data subset of an imaging data set of one imaging cycle.

As used herein, the term "xy coordinates" is intended to mean information that specifies location, size, shape, and/or orientation in an xy plane. The information can be, for example, numerical coordinates in a Cartesian system. The coordinates can be provided relative to one or both of the x and y axes or can be provided relative to another location in the xy plane. For example, coordinates of a feature of an object can specify the location of the feature relative to location of a fiducial or other feature of the object.

As used herein, the term "xy plane" is intended to mean a 2 dimensional area defined by straight line axes x and y. When used in reference to a detector and an object observed by the detector, the area can be further specified as being orthogonal to the direction of observation between the detector and object being detected. When used herein to refer to a line scanner, the term "y direction" refers to the direction of scanning.

As used herein, the term "z coordinate" is intended to mean information that specifies the location of a point, line or area along an axis that is orthogonal to an xy plane. In particular implementations, the z axis is orthogonal to an area of an object that is observed by a detector. For example, the direction of focus for an optical imaging system may be specified along the z axis.

As used herein, the term "scanning" is intended to mean detecting a 2-dimensional cross-section in an xy plane of an object, the cross-section being rectangular or oblong. For example, in the case of fluorescence imaging an area of an object having rectangular or oblong shape can be specifically excited (at the exclusion of other areas) and/or emission from the area can be specifically acquired (at the exclusion of other areas) at a given time point in the scan.

As alluded to above, there is an increasing need to enable dynamic tilting of a sample in optical imaging systems that utilize a higher NA to resolve finer optical features at the expense of DoF. In such systems, even a small amount of twisting of the sample that defocuses a part of the sample within the field of view may result in a significant error. A small amount of tilt in the direction of scanning, or in a direction perpendicular to the direction of scanning, can blur or defocus regions of interest that are being scanned. As such, there is a need for dynamic, multi-axis tilting of a sample.

Various implementations of the disclosure relate to systems and methods for dynamically adjusting, based on a sample's local topography, one or more components of an imaging system to keep the sample in focus during sample scanning. One set of implementations describes a sample stage assembly including a tip tilt assembly to enable multi-axis tilting of a sample holder during scanning. Another set of implementations describes techniques for leveraging a focus tracking system to determine local sample tilt along the scanning direction and/or in a direction orthogonal to the scanning direction. A further set of implementations describes techniques for generating a tilt map utilized by a controller to direct operation of an assembly that dynamically tilts a sample holder during sample scanning. A further set of implementations describes techniques for handling spot errors during focus tracking, which can enable smoother movement of a Z-stage and/or tilt stage during imaging of a sample.

FIG. 2 illustrates a block diagram of an optical imaging system 100 in accordance with some implementations of the disclosure. The optical imaging system 100 images a sample of interest (object 110) for analysis. For example, in implementations where the optical imaging system 100 functions as a sequencer, the imaged sample may be sequenced. In some implementations, the optical imaging system 100 may function as a profilometer that determines a surface profile (e.g., topography) of an imaged object. Furthermore, various other types of optical imaging systems may use the mechanisms and systems described herein. In the illustrated embodiment, the optical imaging system 100 includes an optical assembly 106, an object holder 102 for supporting an object 110 near a focal plane FP of the optical assembly 106, and a stage controller 115 that is configured to move the object holder 102 in a lateral direction (along an X-axis and/or a Y-axis that extends into the page), in a vertical/elevational direction along a Z-axis, and/or in an angular direction along the X-axis (tip), Y-axis (tilt), and/or Z-axis (twist). The optical imaging system 100 may also include a system controller or computing system 120 that is operatively coupled to the optical assembly 106, the stage controller 115, and/or the object holder 102.

In some implementations, the object 110 is a sample container including a biological sample that is imaged using one or more fluorescent dyes. For example, in a particular implementation the sample container may be implemented as a patterned flow cell including a translucent cover plate, a substrate, and a liquid sandwiched therebetween, and a biological sample may be located at an inside surface of the translucent cover plate or an inside surface of the substrate. The flow cell may include a large number (e.g., thousands, millions, or billions) of wells or regions that are patterned into a defined array (e.g., a hexagonal array, rectangular array, etc.) into the substrate. Each region may form a cluster (e.g., a monoclonal cluster) of a biological sample such as DNA, RNA, or another genomic material which may be sequenced, for example, using sequencing by synthesis. The flow cell may be divided into a number of physically separated lanes (e.g., eight lanes), each lane including an array of clusters. During each cycle of sequencing, each surface (e.g., upper and lower) of each lane may be imaged in separate swaths (e.g., three), and any number of images or tiles may be collected for each swath.

Although not shown, optical imaging system 100 may include one or more sub-systems or devices for performing various assay protocols. For example, where the sample includes a flow cell having flow channels, the optical imaging system 100 may include a fluid control system that includes liquid reservoirs that are fluidicly coupled to the flow channels through a fluidic network. The fluid control system may direct the flow of reagents (e.g., fluorescently labeled nucleotides, buffers, enzymes, cleavage reagents, etc.) to (and through) a sample container and waste valve. Another sub-system that may be included is a temperature control system that may have a heater/cooler configured to regulate a temperature of the sample and/or the fluid that flows through the sample. The temperature control system may include sensors that detect a temperature of the fluids.

As shown, the optical assembly 106 is configured to direct input light to an object 110 and receive and direct output light to one or more detectors. The output light may be input light that was at least one of reflected and refracted by the object 110 and/or the output light may be light emitted from the object 110. To direct the input light, the optical assembly 106 may include at least one reference light source 112 and at least one excitation light source 114 that direct light, such as light beams having predetermined wavelengths, through one or more optical components of the optical assembly 106. The optical assembly 106 may include various optical components, including a conjugate lens 118, for directing the input light toward the object 110 and directing the output light toward the detector(s).

The reference light source 112 may be used by a distance measuring system and/or a focus-control system (or focusing mechanism) of the optical imaging system 100, and the excitation light source 114 may be used to excite the biological or chemical substances of the object 110 when the object 110 includes a biological or chemical sample. The excitation light source 114 may be arranged to illuminate a bottom surface of the object 110, such as in TIRF imaging, or may be arranged to illuminate a top surface of the object 110, such as in epi-fluorescent imaging. As shown in FIG. 2, the conjugate lens 118 directs the input light to a focal region 122 lying within the focal plane FP. The lens 118 has an optical axis 124 and is positioned a working distance WD1 away from the object 110 measured along the optical axis 124. The stage controller 115 may move the object 110 in the Z-direction to adjust the working distance WD1 so that, for example, a portion of the object 110 is within the focal region 122. Additionally, the stage controller 115 may actively orient an area of interest of object 100 within the FP by rotating the object holder 102 about the X-axis, the Y-axis, and/or the Z-axis.

To determine whether the object 110 is in focus (i.e., sufficiently within the focal region 122 or the focal plane FP), the optical assembly 106 is configured to direct at least one pair of light beams to the focal region 122 where the object 110 is approximately located. The object 110 reflects the light beams. More specifically, an exterior surface of the object 110 or an interface within the object 110 reflects the light beams. The reflected light beams then return to and propagate through the lens 118. As shown, each light beam has an optical path that includes a portion that has not yet been reflected by the object 110 and a portion that has been reflected by the object 110. The portions of the optical paths prior to reflection are designated as incident light beams 130A and 132A and are indicated with arrows pointing toward the object 110. The portions of the optical paths that have been reflected by the object 110 are designated as reflected light beams 130B and 132B and are indicated with arrows pointing away from the object 110. For illustrative purposes, the light beams 130A, 130B, 132A, and 132B are shown as having different optical paths within the lens 118 and near the object 110. However, in this embodiment, the light beams 130A and 132B propagate in opposite directions and are configured to have the same or substantially overlapping optical paths within the lens 118 and near the object 110, and the light beams 130B and 132A propagate in opposite directions and are configured to have the same or substantially overlapping optical paths within the lens 118 and near the object 110.

In the embodiment shown in FIG. 2, light beams 130A, 130B, 132A, and 132B pass through the same lens that is used for imaging. In an alternative embodiment, the light beams used for distance measurement or focus determination can pass through a different lens that is not used for imaging. In this alternative embodiment, the lens 118 is dedicated to passing beams 130A, 130B, 132A, and 132B for distance measurement or focus determination, and a separate lens (not shown) is used for imaging the object 110. Similarly, it will be understood that the systems and methods described herein for focus determination and distance measurement can occur using a common objective lens that is shared with the imaging optics or, alternatively, the objective lenses exemplified herein can be dedicated to focus determination or distance measurement.

The reflected light beams 130B and 132B propagate through the lens 118 and may, optionally, be further directed by other optical components of the optical assembly 106. As shown, the reflected light beams 130B and 132B are detected by at least one focus detector 144. In the illustrated embodiment, both reflected light beams 130B and 132B are detected by a single focus detector 144. The reflected light beams may be used to determine relative separation RS1. For example, the relative separation RS1 may be determined by the distance separating the beam spots from the impinging reflected light beams 130B and 132B on the focus detector 144 (i.e., a separation distance). The relative separation RS1 may be used to determine a degree-of-focus of the optical imaging system 100 with respect to the object 110. However, in alternative embodiments, each reflected light beam 130B and 132B may be detected by a separate corresponding focus detector 144 and the relative separation RS1 may be determined based upon a location of the beam spots on the corresponding focus detectors 144.

If the object 110 is not within a sufficient degree-of-focus, the computing system 120 may operate the stage controller 115 to move the object holder 102 to a desired position. Alternatively or in addition to moving the object holder 102, the optical assembly 106 may be moved in the Z-direction and/or along the XY plane. For example, the object 110 may be relatively moved a distance $\Delta Z1$ toward the focal plane FP if the object 110 is located above the focal plane FP (or focal region 122), or the object 110 may be relatively moved a distance $\Delta Z2$ toward the focal plane FP if the object 110 is located below the focal plane FP (or focal region 122). In some embodiments, the optical imaging system 100 may substitute the lens 118 with another lens 118 or other optical components to move the focal region 122 of the optical assembly 106.

The example set forth above and in FIG. 2 has been presented with respect to a system for controlling focus or for determining degree-of-focus. The system is also useful for determining (e.g., based on the relative separation of the reflected light beams), the working distance WD1 between the object 110 and the lens 118. In such embodiments, the focus detector 144 can function as a working distance detector and the distance separating the beam spots on the working distance detector can be used to determine the working distance between the object 110 and the lens 118.

In addition, as further described below, the system may be useful for determining a surface profile of the object 110 along one or more dimensions of the object. For example, by determining the variation in the relative separation of the reflected light beams along different locations of the object, variations in the working distance between the object 110 and the lens 118 along an imaging direction may be determined, and this may be mapped to the object height (i.e., in the z direction) along an imaging direction. In particular implementations, further described below, the optical assembly 106 is configured to direct multiple pairs (e.g., at least two pairs) of light beams along different locations of the object surface that are scanned. Based on the relative separation of each of the pairs of light beams, and a distance between different pairs of light beams, a surface profile of the object may be determined in one or more dimensions. Given knowledge of the surface profile of the object, the optical imaging system 100, via stage controller 115, may actively orient an area of interest of object 100 within the FP by rotating the object holder 102 about the X-axis, the Y-axis, and/or the Z-axis.

As such, the systems and methods described herein may be used for controlling focus or determining degree-of-focus, determining the working distance between an object and a lens, determining a surface profile of an object, and/or linearly or rotationally orienting a holder holding an imaged object to keep the object in focus.

In one embodiment, during operation, the excitation light source 114 directs input light (not shown) onto the object 110 to excite fluorescently-labeled biological or chemical substances. The labels of the biological or chemical substances provide light signals 140 (also called light emissions) having predetermined wavelength(s). The light signals 140 are received by the lens 118 and then directed by other optical components of the optical assembly 106 to at least one object detector 142. Although the illustrated embodiment only shows one object detector 142, the object detector 142 may comprise multiple detectors. For example, the object detector 142 may include a first detector configured to detect one or more wavelengths of light and a second detector configured to detect one or more different wavelengths of light. The optical assembly 106 may include a lens/filter assembly that directs different light signals along different optical paths toward the corresponding object detectors.

The object detector 142 communicates object data relating to the detected light signals 140 to the computing system 120. The computing system 120 may then record, process, analyze, and/or communicate the data to other users or computing systems, including remote computing systems through a communication line (e.g., Internet). By way of example, the object data may include imaging data that is processed to generate an image(s) of the object 110. The images may then be analyzed by the computing system and/or a user of the optical imaging system 100. In other embodiments, the object data may not only include light emissions from the biological or chemical substances, but may also include light that is at least one of reflected and refracted by the optical substrate or other components. For example, the light signals 140 may include light that has been reflected by encoded microparticles, such as holographically encoded optical identification elements.

In some embodiments, a single detector may provide both functions as described above with respect to the object and focus detectors 142 and 144. For example, a single detector may detect reflected light beam pairs (e.g., the reflected light beams 130B and 132B) and also light signals (e.g., the light signals 140).

The optical imaging system 100 may include a user interface 125 that interacts with the user through the computing system 120. For example, the user interface 125 may include a display (not shown) that shows and requests information from a user and a user input device (not shown) to receive user inputs.

The computing system 120 may include, among other things, an object analysis module 150 and a focus-control module 152. The focus-control module 152 is configured to receive focus data obtained by the focus detector 144. The focus data may include signals representative of the beam spots incident upon the focus detector 144. The data may be processed to determine relative separation (e.g., separation distance between the beam spots). A degree-of-focus of the optical imaging system 100 with respect to the object 110 may then be determined based upon the relative separation. In particular embodiments, the working distance WD1 between the object 110 and lens 118 can be determined. Likewise, the object analysis module 150 may receive object data obtained by the object detectors 142. The object analysis module may process or analyze the object data to generate images of the object.

Furthermore, the computing system 120 may include any processor-based or microprocessor-based system, including systems using microcontrollers, reduced instruction set computers (RISC), application specific integrated circuits (ASICs), field programmable gate array (FPGAs), logic circuits, and any other circuit or processor capable of executing functions described herein. The above examples are exemplary only, and are thus not intended to limit in any way the definition and/or meaning of the term system controller. In one embodiment, the computing system 120 executes a set of instructions that are stored in one or more storage elements, memories, or modules in order to at least one of obtain and analyze object data. Storage elements may be in the form of information sources or physical memory elements within the optical imaging system 100.

The set of instructions may include various commands that instruct the optical imaging system 100 to perform specific protocols. For example, the set of instructions may include various commands for performing assays and imaging the object 110, for linearly or rotationally moving the object holder 102, or for determining a surface profile of the object 110. The set of instructions may be in the form of a software program.

As described above, the excitation light source 114 generates an excitation light that is directed onto the object 110. The excitation light source 114 may generate one or more laser beams at one or more predetermined excitation wavelengths. The light may be moved in a raster pattern across portions of the object 110, such as groups in columns and rows of the object 110. Alternatively, the excitation light may illuminate one or more entire regions of the object 110 at one time and serially stop through the regions in a "step and shoot" scanning pattern.

In some implementations, excitation light source 114 utilizes line scanning to image a sample. For example, the excitation light source 114 may be implemented as part of a line generation module including one or more light sources operating at one or more wavelengths, and a beam shaping optics aligned at a predetermined angle to each light source. The beam shaping optics may be used to provides uniform line illumination at a desired aspect ratio. In a particular implementation, the line generation module is implemented as part of a two-channel imaging system including a first light source operating at a first wavelength, and a second light source operating at a second wavelength. For example, the first wavelength may be a "green" wavelength (e.g., from about 520 to 565 nm), and the second wavelength may be a "red" wavelength (e.g., from about 625 to 740 nm). Such a line scanning system may be utilized in conjunction with a TDI sensor.

The object 110 produces the light signals 140, which may include light emissions generated in response to illumination of a label in the object 110 and/or light that has been reflected or refracted by an optical substrate of the object 110. Alternatively, the light signals 140 may be generated, without illumination, based entirely on emission properties of a material within the object 110 (e.g., a radioactive or chemiluminescent component in the object).

The object and focus detectors 142 and 144 may be, for example photodiodes or cameras. In some embodiments herein, the detectors 142 and 144 may comprise a charge-coupled device (CCD) camera (e.g., a time delay integration (TDI) CCD camera), which can interact with various filters. The camera is not limited to a CCD camera and other cameras and image sensor technologies can be used. In particular embodiments, the camera sensor may have a pixel size between about 1 and about 15 µm.

Figure 3:
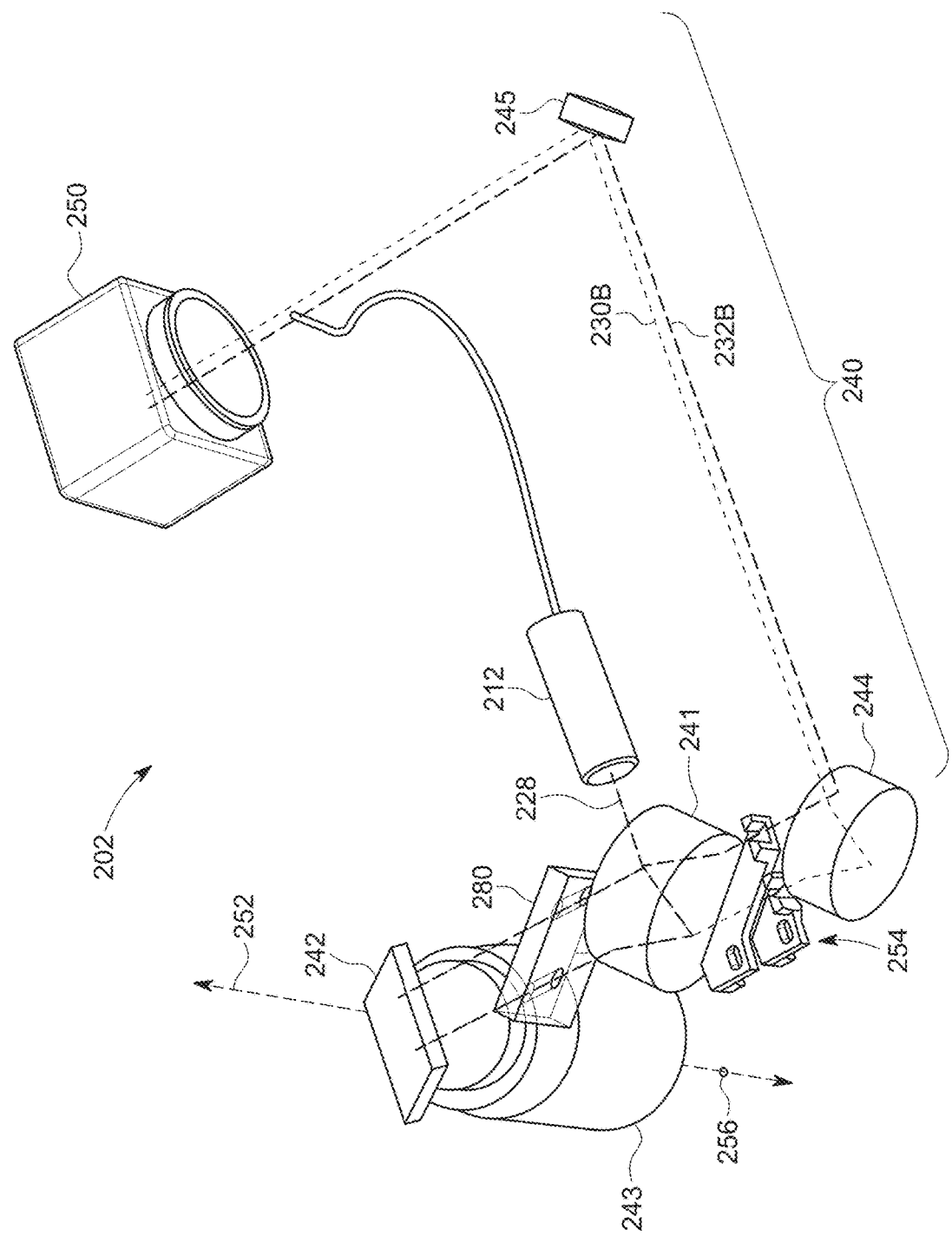
FIG. 3 is a perspective view of an optical assembly that may be used with the optical system shown in FIG. 2, in accordance with some implementations of the disclosure.
Figure 4:
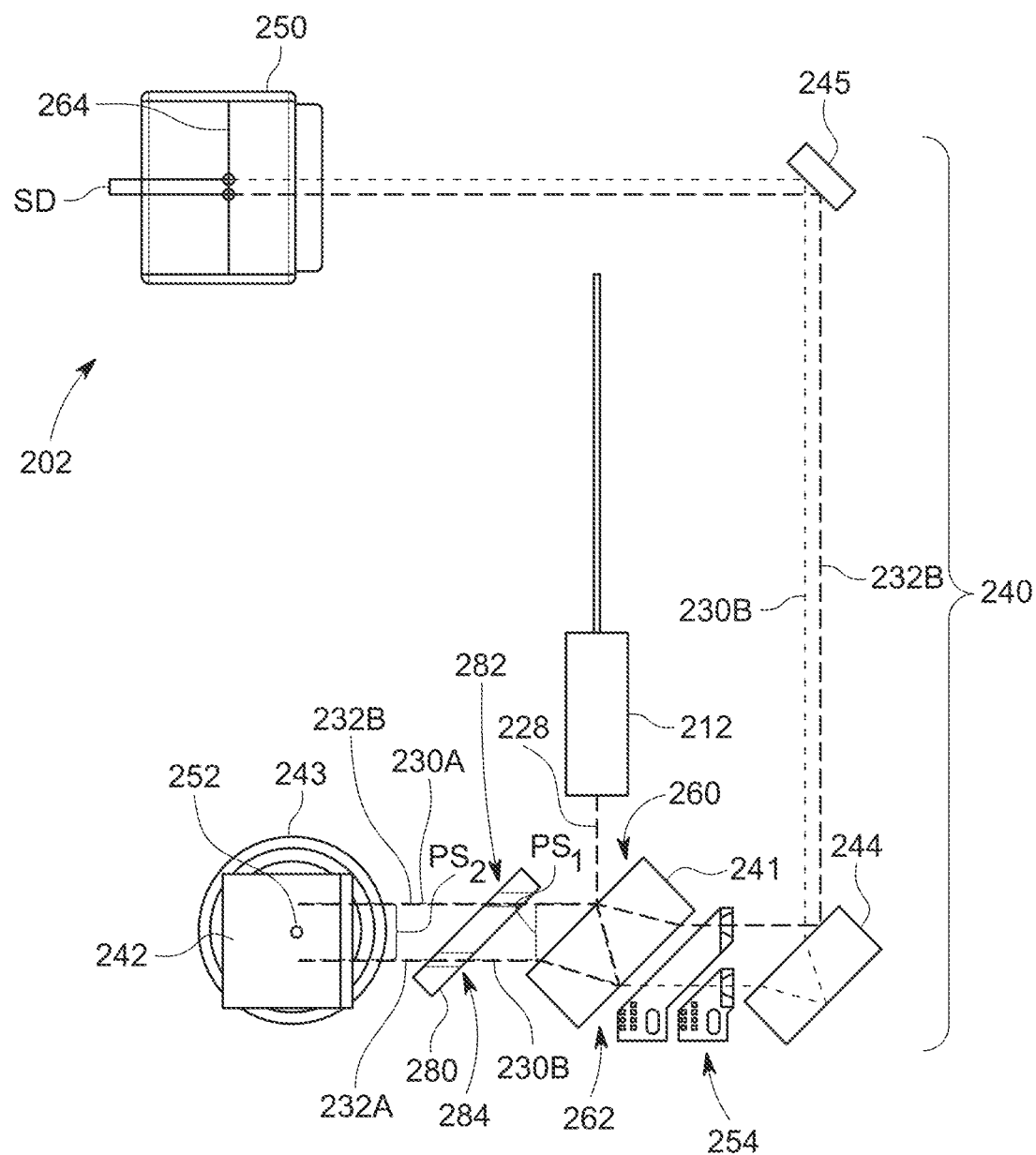
FIG. 4 is a plan view of the optical assembly shown in FIG. 3.

FIGS. 3 and 4 illustrate perspective and plan views of an optical assembly 202 formed in accordance with one embodiment. The optical assembly 202 may be used with optical imaging system 100 (FIG. 2) or other optical imaging systems. As shown, the optical assembly 202 includes an optical train 240 of optical components 241-245 that direct light beams 230 and 232 along an optical track or course between an object of interest (not shown) and a focus detector 250. In some embodiments, the focus detector can also be referred to as a distance detector. The series of optical components 241-245 of the optical train 240 include a dual-beam generator 241, a beam splitter 242, a conjugate lens 243, a beam combiner 244, and a fold mirror 245.

The optical assembly 202 includes a reference light source 212 that provides a light beam 228 to the dual-beam generator 241. The reference light source 212 may emit light having a wavelength between about 620 nm and 700 nm. For example, the reference light source may be a 660 nm laser. The dual-beam generator 241 provides a pair of parallel incident light beams 230A and 232A and directs the incident light beams 230A and 232A toward the beam splitter 242. In the illustrated embodiment, the dual-beam generator 241 comprises a single body having opposite parallel surfaces 260 and 262 (FIG. 4). The first surface 260 reflects a portion of the light beam 228 that forms the incident light beam 230A and refracts a portion of the light beam 228. The refracted portion of the light beam 228 is reflected by the opposite second surface 262 toward the first surface 260, which forms the incident light beam 232A.

The dual-beam generator 241 directs the parallel incident light beams 230A and 232A toward the beam splitter 242. The beam splitter 242 reflects the incident light beams 230A and 232A toward the conjugate lens 243. In this example, the beam splitter 242 includes a pair of reflectors (e.g., aluminized tabs) that are positioned to reflect the incident light beams 230A and 232A and the reflected light beams 230B and 232B. The beam splitter 242 is positioned to reflect the incident light beams 230A and 232A so that the incident light beams 230A and 232A propagate parallel to an optical axis 252 of the lens 243. The optical axis 252 extends through a center of the lens 243 and intersects a focal region 256. The lens 243 may be a near-infinity conjugated objective lens. Alternatively, the incident light beams 230A and 232A may propagate in a non-parallel manner with respect to the optical axis 252. Also shown in FIG. 4, the incident light beams 230A and 232A may be equally spaced apart from the optical axis 252 as the incident light beams 230A and 232A propagate through the lens 243.

As described above with respect to the optical imaging system 100, the incident light beams 230A and 232A may converge toward the focal region 256 and are reflected by an object 268 (shown in FIG. 5) located proximate to the focal region 256 and return to and propagate through the lens 243 as reflected light beams 230B and 232B. The reflected light beams 230B and 232B may propagate along a substantially equal or overlapping optical path with respect to the incident light beams 232A and 230A, respectively, through the lens 243 and toward the dual-beam generator 241. More specifically, the reflected light beam 230B propagates in an opposite direction along substantially the same optical path of the incident light beam 232A, and the reflected light beam 232B propagates in an opposite direction along substantially the same optical path of the incident light beam 230A. The reflected light beams 230B and 232B exit the lens 243 separated by a path spacing PS2 that is substantially equal to a path spacing PS1 that separates the incident light beams 230A and 232A (shown in FIG. 4).

As shown in FIGS. 3 and 4, the reflected light beams 230B and 232B are incident upon and directed by the dual-beam generator 241 through a range limiter 254 toward the beam combiner 244. In the illustrated embodiment, the beam combiner 244 is configured to modify the path spacing PS that separates the reflected light beams 230B and 232B. The path spacing PS at the beam combiner 244 may be re-scaled to be substantially equal to a separation distance SD1 of the reflected light beams 230B and 232B detected by the focus detector 250. The separation distance SD1 is a distance measured between the reflected light beams at a predetermined portion of the optical track, such as at the focus detector 250. In some embodiments, the separation distance SD1 at the focus detector 250 is less than the path spacing PS at the beam combiner 244 so that only a single focus detector 250 may detect both reflected light beams 230B and 232B. Furthermore, the beam combiner 244 may substantially equalize the optical path lengths of the reflected light beams 230B and 232B.

The reflected light beams 230B and 232B propagate substantially parallel to each other between optical components after exiting the lens 243. In the illustrated embodiment, the reflected light beams 230B and 232B propagate substantially parallel to each other along the optical track between the lens 243 and the focus detector 250. As used herein, two light beams propagate "substantially parallel" to one another if the two light beams are essentially co-planar and, if allowed to propagate infinitely, would not intersect each other or converge/diverge with respect to each other at a slow rate. For instance, two light beams are substantially parallel if an angle of intersection is less than 20° or, more particularly, less than 10° or even more particularly less than 1°. For instance, the reflected light beams 230B and 232B may propagate substantially parallel to each other between the beam splitter 242 and the dual-beam generator 241; between the dual-beam generator 241 and the beam combiner 244; between the beam combiner 244 and the fold mirror 245; and between the fold mirror 245 and the focus detector 250.

The optical train 240 may be configured to maintain a projection relationship between the reflected light beams 230B and 232B throughout the optical track so that a degree-of-focus may be determined. By way of example, if the optical assembly 202 is in focus with the object, the reflected light beams 230B and 232B will propagate parallel to each other between each optical component in the optical train 240. If the optical assembly 202 is not in focus with the object, the reflected light beams 230B and 232B are co-planar, but propagate at slight angles with respect to each other. For example, the reflected light beams 230B and 232B may diverge from each other or converge toward each other as the reflected light beams 230B and 232B travel along the optical track to the focus detector 250.

To this end, each optical component 241-245 may have one or more surfaces that are shaped and oriented to at least one of reflect and refract the reflected light beams 230B and 232B so that the reflected light beams 230B and 232B maintain the projection relationship between the reflected light beams 230B and 232B. For example, the optical components 242 and 245 have a planar surface that reflects both of the incident light beams 230B and 232B. The optical components 241 and 244 may also have parallel surfaces that each reflects one of the incident light beams 230B and 232B. Accordingly, if the reflected light beams 230B and 232B are parallel, the reflected light beams 230B and 232B will remain parallel to each other after exiting each optical component. If the reflected light beams 230B and 232B are converging or diverging toward each other at certain rate, the reflected light beams 230B and 232B will be converging or diverging toward each other at the same rate after exiting each optical component. Accordingly, the optical components along the optical track may include a planar surface that reflects at least one of the reflected light beams or a pair of parallel surfaces where each surface reflects a corresponding one of the reflected light beams.

An optical imaging system can include one or more optical assemblies as discussed above for determination of a working distance or focus. For example, an optical imaging system can include two optical assemblies of the type shown in FIGS. 3 and 4 to allow focus to be determined at two different positions on an object or to provide for determination of the working distance between the optical imaging system and the object at two different positions. For embodiments, in which more than one optical assembly is present, the optical assemblies can be discrete and separate or the optical assemblies can share optical components. The optical assemblies can share optical components such as reference light source 212, focus detector 250, fold mirror 245, beam combiner 244, dual-beam generator 241, beam splitter 242, epi-fluorescent (EPI) input reflector 280 and range limiter 254. Optical components can be shared by placing a beam splitter upstream of the shared components in the optical train. Although exemplified for the optical assembly shown in FIGS. 3 and 4, one or more versions of other optical assemblies that are exemplified herein can be present in a particular optical imaging system. Furthermore, a particular optical imaging system can include various combinations of the optical assemblies set forth herein.

As shown in FIG. 4, the reflected light beams 230B and 232B are ultimately incident upon a detector surface 264 of the focus detector 250 at corresponding beam spots. The beam spots are spaced apart by a separation distance SD1. The separation distance SD1 may indicate whether the optical assembly 202 has a sufficient degree-of-focus with respect to the object. The separation distance SD1 on the detector surface 264 may also indicate a working distance between lens 243 and the object being imaged.

In other embodiments, the optical components 241-245 may be substituted with alternative optical components that perform substantially the same function as described above. For example, the beam splitter 242 may be replaced with a prism that directs the incident light beams 230A and 232A through the lens 243 parallel to the optical axis 252. The beam combiner 244 may not be used or may be replaced with an optical flat that does not affect the path spacing of the reflected light beams. Furthermore, the optical components 241-245 may have different sizes and shapes and be arranged in different configurations or orientations as desired. For example, the optical train 240 of the optical assembly 202 may be configured for a compact design.

Furthermore, in alternative embodiments, the parallel light beams may be provided without the dual-beam generator 241. For example, a reference light source 212 may include a pair of light sources that are configured to provide parallel incident light beams. In alternative embodiments, the focus detector 250 may include two focus detectors arranged side-by-side in fixed, known positions with respect to each other. Each focus detector may detect a separate reflected light beam. Relative separation between the reflected light beams may be determined based on the positions of the beam spots with the respective focus detectors and the relative position of the focus detectors with respect to each other.

Although not illustrated in FIGS. 3 and 4, the optical assembly 202 may also be configured to facilitate collecting output light that is projected from the object 268. For example, the optical assembly 202 may include an epi-fluorescent (EPI) input reflector 280 that is positioned to reflect incident light that is provided by an excitation light source (not shown). The light may be directed toward the beam splitter 242 that reflects at least a portion of the excitation light and directs the light along the optical axis 252 through the lens 243. The lens 243 directs the light onto the object 268, which may provide the output light. The lens 243 then receives the output light (e.g., light emissions) from the object 268 and direct the output light back toward the beam splitter 242. The beam splitter 242 may permit a portion of the output light to propagate therethrough along the optical axis. The output light may then be detected by an object detector (not show).

As shown in FIG. 4, the EPI input reflector 280 includes two passages 282 and 284 that allow the light beams 230 and 232 to propagate therethrough without being affected by the input reflector 280. Accordingly, the beam splitter 242 may reflect the incident and reflected light beams 230A, 230B, 232A, and 232B and may also reflect the excitation light.

FIGS. 5-8 show different projection relationships between reflected light beams 230B and 232B and corresponding beam spots 270 and 272 on the detector surface 264. As discussed above, the projection relationship between the reflected light beams is based upon where the object is located in relation to the focal region. When the object is moved with respect to the focal region, the projection relationship between the reflected light beams changes and, consequently, the relative separation between the reflected light beams also changes. FIGS. 5-8 illustrate how a separation distance SD measured between beam spots may change as the projection relationship between the reflected light beams change. However, the separation distance SD is just one manner of determining relative separation between the reflected light beams. Accordingly, those skilled in the art understand that FIGS. 5-8 illustrate only one manner of determining the relative separation and that other manners for determining relative separation or the projection relationship are possible.

Figure 5:
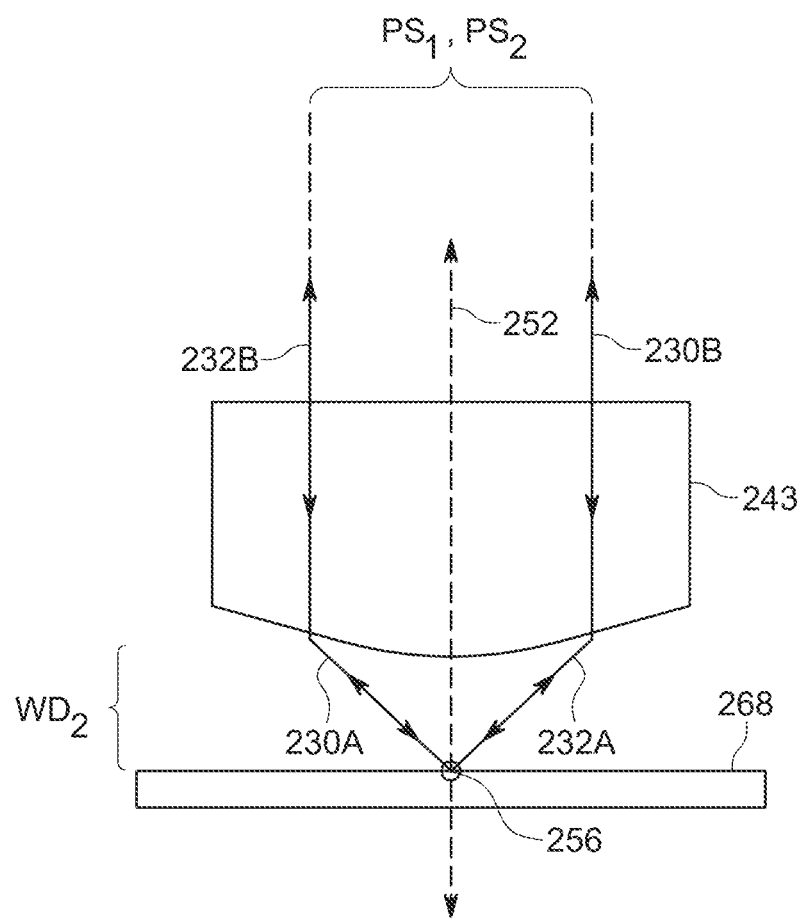
FIG. 5 illustrates incident and reflected light beams when the optical assembly shown in FIG. 3 is in focus with respect to an object.
Figure 6:
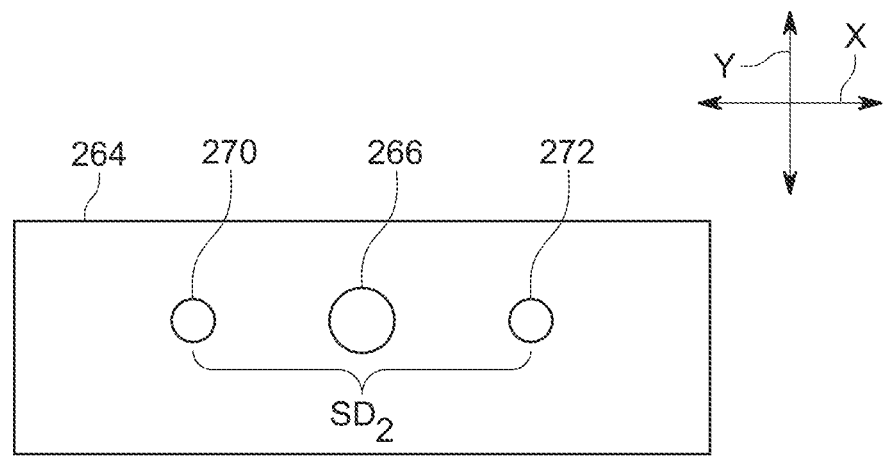
FIG. 6 illustrates beam spots on a detector surface that are provided by the reflected light beams shown in FIG. 5.

FIGS. 5-6 show a projection relationship between reflected light beams 230B and 232B when the optical assembly 202 (FIG. 3) is in focus with respect to an object 268. As shown, the incident light beams 230A and 232A propagate through the lens 243 parallel to each other and spaced apart by a path spacing PS1. In the illustrated embodiment, the incident light beams 230A and 232A propagate parallel to the optical axis 252 of the lens 243 and are equidistant from the optical axis 252. In alternative embodiments, the incident light beams 230A and 232A may propagate in a non-parallel manner with respect to the optical axis 252 and have different spacings therefrom. In a particular alternative embodiment, one of the incident light beams 230A or 232A coincides with the optical axis 252 of the lens 243 and the other is spaced apart from the optical axis 252.

The incident light beams 230A and 232A are directed by the lens 243 to converge toward the focal region 256. In such embodiments where the incident light beams are non-parallel to the optical axis, the focal region may have a different location than the location shown in FIG. 5. The incident light beams 230A and 232A are reflected by the object 268 and form the reflected light beams 230B and 232B. The reflected light beams 230B and 232B return to and propagate through the lens 243 and parallel to the optical axis 252. The reflected light beams 230B and 232B exit the lens 243 parallel to each other and spaced apart by a path spacing PS2. When the optical assembly 202 is in focus, the path spacings PS1 and PS2 are equal.

Accordingly, when the optical assembly 202 is in focus, the projection relationship of the reflected light beams 230B and 232B exiting the lens 243 includes two parallel light beams. The optical train 240 is configured to maintain the parallel projection relationship. For example, when the optical assembly 202 is in focus, the reflected light beams 230B and 232B are parallel to each other when exiting the dual-beam generator 241, when exiting the beam combiner 244, and when reflected by the fold mirror 245. Although the projection relationship is maintained, the path spacing PS2 may be re-scaled by a beam combiner.

As shown in FIG. 6, the reflected light beams 230B and 232B of FIG. 5 are incident upon the detector surface 264 and form the beam spots 270 and 272. When the optical assembly 202 is in focus, the beam spots 270 and 272 have a separation distance $SD_2$. The separation distance $SD_2$ can be based upon (or a function of) dimensions of the beam combiner 244 and an angle of incidence with respect to the parallel surfaces of the beam combiner 244 and the impinging reflected light beams 230B and 232B. The separation distance $SD_2$ is also based upon the projection relationship of the reflected light beams 230B and 232B exiting the lens 243. As shown in FIG. 6, the detector surface 264 has a center point or region 266. If all of the optical components 241-245 (FIG. 3) of the optical train 240 are in respective desired positions, the beam spots 270 and 272 may be equally spaced apart from the center region 266 along an X-axis and vertically centered within the detector surface 264. Also shown, the beam spots 270 and 272 may have a select morphology that is correlated with the optical assembly 202 being in focus. For example, the beam spots 270 and 272 may have an airy radius that correlates to the optical assembly 202 being in focus.

Figure 7:
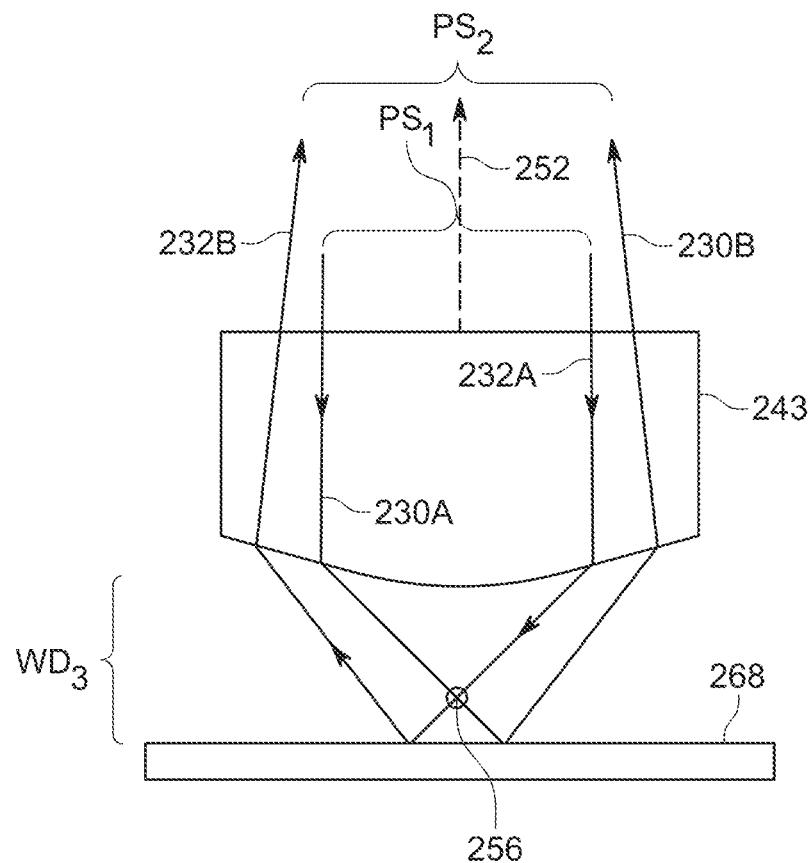
FIG. 7 illustrates incident and reflected light beams when the optical assembly shown in FIG. 3 is below focus.
Figure 8:
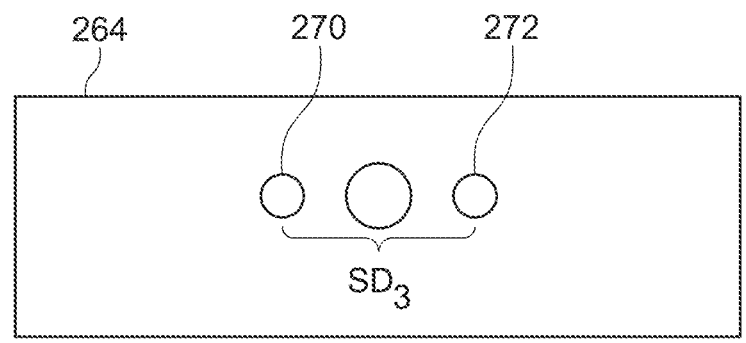
FIG. 8 illustrates beam spots on a detector surface that are provided by the reflected light beams shown in FIG. 7.

FIGS. 7-8 show a projection relationship between the reflected light beams 230B and 232B when the optical assembly 202 (FIG. 3) is below focus. As described above, the incident light beams 230A and 232A propagate through the lens 243 parallel to each other and spaced apart by the path spacing PS1. The incident light beams 230A and 232A intersect each other at the focal region 256 and are then reflected by the object 268 to form the reflected light beams 230B and 232B. However, as shown in FIG. 7, when the reflected light beams 230B and 232B exit the lens 243, the reflected light beams 230B and 232B are slightly converging toward the optical axis 252 and each other. Also shown, the path spacing PS2 is greater than the path spacing PS1.

Accordingly, when the object 268 is located below the focal region 256, the projection relationship of the reflected light beams 230B and 232B includes two light beams that converge toward each other. Similar to above, the optical train 240 is configured to maintain the converging projection relationship. For example, the reflected light beams 230B and 232B are converging toward each other when exiting the dual-beam generator 241, when exiting the beam combiner 244, and when reflected by the fold mirror 245.

As shown in FIG. 8, when the object 268 is located below the focal region 256, the beam spots 270 and 272 have a separation distance SD3 that is less than the separation distance SD2 (FIG. 6). The separation distance SD3 is less because the reflected light beams 130B and 132B converge toward each other throughout the optical track between the lens 243 and the focus detector 250. Also shown in FIG. 8, the beam spots 270 and 272 may have a select morphology that is correlated with the beam spots 270 and 272. The morphology of the beam spots 270 and 272 when the object 268 is located below the focal region 256 is different than the morphology of the beam spots 270 and 272 when the object 268 is in focus. The beam spots 270 and 272 may have a different airy radius that correlates to the object being below the focal region 256.

Figure 9:
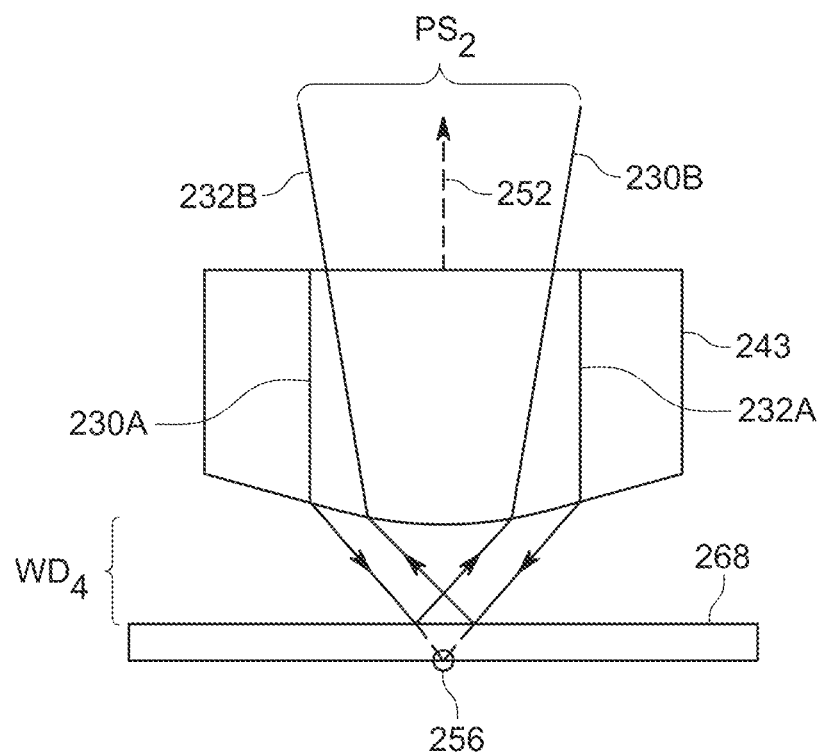
FIG. 9 illustrates incident and reflected light beams when the optical assembly shown in FIG. 3 is above focus.
Figure 10:
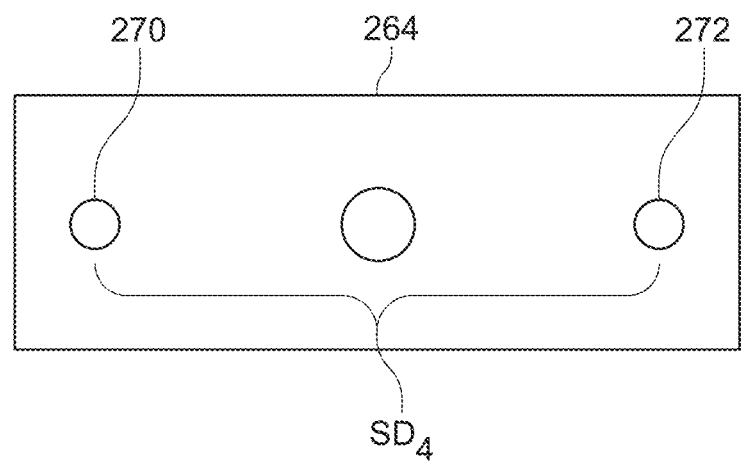
FIG. 10 illustrates beam spots on a detector surface that are provided by the reflected light beams shown in FIG. 9.

FIGS. 9-10 show a projection relationship between the reflected light beams 230B and 232B when the optical assembly 202 (FIG. 3) is above focus. As described above, the incident light beams 230A and 232A propagate through the lens 243 parallel to each other and spaced apart by the path spacing PS1. Before the incident light beams 230A and 232A reach the focal region 256, the incident light beams 230A and 232A are reflected by the object 268 to form the reflected light beams 230B and 232B. However, as shown in FIG. 9, when the reflected light beams 230B and 232B exit the lens 243, the reflected light beams 230B and 232B diverge away from the optical axis 252 and away from each other. Also shown, the path spacing PS2 is less than the path spacing PS1.

Accordingly, when the object 268 is located above the focal region 256, the projection relationship of the reflected light beams 230B and 232B includes two light beams that diverge away from each other. The optical train 240 is configured to maintain the diverging projection relationship. For example, the reflected light beams 230B and 232B are diverging away from each other when exiting the dual-beam generator 241, when exiting the beam combiner 244, and when reflected by the fold mirror 245.

As shown in FIG. 10, when the object 268 is located above the focal region 256, the beam spots 270 and 272 have a separation distance SD4 that is greater than the separation distance SD2. The separation distance SD4 is greater because the reflected light beams 130B and 132B diverge from each other throughout the optical track between the lens 243 and the focus detector 250. Also shown in FIG. 10, the beam spots 270 and 272 may have a select morphology that is correlated with the beam spots 270 and 272. The morphology of the beam spots 270 and 272 when the object 268 is located above the focal region 256 is different than the morphology of the beam spots 270 and 272 when the object 268 is in focus or below the focal region 256. Likewise, the beam spots 270 and 272 may have a different airy radius that correlates to the object being below the focal region 256.

As described above, if the object 268 is below the focal region 256, the separation distance SD3 is less than the separation distance SD2 in which the object 268 is within the focal region 256. If the object 268 is above the focal region 256, the separation distance SD4 is greater than the separation distance SD2. As such, the optical assembly 202 not only determines that the object 268 is not located within the focal region 256, but may also determine a direction to move the object 268 with respect to the lens 243. Furthermore, a value of the separation distance SD3 may be used to determine how far to move the object 268 with respect to the lens 243.

As illustrated by the examples of FIGS. 6-10, in addition to determining the object is at the focal region, a measurement of separation distance on a detector can be used to determine the working distance between the lens and an object that is being detected through the lens. Furthermore, the separation distance on the detector may be used to determine a profile of an object surface.

As the foregoing examples illustrate, relative separation (e.g., a separation distance) may be a function of the projection relationship (i.e., what rate the reflected light beams 230B and 232B are diverging or converging) and a length of the optical track measured from the lens 243 to the focus detector 250. As the optical track between the lens 243 and the focus detector 250 increases in length, the separation distance may decrease or increase if the object is not in focus. As such, the length of the optical track may be configured to facilitate distinguishing the separation distances SD3 and SD4. For example, the optical track may be configured so that converging reflected light beams do not cross each other and/or configured so that diverging light beams do not exceed a predetermined relative separation between each other. To this end, the optical track between optical components of the optical train 240 may be lengthened or shortened as desired.

As the foregoing examples also illustrate, the working distance between the lens and object being imaged (e.g., WD2 in FIG. 5, WD3 in FIG. 7, and WD4 in FIG. 9) may be determined based on the measurement of separation distance on a detector. Furthermore, this may be used to determine a profile of an object surface. For example, the optical system may record a relative separation for a series of data points and associate each data point with a position along the surface. When the working distance decreases (i.e., when the height of the object surface increases) the relative separation may increase as shown in FIG. 10. When the working distance increases (i.e., when the height of the object surface decreases) the relative separation may decrease as shown in FIG. 8. Accordingly, a surface profile or topography of the object may be determined based on the relative separation of the reflected beams.

Figure 11:
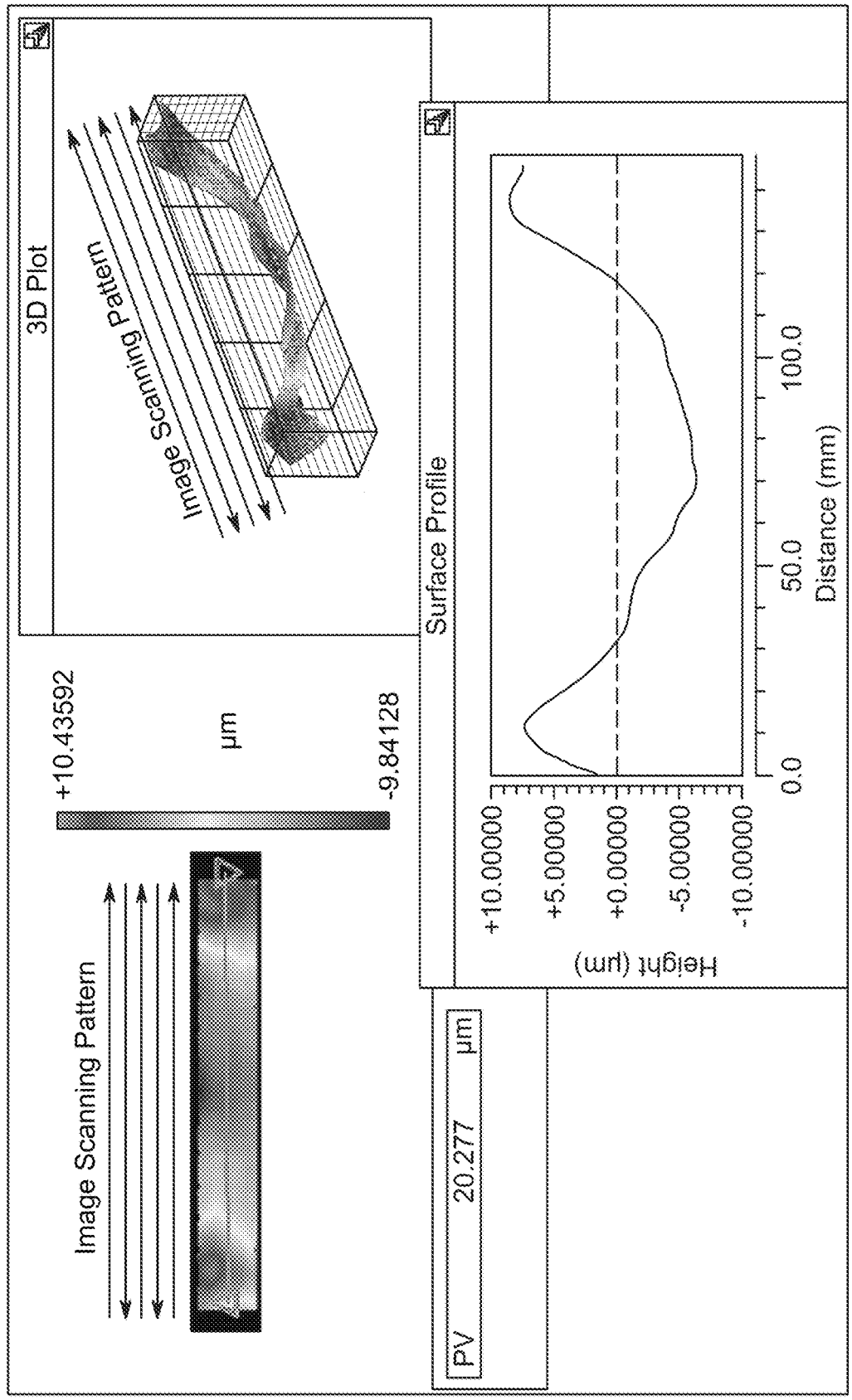
FIG. 11 shows a series of plots illustrating a surface profile of a flow cell sample scanned using a line scanning system, in accordance with some implementations of the disclosure.

As discussed above, a sample may have many variations in its topography along an imaging direction (e.g., scanning direction) that cannot be accounted by performing a single, global tilt of the sample prior to imaging. For example, FIG. 11 shows a series of plots illustrating a surface profile of a flow cell sample scanned using a line scanning system. As depicted, the surface profile of the flow cell may vary significantly (e.g., from about −10 µm to 10 µm) over the direction of scanning.

Figure 12:
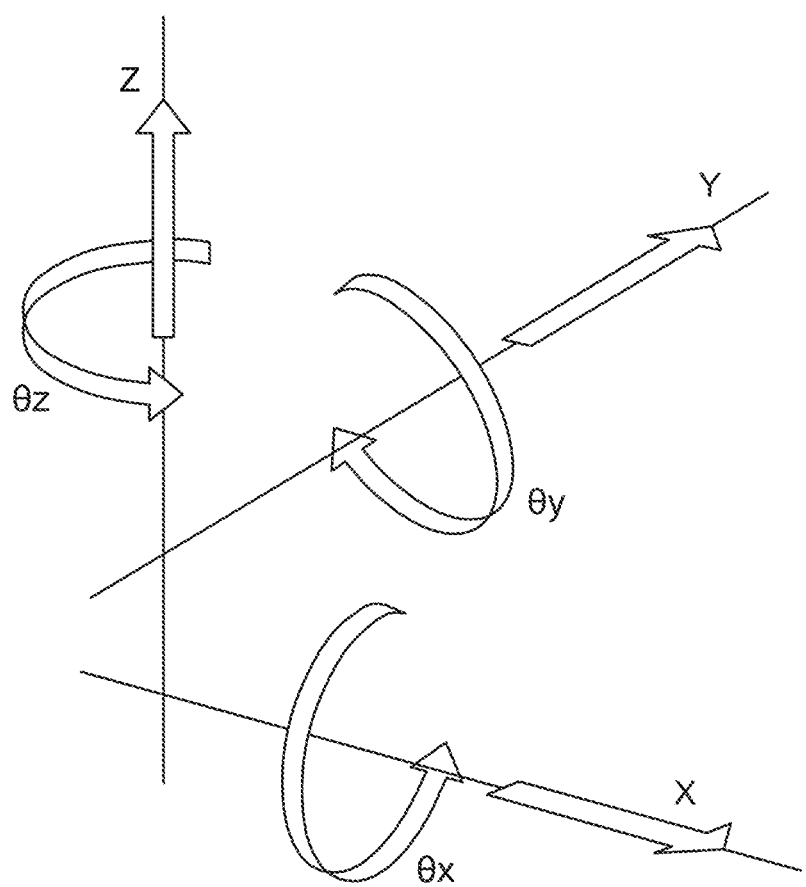
FIG. 12 shows a coordinate system that may be used when designing an assembly that dynamically moves a sample in a lateral and/or angular direction, in accordance with some implementations of the disclosure.

As also discussed above, to account for local changes in the topography of the sample, an optical imaging system may include a controller that, during imaging, is configured to dynamically move a sample holder in a lateral direction (along an X-axis and/or a Y-axis that extends into the page), in a vertical/elevational direction along a Z-axis, and/or in an angular direction along the X-axis (tip), Y-axis (tilt), and/or Z-axis (twist). To this end, it is instructive to consider a coordinate system that may be used when designing an assembly that dynamically moves a sample in a lateral and/or angular direction. FIG. 12 depicts one such example coordinate system. In this example, the z axis is aligned with the optical axis of the objective and may generally point upward to the sky. The y axis is the axis along which the sample may actively travel during imaging (e.g., during sequencing using a line scanner). For example, the sample may be a flow cell have flow cell lanes that are co-aligned with the Y axis. Any movements of the sample holder (and by extension, the sample) in an angular direction may be represented as twisting the sample holder about the z axis (e.g., a change in θz), tilting the sample holder about the y axis (e.g., a change in θy), or tipping/tilting the sample holder about the x axis (e.g., a change in θx).

Figure 13:
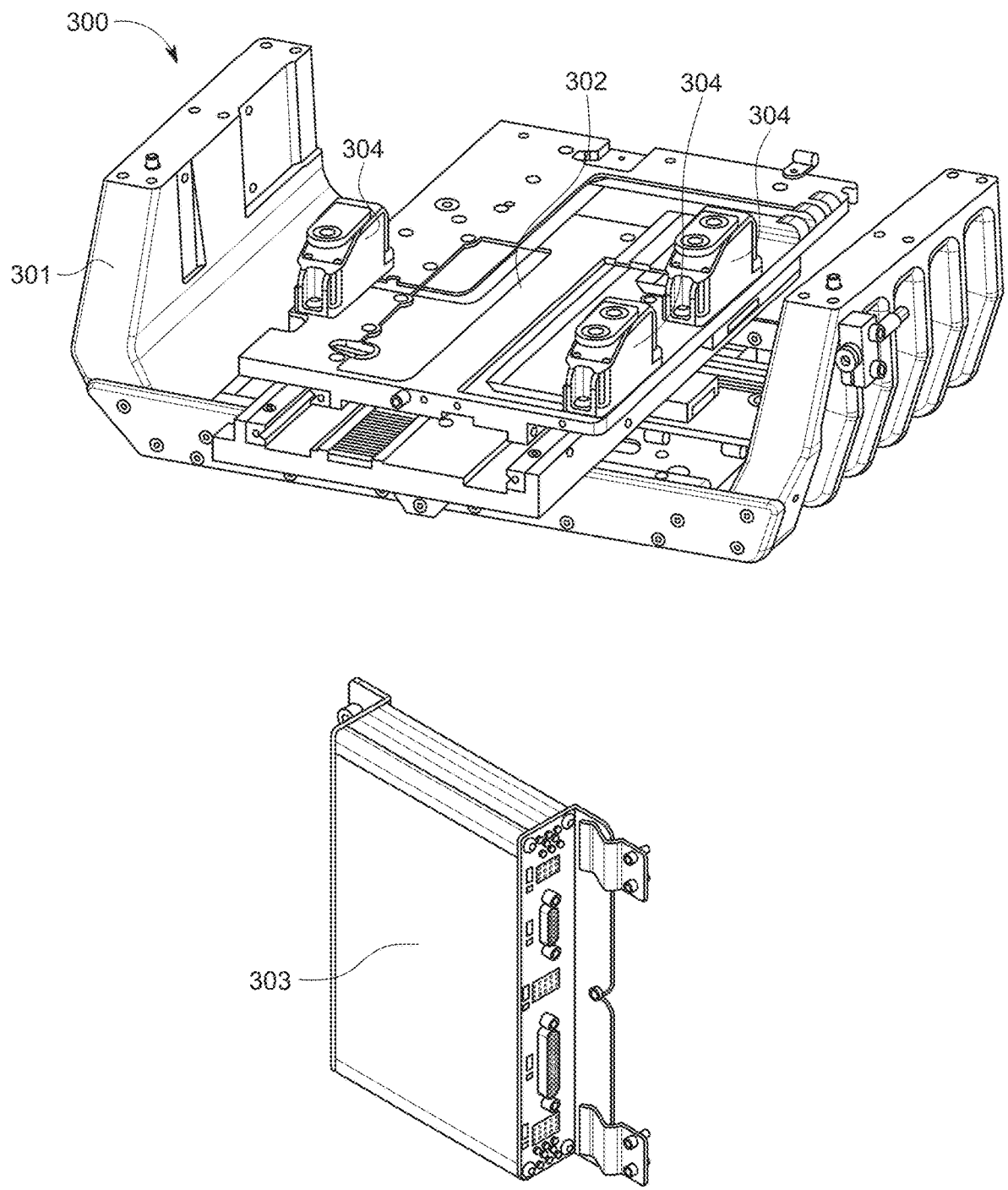
FIG. 13 shows a sample stage assembly configured to mount a movable platform containing a sample container, in accordance with some implementations of the disclosure.
Figure 14:
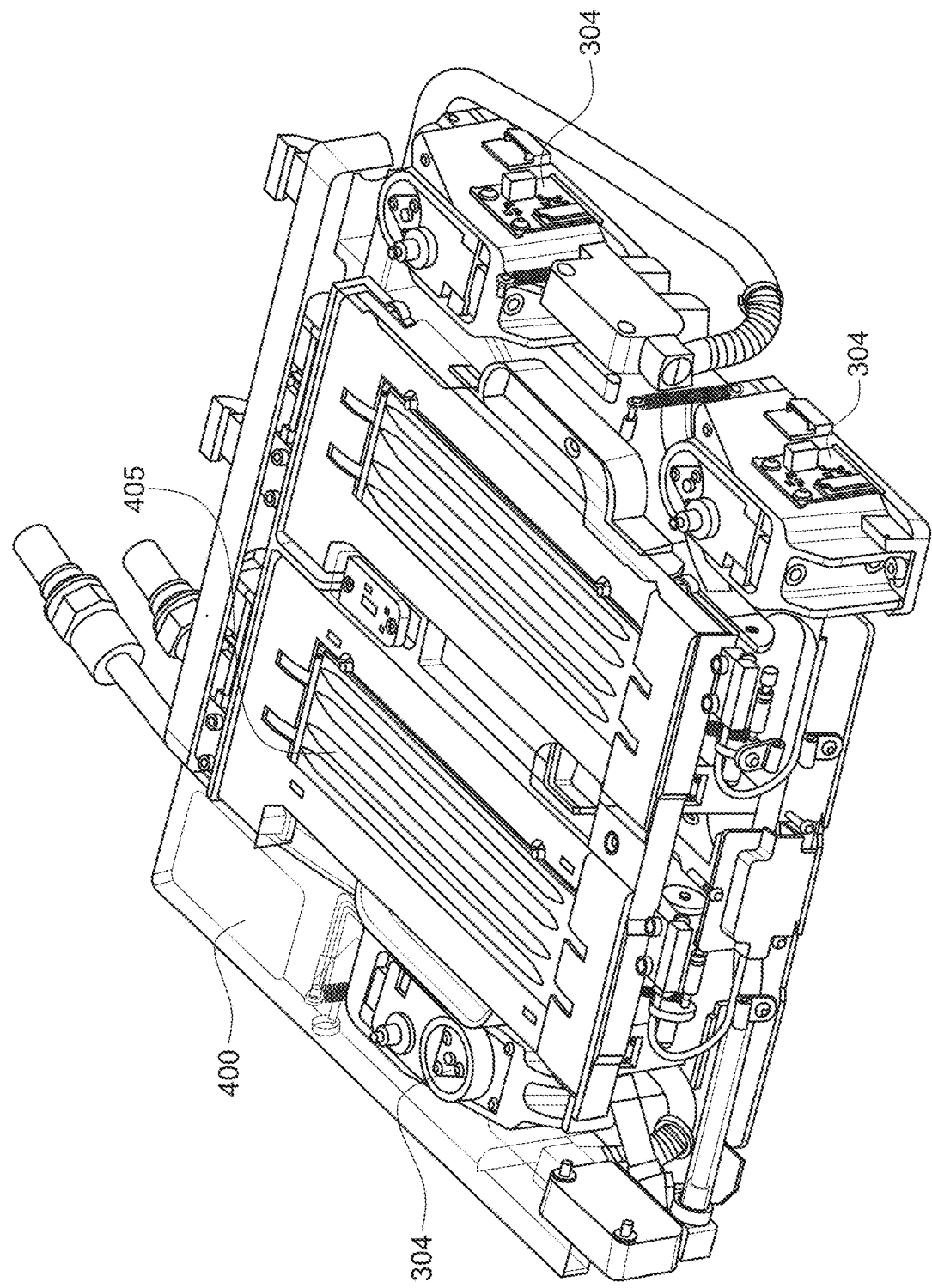
FIG. 14 depicts a movable platform mounted on actuators of a tip tilt assembly, in accordance with implementations of the disclosure.
Figure 15:
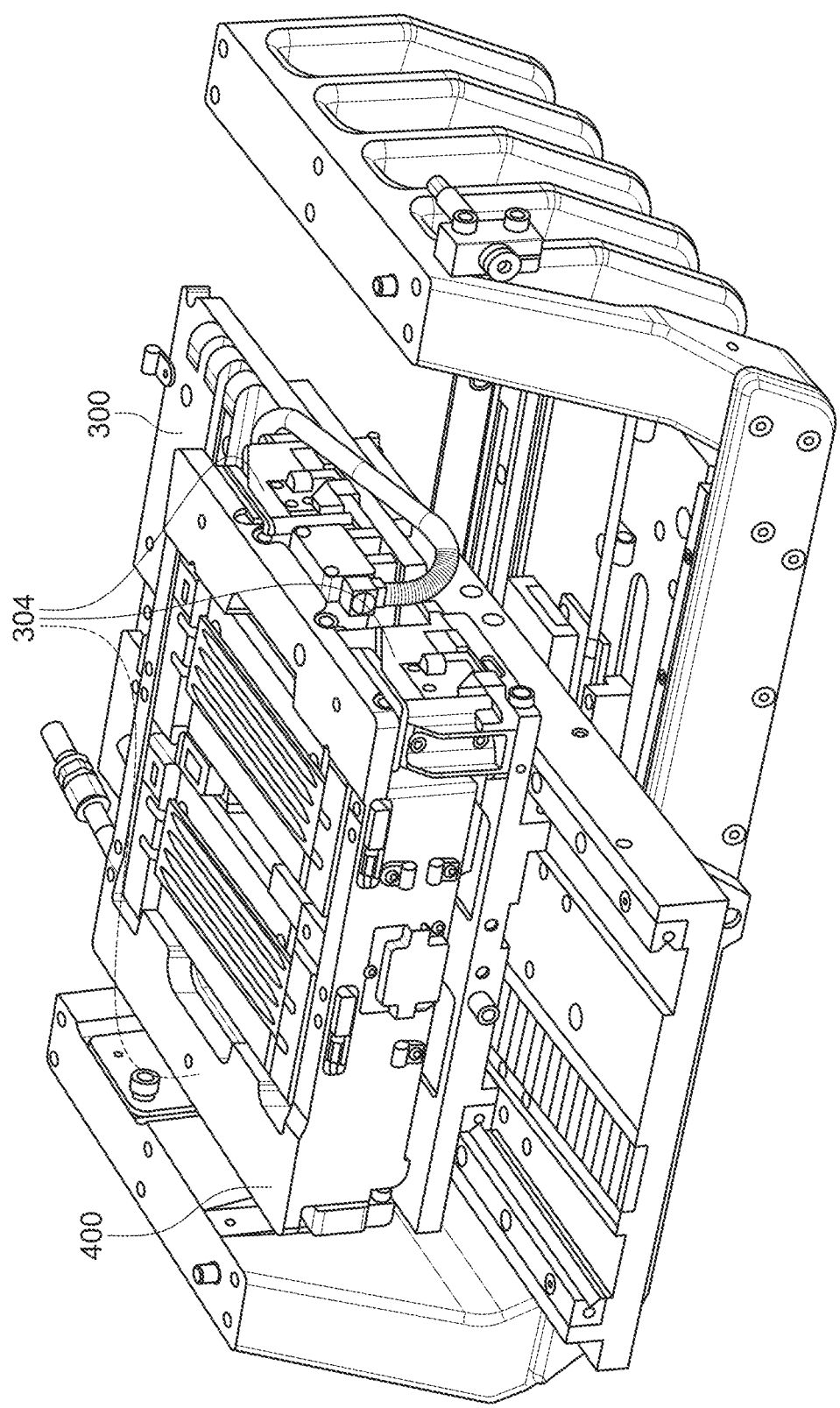
FIG. 15 depicts a movable platform on a sample stage assembly, in accordance with some implementations of the disclosure.

FIGS. 13-15 depict an example assembly that may enable dynamic adjustment of the lateral and angular position of a sample, in accordance with some implementations of the disclosure. FIG. 13 shows a sample stage assembly 300 configured to mount a movable platform containing an imaged sample (FIG. 14). As illustrated, the sample stage assembly 300 includes an XY cradle 301, an XY stage 302, a controller 303, and a tip tilt assembly (TTA) including multiple actuators 304. FIG. 14 depicts an example movable platform 400 mounted on the actuators 304 of the TTA. FIG. 15 depicts the movable platform 400 mounted on the sample stage assembly 300. The movable platform 400 includes a sample container 405, which in this example is a flow cell.

In this example, the XY stage 302 is configured to move a sample holder laterally along the X axis and the Y axis. The TTA is configured to control angular alignment of the sample holder to position the sample surface within a focal range of the optics of the imaging system. The TTA may affect all three axes of rotation as depicted with respect to FIG. 11. In some implementations, the TTA may actively control rotation about all three axes during imaging. In other implementations, the TTA may actively control rotation about only some axes during imaging. For instance, only rotation about the X and Y axes may be actively controlled during the course of imaging, and rotation about the Z axis may be adjusted manually on an as-needed basis.

Controller 303 may be configured to apply parameters for one or more drive signals that are applied to one or more actuators to linearly move XY stage 302 or angularly move moveable platform 400 for each imaging operation. Generally, for larger linear or rotational translations, a greater control output (e.g., one or more parameters such as larger drive current, larger voltage, and greater duty cycle) will be specified. Likewise, for smaller translations, a smaller control output (e.g., smaller drive current, lower voltage, and smaller duty cycle) will be specified. The control output can be adjusted, for example, by adjusting the current or voltage applied to the one or more actuators. Additionally, in some examples, the time at which the drive signal is applied to the one or more actuators can be adjusted based on the translation amount that is required for the change in focusing. For example, where the required translation is greater, the drive signal can be applied earlier. However, in other examples, the drive signal is applied as early as possible after the imaging is complete at the current sample location regardless of the difference in focus settings. The parameters of the drive signal, and the time at which the drive signal is applied, can be determined based on the actuator type (e.g., piezoelectric versus voice coil) and drive requirements. As such, drive signals can be supplied to one or more actuators at different output levels to linearly move, tilt, tip, or otherwise position the sample during imaging.

In this example, the TTA accomplishes θX and θY alignment through active manipulation of three linear actuators 304 whereby the sample holder lies on a movable platform 400 that is kinematically mounted to the three linear actuators 304. The actuators 304 may be spaced sufficiently apart such that relatively large displacements of these actuators can effect small changes in platform inclination. In some implementations, 3 point kinematic mount may utilize "3V coupling", also referred to as a "Maxwell Coupling." In other implementations, a 3-2-1 coupling may be utilized. Although angular alignment control via the use of a 3 point kinematic mount is illustrated in this example, it should be appreciated that other types or number of actuators, or other configurations of actuators, may be utilized to enable angular control to position a sample in focus.

FIGS. 16A-16D respectively show an exploded view, a perspective view, a side view, and another perspective view of a particular actuator 304 that may be used in some implementations of the disclosure. As depicted, the actuator 304 may include a tilt motor 304-1, an encoder 304-2, a tilt board 304-3, a lead screw 304-4, a proximity sensor reflector 304-5, an encoder scale 304-6, a linear bearing 304-7, a carriage 304-8, a lead-screw nut 304-9, and a ball 304-10. The actuator 304, in this implementation, functions as a linear stage with a carriage 304-8 driven up and down by a lead screw 304-4, which is integrated into a tilt motor 304-1 (e.g., a stepper motor). A linear bearing 304-7 guides the carriage 304-8 up and down while an encoder 304-2 monitors its relative position. The encoder 304-2 may be opto-reflective. A scale 304-6 resides on the movable carriage, while the encoder sensor resides on the tilt board 304-3. A separate proximity sensor can also be found on the tilt board 304-3. This proximity sensor may help software verify absolute position and direction.

Figure 16A:
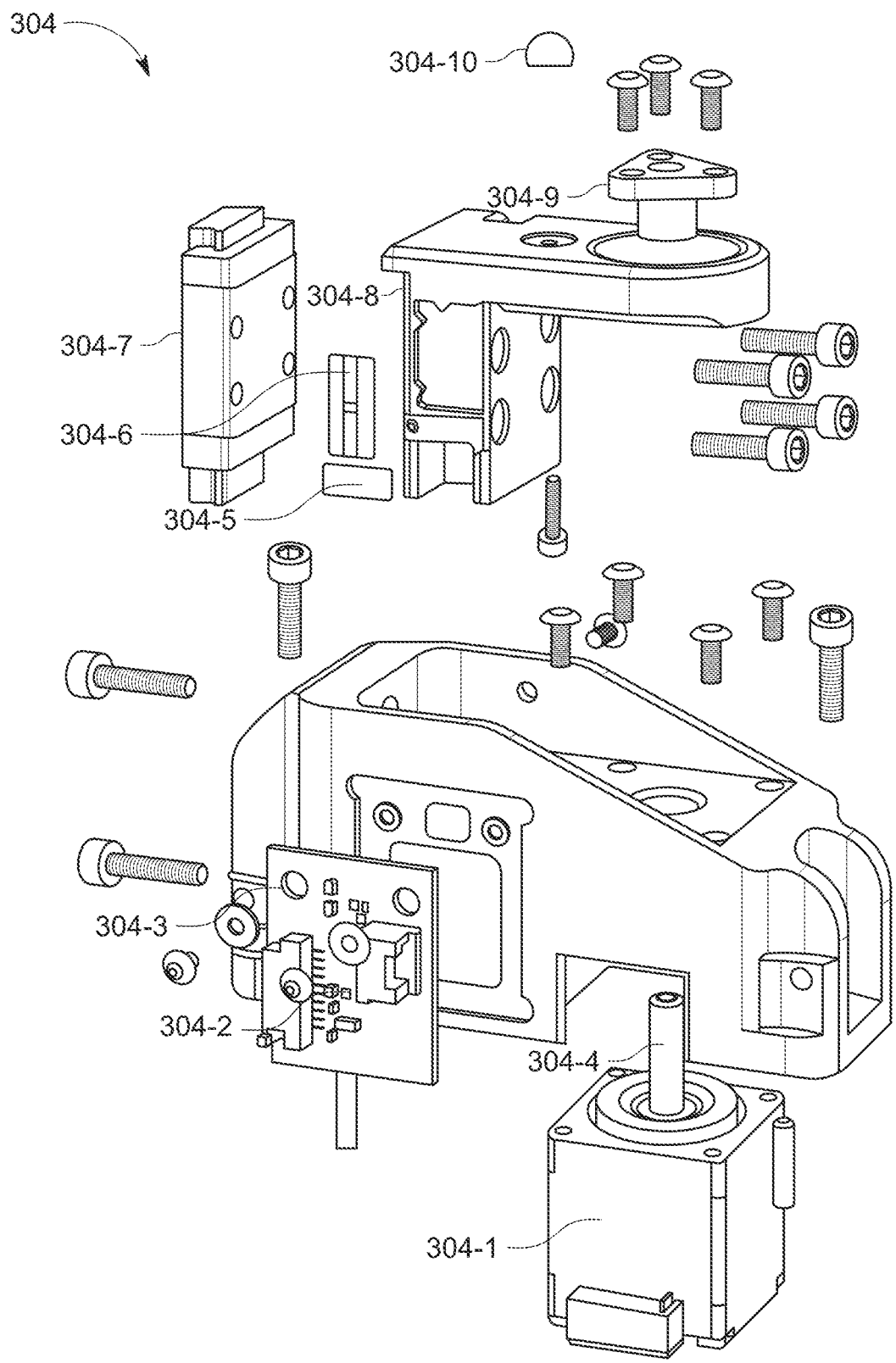
FIG. 16A shows an exploded view of an actuator, in accordance with some implementations of the disclosure.
Figure 16B:
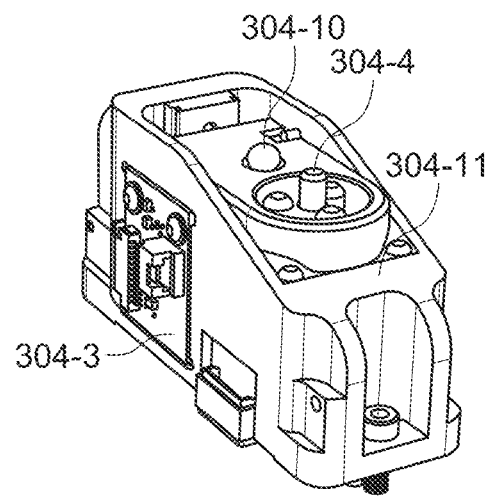
FIG. 16B shows a perspective view of the actuator of FIG. 16A.
Figure 16C:
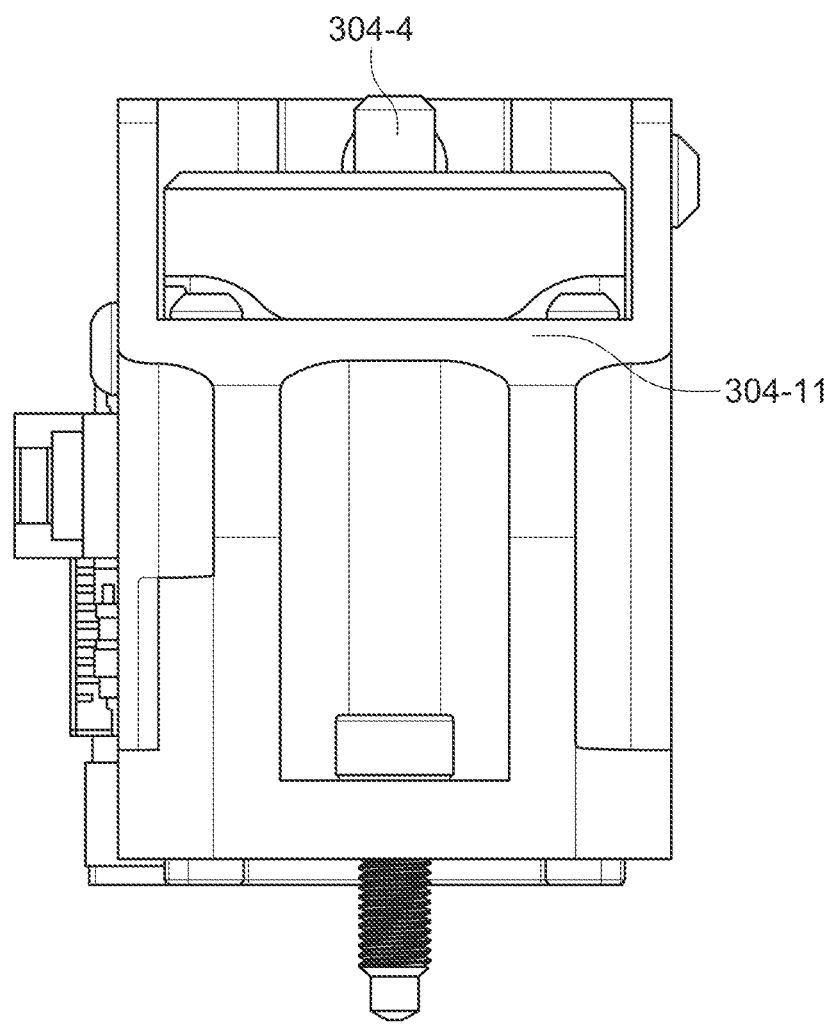
FIG. 16C shows a side view of the actuator of FIG. 16A.

As depicted by FIGS. 16B-16C, which depict a lower hard stop position of the actuator 304, homing of the actuator 304 may be accomplished by driving the carriage 304-8 all the way down until it contacts the motor support structure at 304-11. Alternatively, the proximity sensor alone may be relied on to determine global positioning. Actuator 304 may be zeroed at the bottom of carriage travel during instrument initialization, and all actuator commands may be relative to this full down position.

Figure 16D:
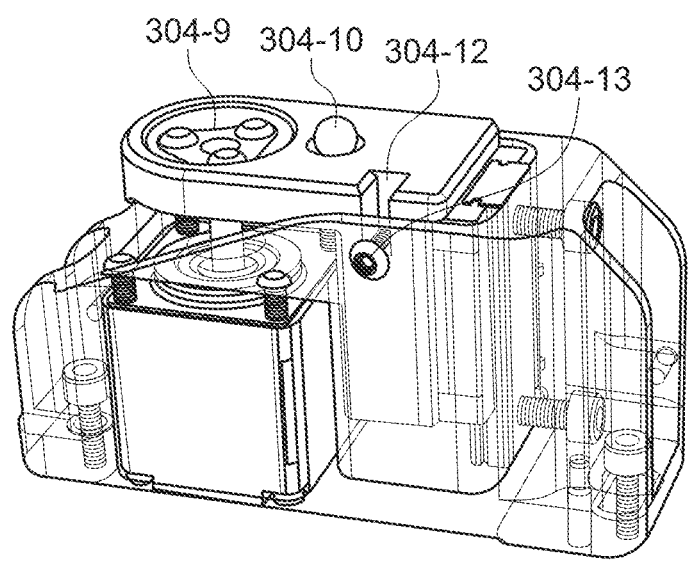
FIG. 16D shows another perspective view of the actuator of FIG. 16A.

As depicted by FIG. 16D, actuator 304 may incorporate an upper hard stop to prevent the carriage 304-8 from travelling off the end of the lead screw 304-4. This hard stop may be accomplished with a hard-mounted machine screw 304-13 that protrudes through a slot 304-12 in the carriage 304-8. The length of the slot 304-12 may be greater than the range that the carriage 304-8 normally travels during instrument use.

Figure 17:
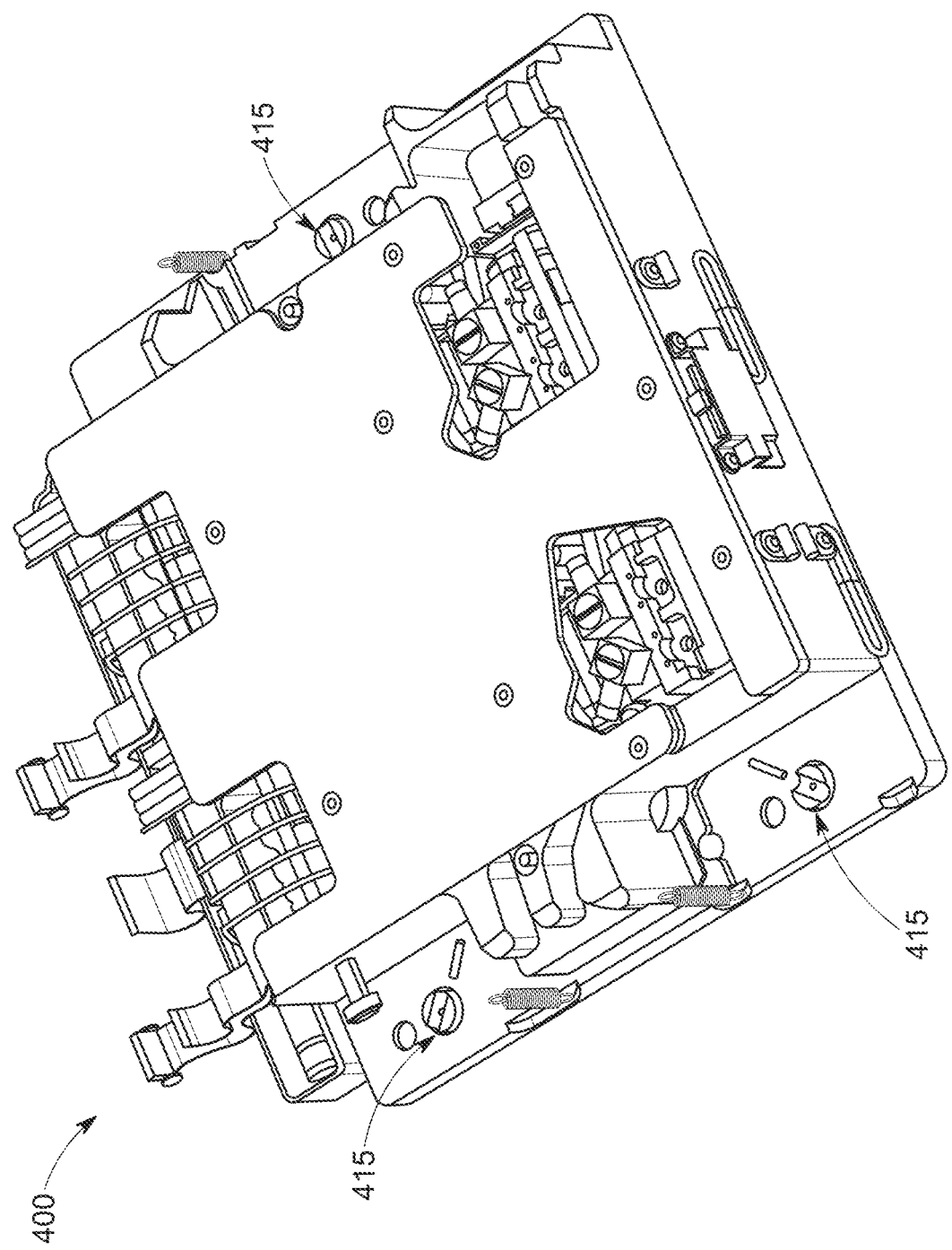
FIG. 17 shows an underside of a movable platform of FIG. 14, in accordance with some implementations of the disclosure.

FIG. 17 depicts an underside of movable platform 400, in accordance with some implementations of the disclosure. The underside includes three V-grooves 415 that are configured to couple to balls 304-10 of actuators 304.

Figure 18:
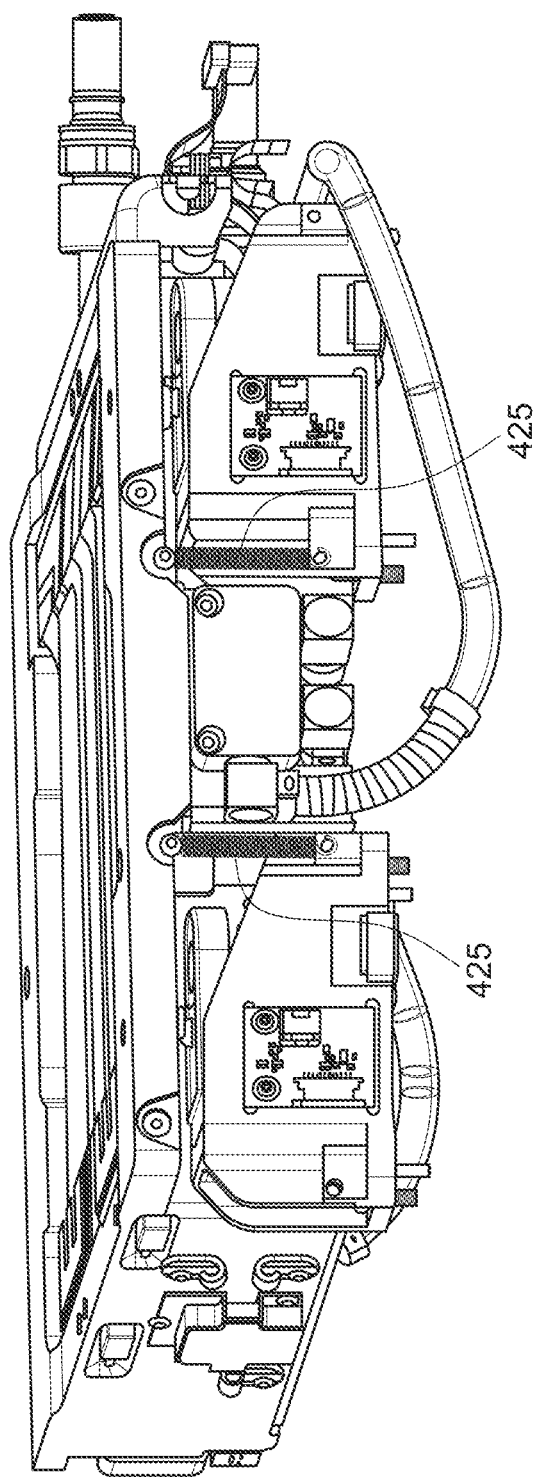
FIG. 18 shows a perspective view of a movable platform of FIG. 14, in accordance with some implementations of the disclosure.

FIG. 18 depicts another perspective view of movable platform 400. To ensure adequate stability of the system, including under external loads, such as wire and tubing disturbances that may upset the kinematic balance of gravitational forces, the movable platform 400 may include extension springs 425 to further increase the contact force at each coupling interface between actuator 304 and movable platform 400, and resist inadvertent liftoff.

Figure 19:
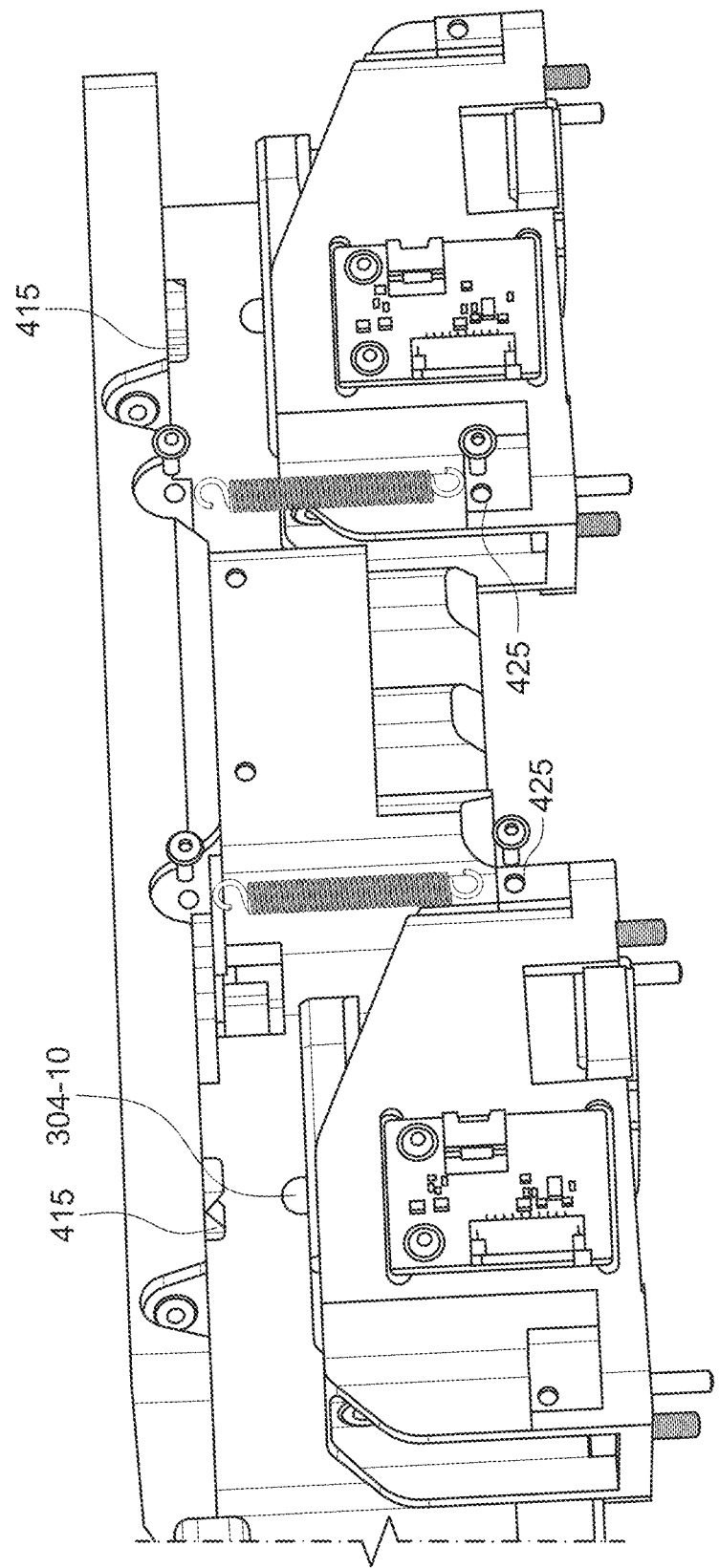
FIG. 19 shows a movable platform interfacing and coupling with actuators, in accordance with some implementations of the disclosure.

FIG. 19 depicts the movable platform 400 interfacing and coupling with actuators 304. As depicted, threaded holes 425 interface with hold-down spring fasteners, and balls 304-10 interface with V-grooves 415.

Figure 20:
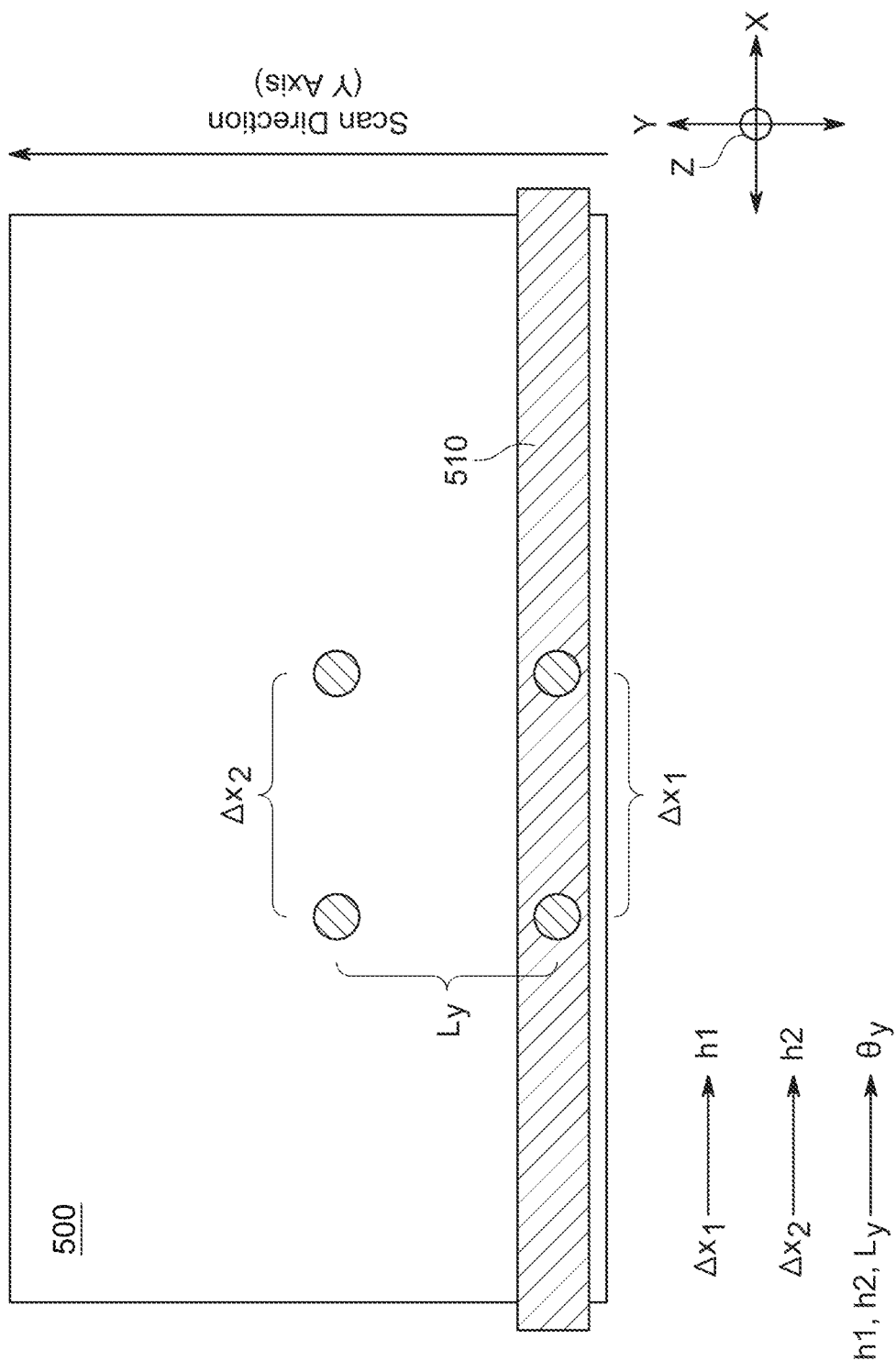
FIG. 20 depicts a process of utilizing two pairs of project spot beams to determine tilt of a sample along its line scanning direction, in accordance with some implementations of the disclosure.

To enable dynamic tilting of a sample holder to keep a sample within focus during image scanning, there are different strategies that could potentially be adopted. In some embodiments, a feedback de-tilt mechanism may be adopted whereby tilt is measured in real-time during image scanning, and tilt measurements are directly fed into one or more tilt motor drivers corresponding to one or more tilt actuators (e.g., one or more tilt actuators 304). As described above, spot beam separation of a projected pair of spots of a focus tracking module may be mapped to a sample height position. The projected pair of spots may be generated using a light source having a wavelength between about 620 nm and 700 nm. By projecting two different pairs of spots along two different scanning positions (i.e., two different Y positions), the sample height at two different positions of the scanning direction may be measured, and mapped to a change in sample tilt between the two scanning positions. For example, as depicted by FIG. 20, which shows scanning of a sample 500 using a line scan 510, the spot beam separation $\Delta x_1$ may be mapped to a first sample height h1, and the spot beam separation $\Delta x_2$ may be mapped to a second sample height h2. Based on the separation $L_y$ between the two pairs of spot beams, and the respective heights h1 and h2, the tilt angle of the sample between the two scanning points may be estimated (e.g., by calculating the slope between the two points). The determined tilt angle may be used by a system controller to cause one or more actuators to tilt a sample holder. In some implementations of this embodiment, to ensure that tilt is measured in advance of imaging of a sample section, the system may employ lookahead focus tracking beams that project at least one pair of spots in advance of the line scan reaching the sample section.

Although feedback-based tilting as described above could provide real-time tilt adjustment of a sample, any real-time feedback loop may be limited by the i) maximum speed at which the sample stage may be tilted, and ii) the latency in communicating the real-time measurements to the tilt controller. If local tilt varies more quickly than the combined latency of the maximum tilt speed and latency in communicating the real-time measurements to the tilt controller, any real-time feedback mechanism may experience latency that renders such a method inadequate.

Figure 21:
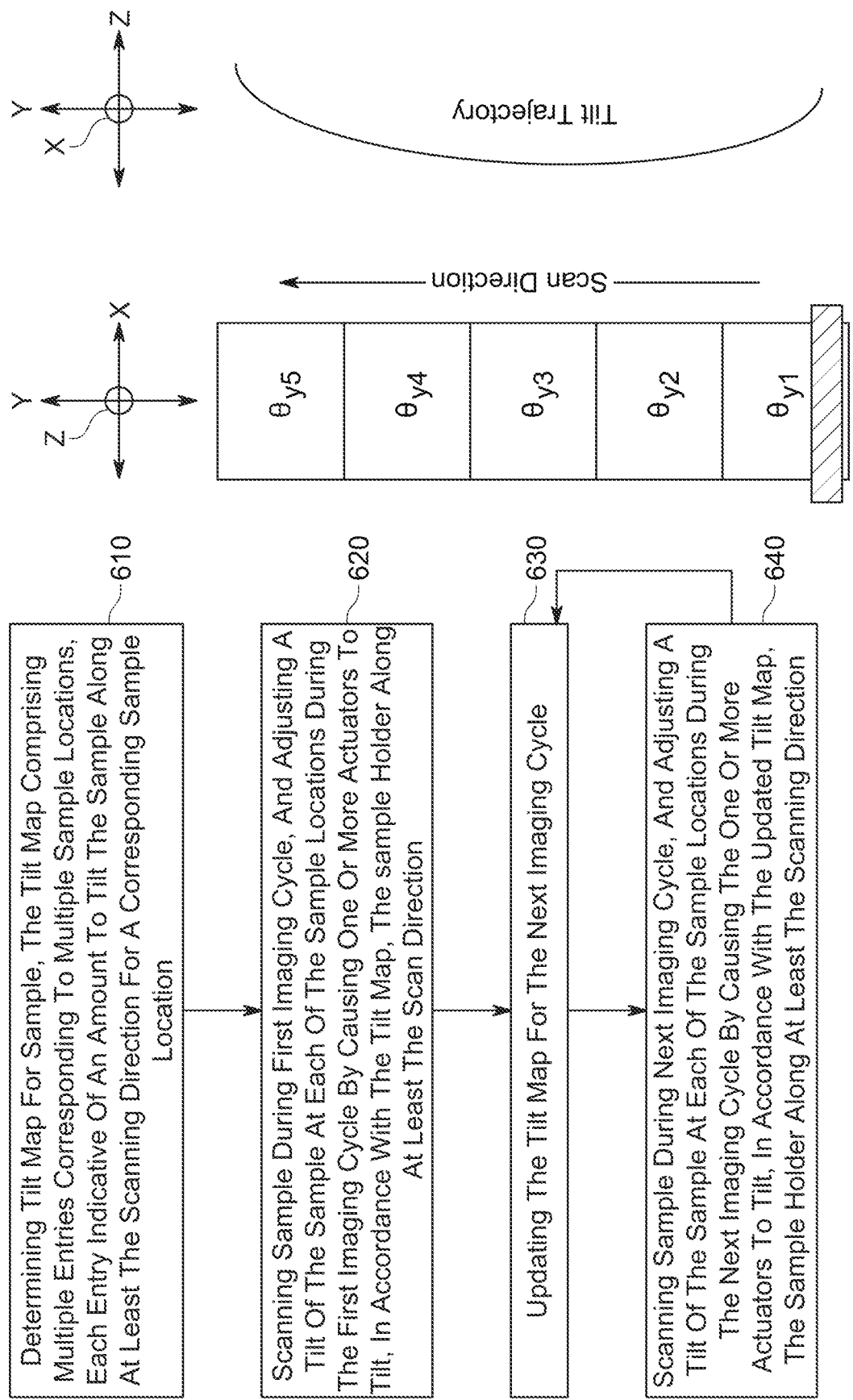
FIG. 21A is an operational flow diagram illustrating an example method of dynamically tilting a sample based on predetermined tilt trajectory, in accordance with some implementations of the disclosure.
FIG. 21B illustrates tilt angles at different samples locations for a tilt map, in accordance with some implementations of the disclosure.
FIG. 21C conceptually illustrates a smooth fit of the tilt trajectory in the z direction based on different tilt angles, in accordance with some implementations of the disclosure.

As such, in some embodiments, to adjust for this latency problem, it may be preferable to adopt a technique that generates a "tilt trajectory" in advance of tilting a sample during image scanning. This example is illustrated by FIGS. 21A-21C. In particular, FIG. 21A is an operational flow diagram illustrating an example method of dynamically tilting a sample based on predetermined tilt trajectory. The method may be implemented by an optical imaging system (e.g., optical imaging system 100) including a suitable mechanism for dynamically tilting a stage carrying a sample (e.g., sample stage assembly 300).

Operation 610 includes determining a tilt map for a sample, the tilt map comprising multiple entries corresponding to multiple sample locations, each entry indicative of an amount to tilt the sample along at least the scanning direction for a corresponding sample location. The tilt map may be in the form of a table, a one-dimensional array, a two-dimensional (2D) array, or otherwise suitable data structure. For example, as depicted by FIG. 21B, the tilt map may specify five tilt angles θy1 for five different sample locations. In practice, the tilt map may be generated for more than five locations, and it may be constructed by estimating a smooth fit between multiple sample tilt measurements. FIG. 21C conceptually illustrates a smooth fit of the tilt trajectory in the z direction based on the different tilt angles. The initial tilt map is generated in advance of scanning the sample. As further discussed below, the tilt map may be generated by performing a "pre-scan" along several positions of the scanning direction (e.g., several Y positions along the Y-direction) to determine sample height at the various positions. In the case of a sample that is scanned in multiple strips (e.g., a flow cell scanned in swaths), sample height may be determined at multiple Y positions for each strip.

Operation 620 includes scanning the sample during a first imaging cycle, and adjusting a tilt of a sample holder at each of the sample locations during the first imaging cycle by causing one or more actuators to tilt, in accordance with the tilt map, the sample holder along at least the scan direction. An image of the sample may be collected by moving the sample holder at a constant speed using a motorized stage (e.g., XY stage 302) in a direction perpendicular to a long dimension of an image sensor array (e.g., a TDI sensor). In embodiments where a sample is imaged in strips (e.g., a flow cell), after each strip is imaged, a motorized stage may move the sample in the X direction a distance corresponding to the strip width. In such embodiments a tilt map may be generated and used for each sample strip (e.g., operations 610-640 may be applied to each sample strip).

Operation 630 includes updating the tilt map for the next imaging cycle. Over time, the topography of the sample may change due to thermal expansion (e.g., due to excitation or other light sources that raise the temperature of the sample) and/or due to other changes in the sample. As such, to account for potential changes in the sample topography, the tilt map may be updated for every imaging cycle. In alternative embodiments, the tilt map may be updated after a predetermined number of imaging cycles. To update the tilt map in advance of a next imaging cycle, tilt map measurements for a next imaging cycle may be made during a current imaging cycle. The optical imaging system may utilize the same mechanism utilized to generate the original tilt map in order to generate the updated tilt map.

Operation 640 includes scanning the sample on the sample holder during the next imaging cycle, and adjusting a tilt of the sample at each of the sample locations during the next imaging cycle by causing the one or more actuators to tilt, in accordance with the updated tilt map, the sample holder along at least the scan direction. Operations 630-640 may iterate until all imaging cycles (e.g., sequencing cycles) are completed. In the case of a sequencer, each imaging cycle described above may correspond to a sequencing cycle.

To illustrate one particular implementation of a system that generates a "tilt trajectory" in advance of tilting a sample during image scanning, it is instructive to consider an example system that utilizes a controller of an assembly 300 to make dynamic corrections during the duration of each scan of a flow cell. For example, consider an optical imaging system that images a flow cell and has the following parameters: a scan rate of 1 Hz, a dynamic detilt servo update rate of about 10 Hz, a tile θY capture rate of about 100 Hz, 99 tiles per scan swath, 2 surfaces per flow cell (top and bottom), 2 flow cells per instrument, 8 lanes per flow cell surface, and 4 scans per flow cell lane. In this embodiment, the system may make 128 scans per sequencing cycle.

In the foregoing example, it is assumed that at least 10 measurements per scan swath are needed to characterize the required tilt correction (about 1 correction for every 10 tiles). Accordingly, a set of correction tables with 10 entries per table and 1 table per scan may be created for an entire sequencing cycle, requiring a total of 128 10-entry tables per imaging cycle. Each correction entry may be based on centroid calculations made at each of the 10 measurement points along each scan (e.g., using dual projection beams as described above). These tables may be stored at a controller of the TTA. To minimize energy inputs into the instrument structure and to maximize the quality of detilt correction in this example, a smooth detilt trajectory may be determined. The detilt trajectory may be created using a smooth curve fit, rather than performing a piece-wise linear correction between subsequent entries in the table. If, for example, the curve fit interpolates 9 points between each entry (plus 5 points at the beginning of the scan, and 5 points at the end of the scan), then the total number of corrections per scan will be 100, requiring a tip/tilt update rate of 100 Hz for a scan rate of 1 Hz. To generate the smooth detilt trajectory, a mathematical operation such as a cubic Hermitian fit may be applied to all data collected, which has the benefit of specifying both position and slope at all target trajectory points.

In this example, the first set of correction tables for the first sequencing cycle may be created by scanning the flow cells prior to the start of sequencing. Subsequent sequencing cycles may use correction tables that are updated based on the centroid calculations made during each of the previous cycle's scans. One advantage of this example approach is that it may avoid the requirement of a low-latency link between the centroid calculation and the controller of the TTA. The controller may have sufficient time to update the 128 tables for the next sequencing cycle, during the inter-cycle timeframe, or, it may update each table for the next sequencing cycle in the background as it completes each scan in the current sequencing cycle.

Figure 22:
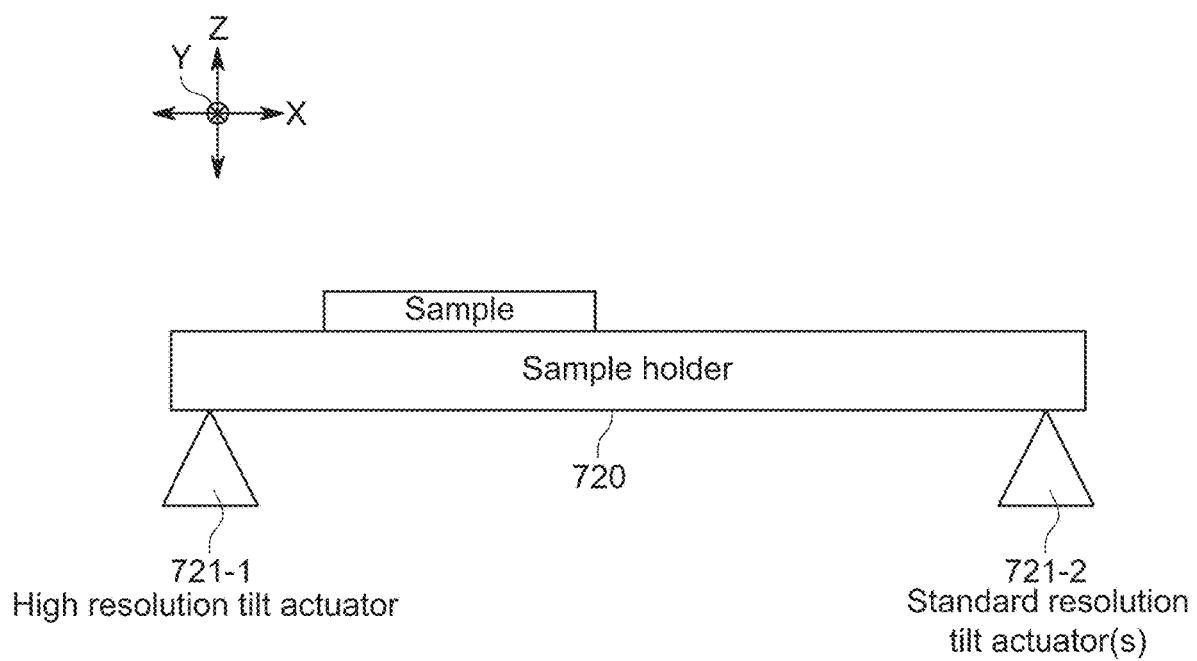
FIG. 22 is a block diagram illustrating an example mechanism for tilting a sample holder, in accordance with some implementations of the disclosure.

FIG. 22 is a block diagram illustrating an example mechanism for tilting a sample holder 720. In this example, only high resolution tilt actuator 721-1 is configured to tilt the sample holder 720 during a sample imaging cycle (e.g., by moving the holder up and down). The standard resolution tilt actuator(s) 721-2 may adjust global tilt of the sample holder 720 in between imaging cycles. For example, in the case where the actuators correspond to actuators 304 of assembly 300, the actuators 304 shown on the right side of FIG. 13 may be fixed during image scanning, and actuator 304 shown on the left side of FIG. 13 may dynamically tilt the sample up and down during image scanning.

FIGS. 23A-23C illustrate one example implementation for generating a tilt map in accordance with some implementations of the disclosure. In particular, FIG. 23A is an operational flow diagram illustrating an example method of determining a tilt map along a scanning direction. The method may be implemented, for example, to generate an initial tilt map prior to beginning imaging of a sample (e.g., operation 610), and during each imaging cycle to generate a tilt map for a subsequent imaging cycle (e.g., operation 630). In this example, the tilt map be determined using an optical assembly that projects dual focusing beams on a surface of the sample (e.g., optical assembly 202).

Operation 810 includes scanning the sample in a scanning direction along multiple sample locations of the sample by projecting a pair of beam spots on a surface of each sample location. Operation 820 includes estimating, for each sample location of the multiple sample locations, based at least on a separation distance of the pair of beam spots, a height of the sample location. For example, as depicted by FIG. 23B, a focus tracking module or other suitable module may project a pair of spot beams on a surface of the sample over different sample locations in the scanning direction, and an image may be captured using an image sensor of the optical imaging system. The sensor using to capture the image of the projected pairs of spot beams may be the same as the image sensor used to capture an image of the sample, or it may be a different image sensor. As discussed above, the separation distance of the imaged spot beams may be mapped to the distance between the objective and surface of the sample. As such, the spot beam separation may be mapped to sample height for a given sample location.

Operation 830 includes calculating, based on the heights of the multiple sample locations, a tilt of the sample along the scanning direction. For example, based on the estimated height of two adjacent sample locations, and a separation distance of the two sample locations, a tilt slope and angle may be determined between adjacent locations.

Operation 840 includes generating, based on the tilt of the sample along the scanning direction, a tilt map comprising multiple entries corresponding to multiple sample tilt locations, each entry indicative of an amount to tilt the sample along the scanning direction for a corresponding sample tilt location. In some implementations, the tilt map entries correspond to each of the sample locations on which a pair of beam spots were projected. For example, each entry may indicate a tilt angle, a tilt slope, or a tilt height for each of the sample locations on which a pair of beam spots were projected. In some implementations, to minimize energy inputs into the instrument structure and to maximize the quality of detilt correction, the tilt map may be created to provide a smooth detilt trajectory. In such implementations, a smooth curve fit may be performed between the entries corresponding to the initial spot beam measurements. By way of illustration, FIG. 23C illustrates a smooth tilt trajectory generated by interpolating between five initial entries. In this illustration, the dark dots may correspond to the five initial entries generated by the spot beam separation measurements. The gray dots may represent additional entries added by interpolation. During sample imaging, each tilt map entry may subsequently be read by a controller of a TTA to cause an actuator to tilt a sample holder.

While the foregoing examples have primarily been described in the context of determining sample tilt along the scanning direction (Y direction), it may also be important to account for sample tilt in a direction orthogonal to the scanning direction (X direction). To this end, and as further illustrated by FIGS. 24A-24C an optical imaging system may utilize a focusing system that generates at least two pairs of beam spots in order to account for tilt in both directions.

In particular, FIG. 24A is an operational flow diagram illustrating an example method of determining a tilt map along a scanning direction and a direction orthogonal to the scanning direction. The method may be implemented, for example, to generate an initial tilt map prior to beginning imaging of a sample (e.g., operation 610), and during each imaging cycle to generate a tilt map for a subsequent imaging cycle (e.g., operation 630). In this example, the tilt map be determined using an optical assembly that projects at least two pairs of focusing beams on a surface of the sample (e.g., optical assembly 202).

Operation 910 includes scanning a sample in a scanning direction along multiple sample locations of the sample by projecting two pair of beam spots on a surface of each sample location. Operation 920 includes estimating, for each sample location of the multiple sample locations, based at least on a separation distance of each of the two pairs of beam spots, a height of the sample location, and a tilt of the sample location in a second direction substantially orthogonal to the scanning direction.

Figure 24C:
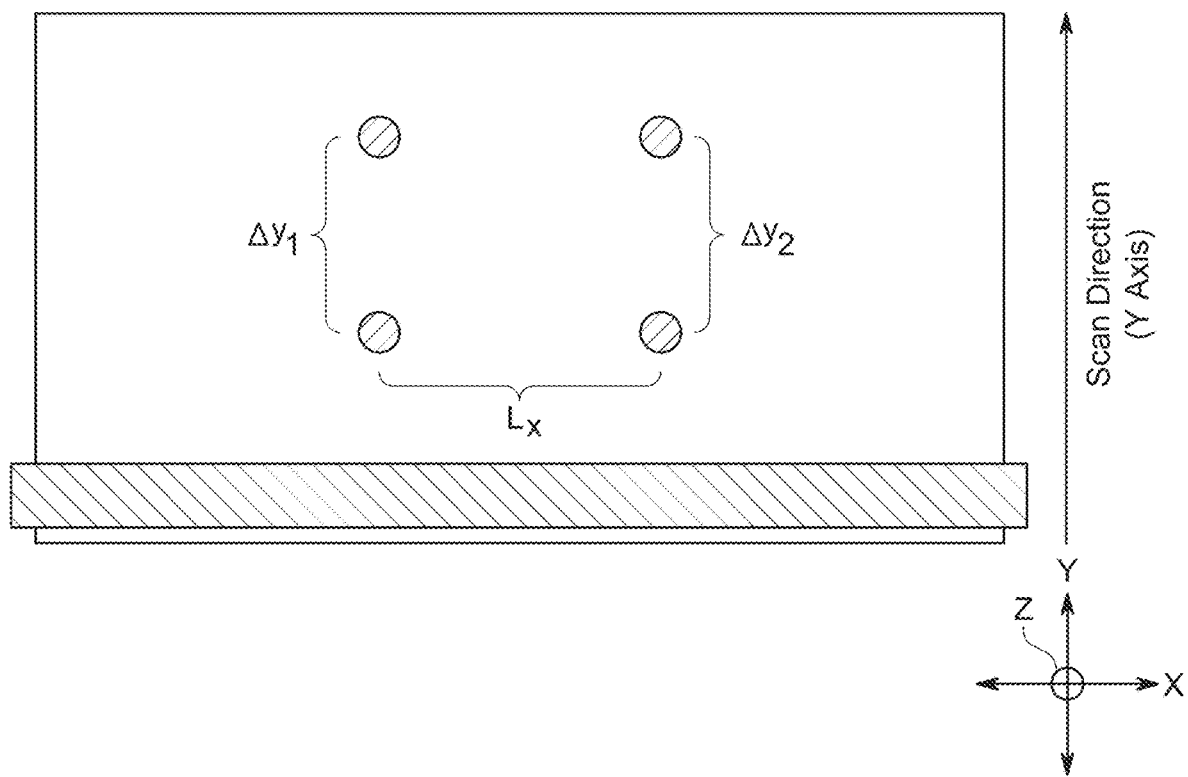
FIG. 24C depicts a process of utilizing two pairs of project spot beams to determine tilt of a sample in a scanning direction and a direction orthogonal to the scanning direction, in accordance with some implementations of the disclosure.

As depicted by FIGS. 24B-24C, a focus tracking module or other suitable module may project two pair of spot beams on a surface of the sample over different sample locations in the scanning direction. In contrast to prior embodiments where each pair of spot beams was separated along the X-axis, in this embodiment each pair of spot beams is rotated 90 degrees and separated along the scanning axis (Y-axis). For example, referring to FIG. 24C, a first pair of spot beams is separated by Δy1 along the Y-axis, and a second pair of spot beams is separated by Δy2 along the Y-axis. In this example, the height of the sample at the center of the field of view of the sample location may be estimated from the beam spot separation Δy1 and beam spot separation Δy2 as follows. The first beam spot separation may be mapped to a first sample height, the second beam spot separation may be mapped to a second sample height. The average between the first and second sample heights may be determined. Alternatively one of the two sample heights may be selected as the sample height for the location. In addition to determining the sample height, the difference between the separations (Δy1, Δy2) of the two beam spot pairs, and the distance ($L_x$) between the two beam spot pairs may be used to determine a tilt along the X direction.

Operation 930 includes calculating, based on the heights of the multiple sample locations, a tilt of the sample along the scanning direction, and a tilt of the sample along the second direction. Operation 940 includes generating, based on the tilt of the sample along the scanning direction and the tilt of the sample along the second direction, a tilt map. As before, the tilt map may include multiple entries corresponding to multiple sample tilt locations. In this case, each entry may indicate an amount to tilt the sample along both the scanning direction and a direction substantially orthogonal to the scanning direction for a corresponding sample tilt location. Such a tilt map may also be referred to as a "tip-tilt map". During sample imaging, each tilt-tip map entry may subsequently be read by a controller of a TTA to cause one or more actuators to tilt and tip a sample holder along both the X and Y axes as needed.

It should be appreciated that although the foregoing examples have been described in the context of generating a tilt map in the scanning direction or both the scanning direction and a direction orthogonal to the scanning direction, the above-described techniques may be applied to generate a tilt map for just the direction orthogonal to the scanning direction.

Although the foregoing examples for enabling dynamic tilting of a sample have been primarily described in the context of an imaging system that utilizes a tilt map that may be updated after every imaging cycle or some multiple of imaging cycles, it should be appreciated that the foregoing examples could also be used in an embodiment that utilizes a feedback detilt mechanism that does not rely on tilt maps that are generated in advance of scanning in area. For example, method of FIG. 23A or 24A may be adapted such that the tilt measurements (e.g., as determined for each sample location) are directly provided to a tilt controller that adjusts one or more tilt actuators in response to receiving the measurements. In such implementations, the frequency at which the sample holder is tilted may be the same as, greater than, or less than the frequency of scanning.

In the foregoing examples, depending on system requirements, the relative positioning between the projected beam spots (e.g., two pairs of beam spots) used to capture tilt measurements and the projected excitation light (e.g., scan line) used to capture sample images may vary. For example, although FIG. 24C illustrates the two pairs of beam spots being projected ahead of the scan line in the scanning direction, in some implementations one of the two pairs of beam spots may be projected ahead of the scan line, and another of the pair of beam spots may be projected behind the scanline. In other implementations, both pairs of beam spots may be projected behind the scan line. In yet other implementations, one of the pairs of beam spots may be projected on the scan line.

Figure 25A:
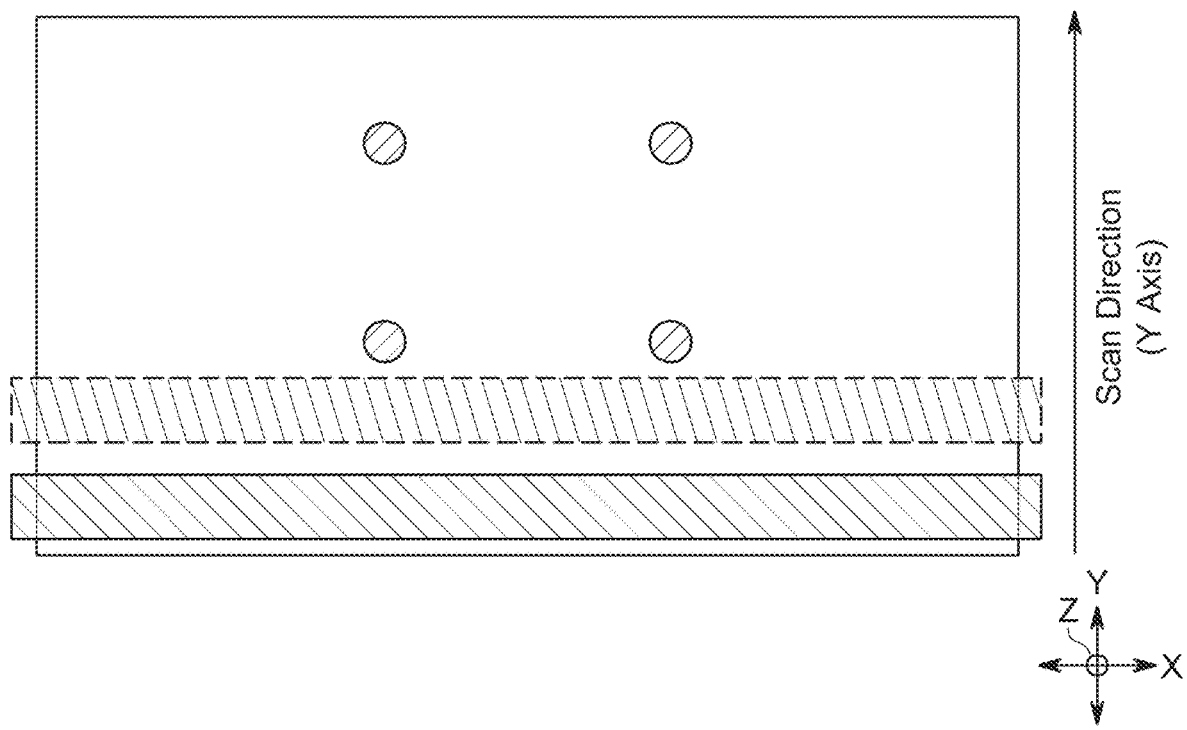
FIG. 25A illustrates one relative orientation of two pairs of projected beam spots and two scan lines in a two-channel, line-scanning imaging system, in accordance with some implementations of the disclosure.
Figure 25B:
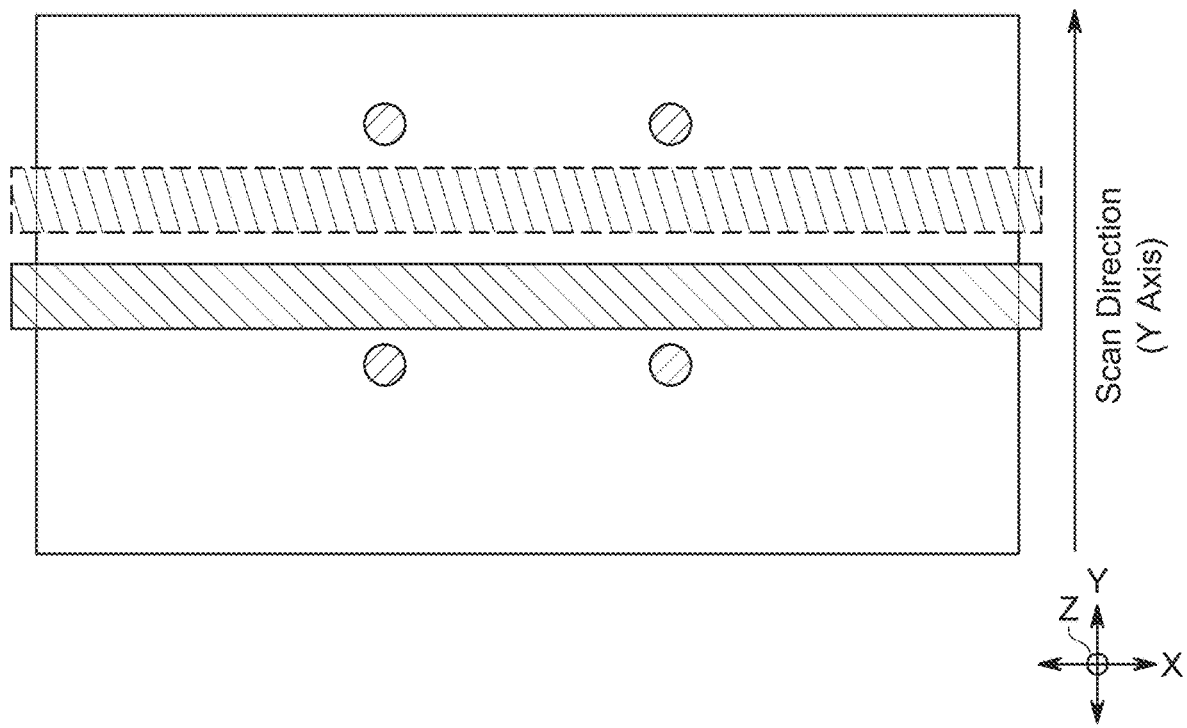
FIG. 25B illustrates another relative orientation of two pairs of projected beam spots and two scan lines in a two-channel, line-scanning imaging system, in accordance with some implementations of the disclosure.
Figure 25C:
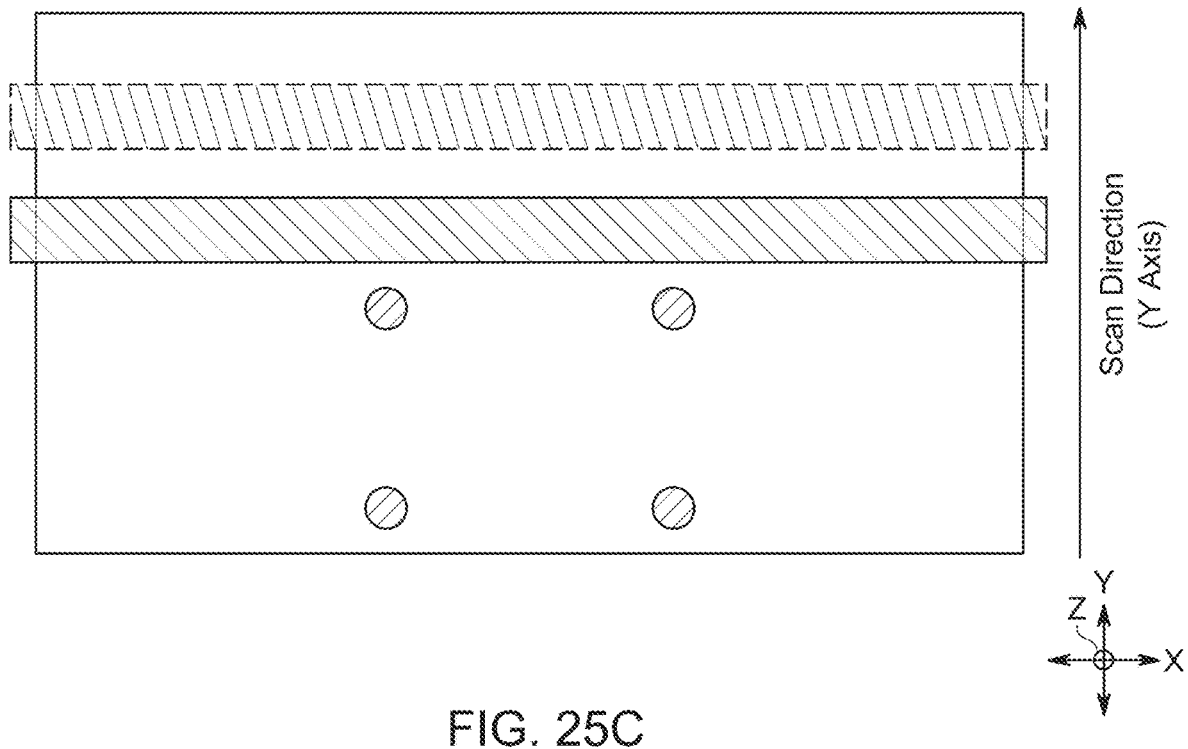
FIG. 25C illustrates another relative orientation of two pairs of projected beam spots and two scan lines in a two-channel, line-scanning imaging system, in accordance with some implementations of the disclosure.
Figure 25D:
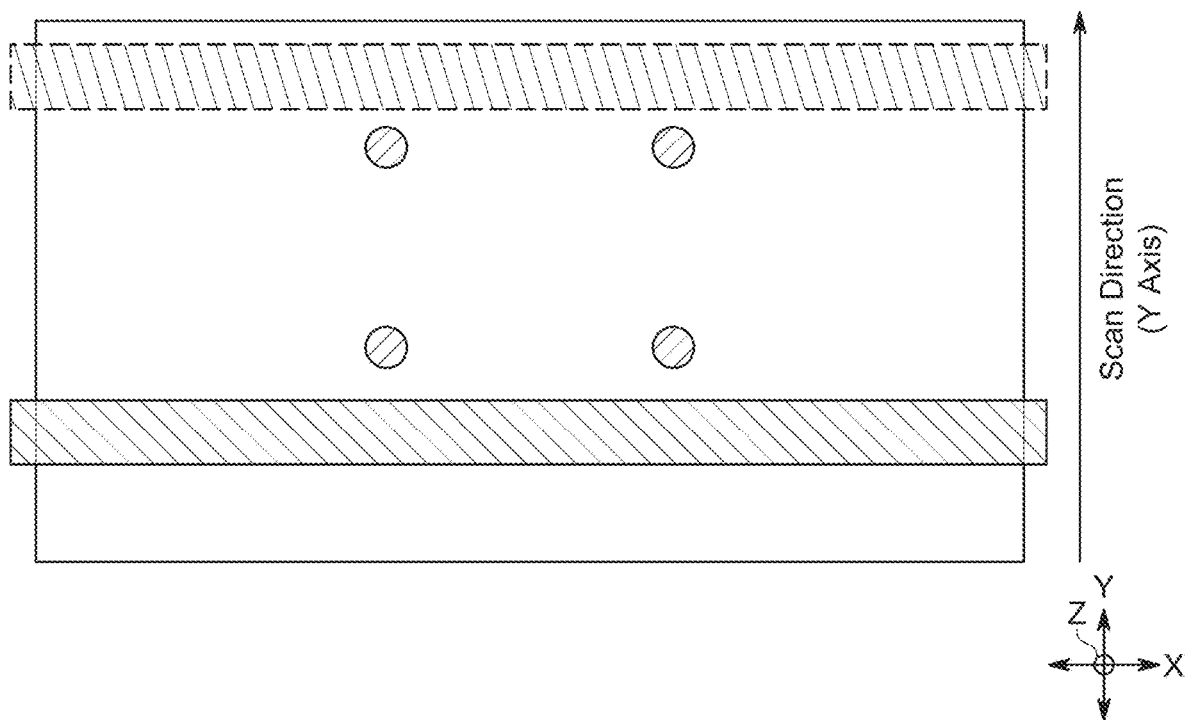
FIG. 25D illustrates another relative orientation of two pairs of projected beam spots and two scan lines in a two-channel, line-scanning imaging system, in accordance with some implementations of the disclosure.
Figure 25E:
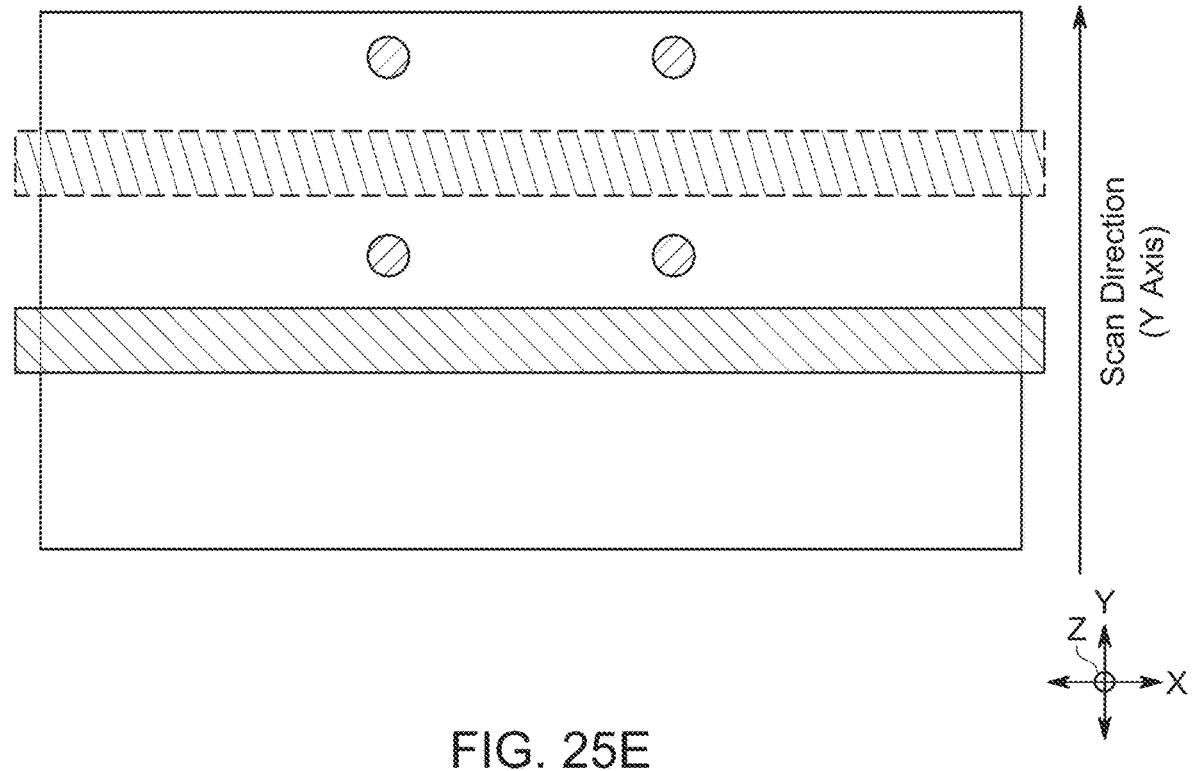
FIG. 25E illustrates another relative orientation of two pairs of projected beam spots and two scan lines in a two-channel, line-scanning imaging system, in accordance with some implementations of the disclosure.
Figure 25F:
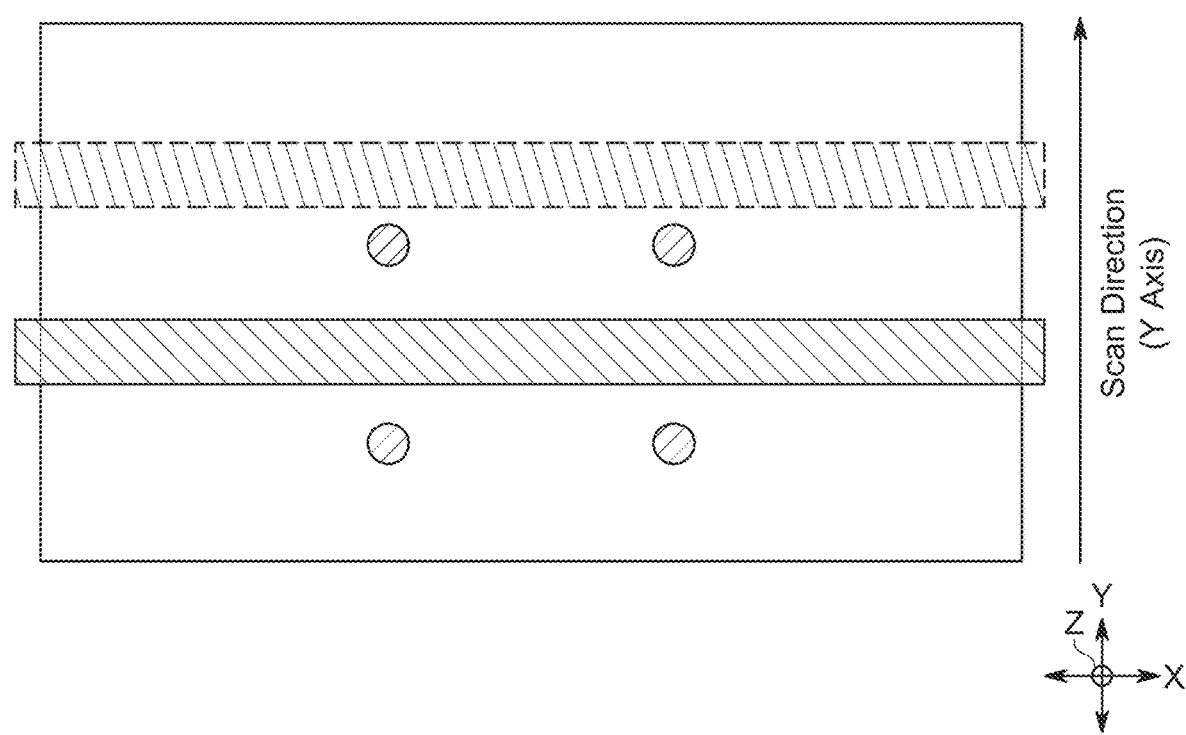
FIG. 25F illustrates another relative orientation of two pairs of projected beam spots and two scan lines in a two-channel, line-scanning imaging system, in accordance with some implementations of the disclosure.

Likewise, in multi-channel, line-scanning imaging systems that utilize multiple excitation light sources to image the sample, the relative orientation between the multiple scan lines and the projected pairs of beam spots may vary. For example, FIGS. 25A-25F illustrate the relative orientation of two pairs of projected beam spots and two scan lines (e.g., laser lines) in a two-channel, line-scanning imaging system, in different configurations. In FIG. 25A, both pairs of beam spots are projected ahead of both scan lines. In FIG. 25B, one pair of beam spots is projected ahead of both scan lines, and one pair of beam spots is projected behind both scan lines. In FIG. 25C, both pairs of beam spots are projected behind both scan lines. In FIG. 25D, both pairs of beam spots are projected ahead of one scan line and behind the other scan line. In FIGS. 25E-25F, one pair of beam spots is projected ahead of one scan line, and the other pair of beam spots is projected behind the same scan line.

Figure 26:
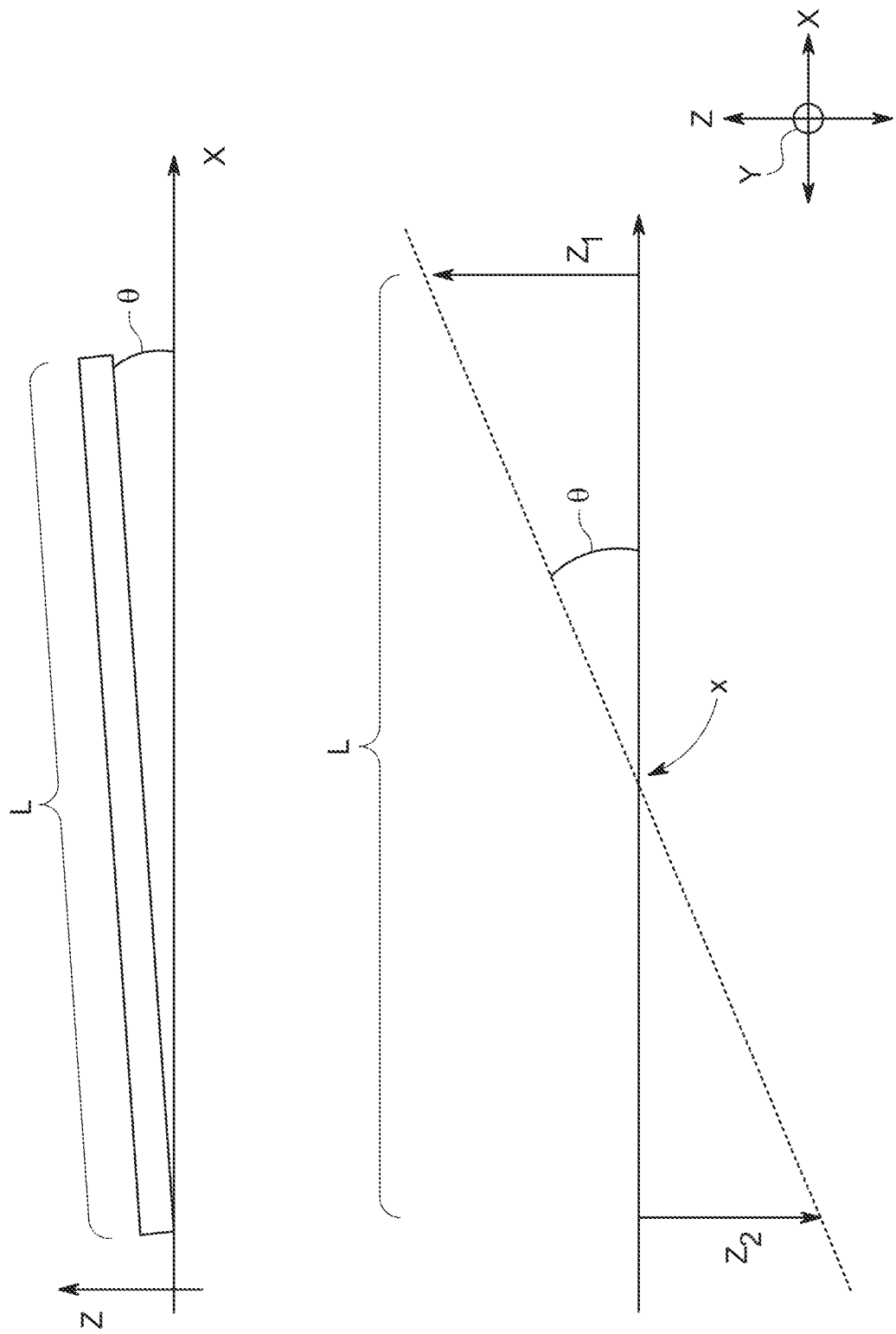
FIG. 26 conceptually illustrates an advantage of using multiple tilt actuators, in accordance with some implementations of the disclosure.

FIG. 26 conceptually illustrates an advantage of using multiple tilt actuators, in accordance with some implementations of the disclosure. As depicted by the top diagram, when a single tilt actuator is used, the tilt/rotation axis may be off center from the sample surface being scanned. Depending on the lever arm L, dynamically changing the tilt may result in a latency induced error due to the z displacement, and the x-position of sample features may be shifted as the sample holder is tilted up and down. To overcome this problem, multiple tilt actuators may be used in some implementations to change the position of the tilt axis such that it is closer to or centered on the sample area being scanned. For example, as depicted by the bottom diagram, the rotation axis, x, can be changed by moving z1 and z2 simultaneously, where $$\frac{x}{L} = \frac{z_2}{z_2 - z_1}.$$

In one embodiment, using multiple tilt actuators, the tilt axis can be chosen to be at the swath center for every swath of a flow cell that is scanned. In one embodiment, three tilt actuators are utilized to ensure that the tilt axis is centered.

Figure 27:
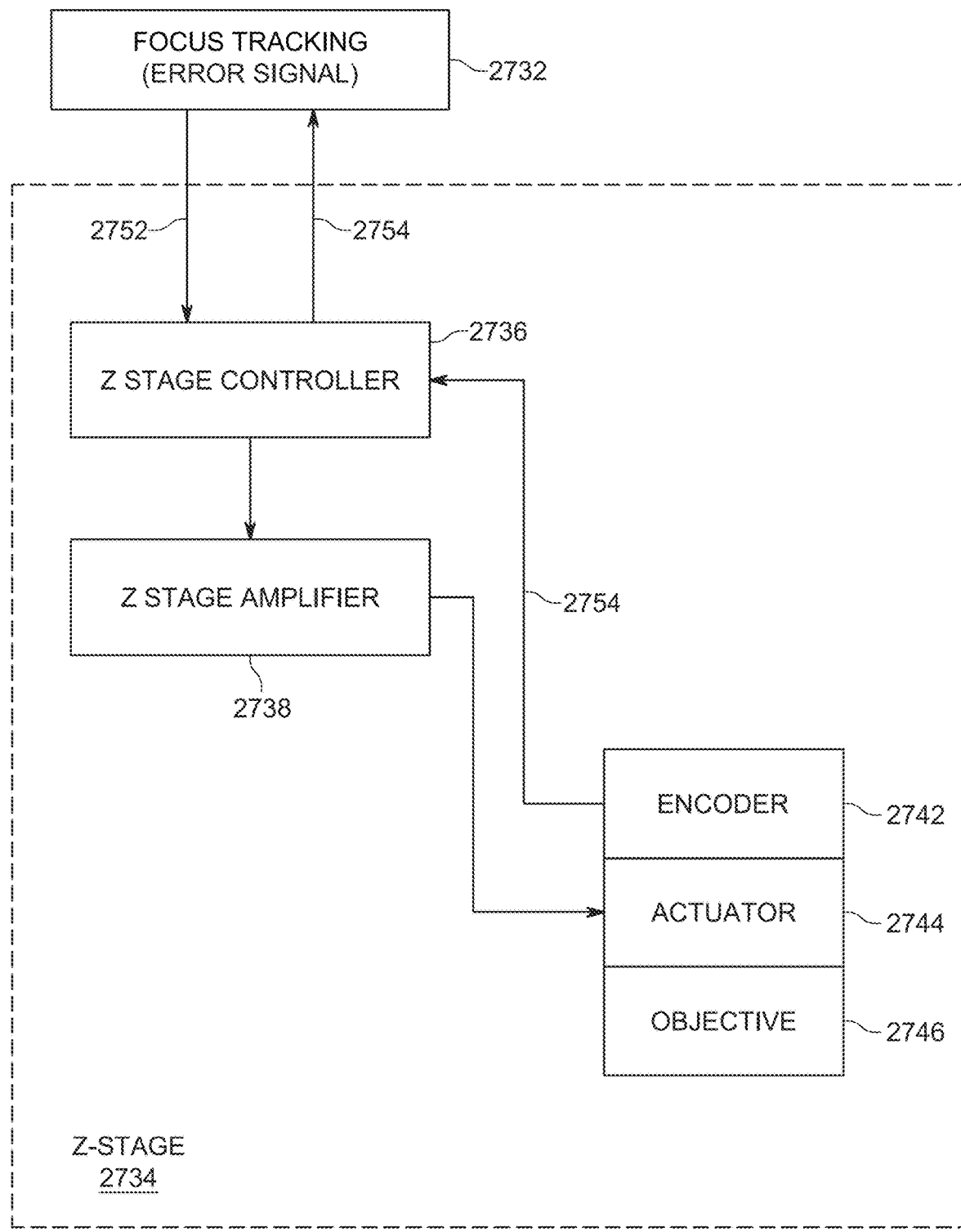
FIG. 27 is a block diagram illustrating some components of an example focus control system for focus tracking, in accordance with some implementations of the disclosure.

Although some of the foregoing examples have been described in the context of using spot-beam separation measurements to enable dynamic tilting of a sample holder to keep a sample within focus during image scanning, it should be appreciated that these measurements can also be utilized to move a Z-stage to provide movement of an objective lens relative to a sample container to keep the sample in focus. For example, one or more actuators can be configured to move the objective and/or sample container in the z-direction while maintaining the sample within a focal region of a focal plane of the imaging system. To illustrate, FIG. 27 is a block diagram illustrating some components of an example focus control system for focus tracking in accordance with some implementations of the disclosure. This example focus control system includes focus tracking circuitry 2732 that is configured to determine focus settings that are used to generate a drive signal that drives a focus tracking feedback loop in a Z-stage 2734. In the example of FIG. 27, commands 2752, based on the focus settings difference, are fed to the Z-stage 2734. In this example, the Z-stage 2734 is configured to move the objective lens 2746. In other implementations, it may move a stage holding the sample holder. Actuator 2744 moves the optical stage, and in particular the objective lens 2746, in response to the drive signal provided by the Z-stage amplifier 2738. The actuator 2744 can include a piezoelectric actuator, a voice coil actuator, a motor, or other like actuators. An encoder 2742 can provide information about the actuator position and its movement. This encoder information 2754 can be fed back through the z-stage controller 2736 to focus tracking circuitry 2732 and can be used in determining the error signal.

Figure 28:
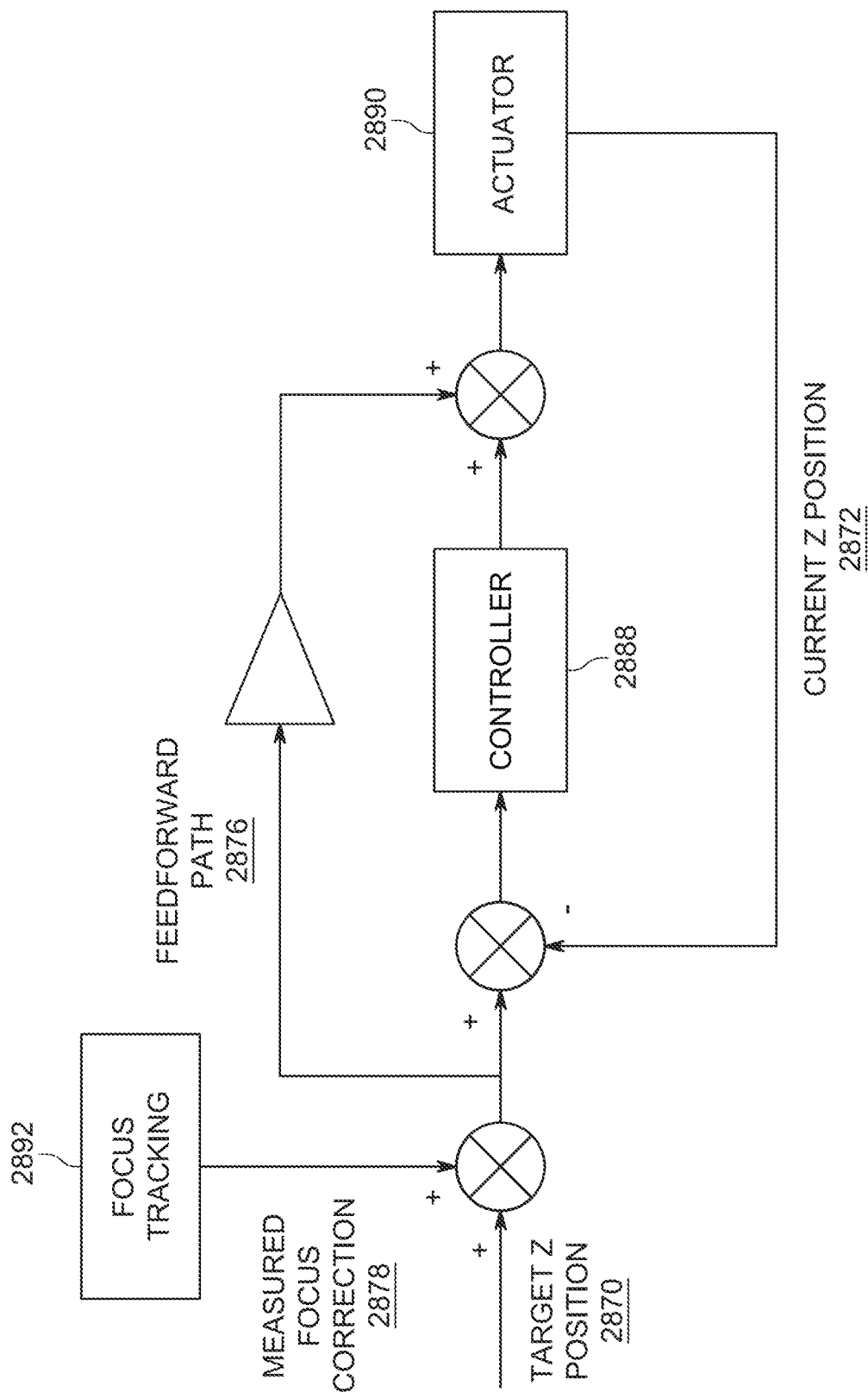
FIG. 28 is diagram illustrating an example architecture for a Z-stage controller in accordance with some implementations of the disclosure.

FIG. 28 is diagram illustrating an example architecture for a Z-stage controller in accordance with some implementations of the disclosure. This example incorporates feedback and feedforward control. In operation, a target focus setting (e.g., target z position 2870 as determined using spot separation measurements) is used to command the position of the Z-stage. The target z position 2870 is provided to controller 2888, which determines the drive signal needed to command actuator 2890 to position the Z-stage. Controller 2888 may also include drive circuitry to generate the drive signal. The drive signal determination can be made using the magnitude of the difference between the target focus setting (e.g., target z position 2870 as determined by most recent spot separation measurements) and the current focus setting (current z position 2872 as determined by past spot separation measurements) which can be provided, for example, by actuator 2890. In this example, the drive signal used to drive the actuator is adjusted by the signal from the feedforward control path 2876, and measured focus correction signal 2878 is generated by focus tracking circuitry 2892. The correction information can be determined, for example, using lookahead predictive focus tracking or predictive focus tracking based on focus history data, or using other predictive focus tracking techniques. For example, focus settings can be stored electronically in a history file in memory so that they can be recalled for later use during scanning operations. The history file or the information therein can be tagged to be identified as containing the focus information for a particular sample container. The correction information can be added to the commanded stage position to adjust the drive signal according to the slope of the change in the focus setting for scanning operations.

More generally, the technology described herein can be implemented by creating, based on a sample tilt measurement, a relative tilt between the sample and an image sensor that images the sample by adjusting any component of the optical imaging system along the imaging light path from the sample to the sample image sensor. As such, based on a sample tilt measurement, the system can instead be configured to tilt an image sensor that images the sample, a camera carrying the sample image sensor, and/or a sample holder. Other optical components along the sample imaging/light path from the sample to the sample image sensor can be tilted and/or otherwise adjusted to create the relative tilt between the sample and the image sensor that images the sample. Such optical components can include, for example, the objective or one or more mirrors that receive light corresponding to an image of the sample.

Adjustments to imaging system components other than a sample holder (e.g., adjustments to one or more mirrors and/or an image sensor) to account for sample tilt can be made based on real-time tilt measurements that are communicated to one or more controllers in real-time, or based on a sample tilt trajectory calculated in advance of detilting during image scanning, as described above with reference to FIGS. 21A-25F. For example, the embodiments of FIGS. 21A, 23A, 24A can be implemented by creating a tilt map including entries corresponding to multiple sample locations, where each entry is indicative of an amount to tilt an image sensor or otherwise adjust some optical component of the imaging system to detilt the sample. As such, detilting of a sample can be implemented by tilting or otherwise adjusting, based one or more sample tilt measurements, one or more components of the imaging system along the imaging path from the sample to the sample image sensor. The tilting or adjustment of the one or more optical components can be controlled using one or more system controllers.

In implementations where the sample container is a flow cell, tilt adjustments can occur after every swath, multiple times per swath, after every tile, or some other subsection of the sample container. Such adjustments can account for sample tilt along one axis (e.g., tilt along the scanning direction or a direction substantially orthogonal to the scanning direction), or sample tilt along multiple axes (e.g., tilt along both the scanning direction and a direction substantially orthogonal to the scanning direction). Such embodiments can be implemented with or without a sample holder that is tiltable.

As described above, the optical sequencing systems described herein can map spot beam separation of one or more focus tracking modules to sample height position(s). This mapping can be performed when operating the sequencing system in a focus model generation mode, a sequencing mode, or both. During focus tracking model generation, the system can determine and store information about focus settings of a given sample container to control focusing of the system during real-time imaging. For example, using the one or more focus tracking modules, a sample container can be scanned at each of a plurality of sample locations on the sample container, and focus settings measured and determined for each of the plurality of sample locations.

Figure 29:
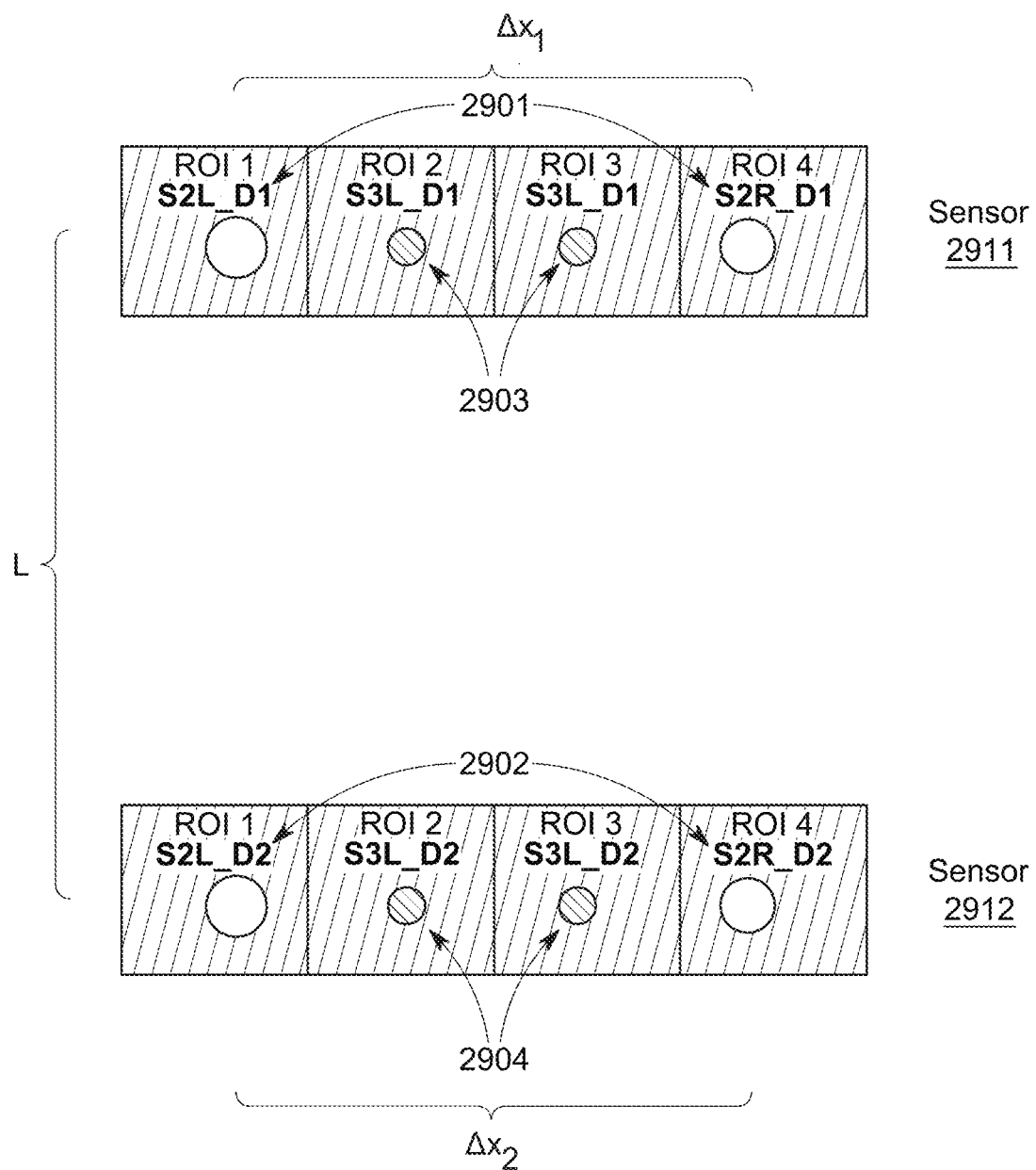
FIG. 29 depicts an example of the design and operation of a focus tracking system that utilizes two pairs of focus tracking spots per sample surface, in accordance with some implementations of the disclosure.
Figure 30A:
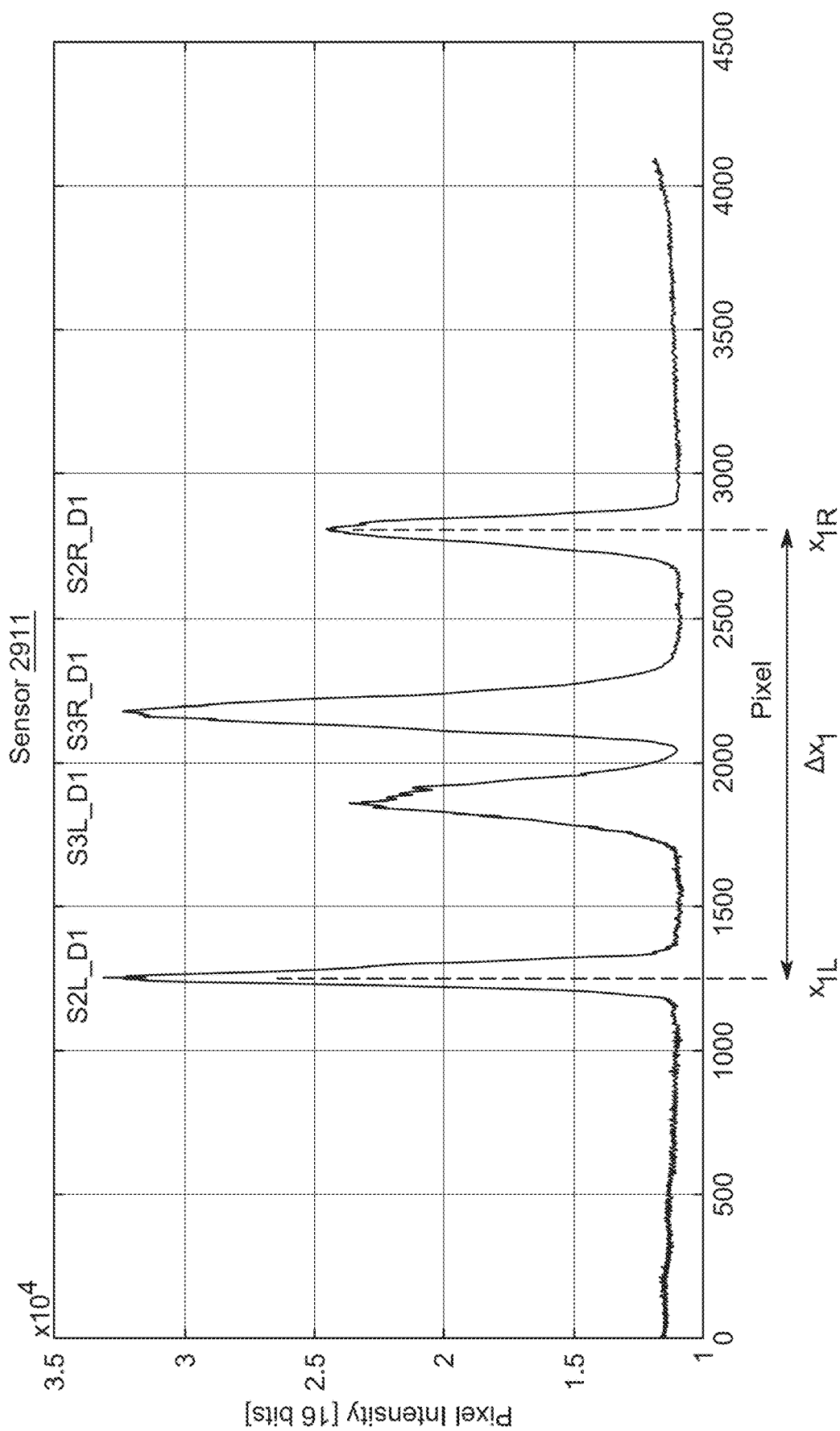
FIG. 30A depicts pixel intensity as a function of pixel number for one of the sensors of FIG. 29, after incidence of light corresponding to spot pairs.
Figure 30B:
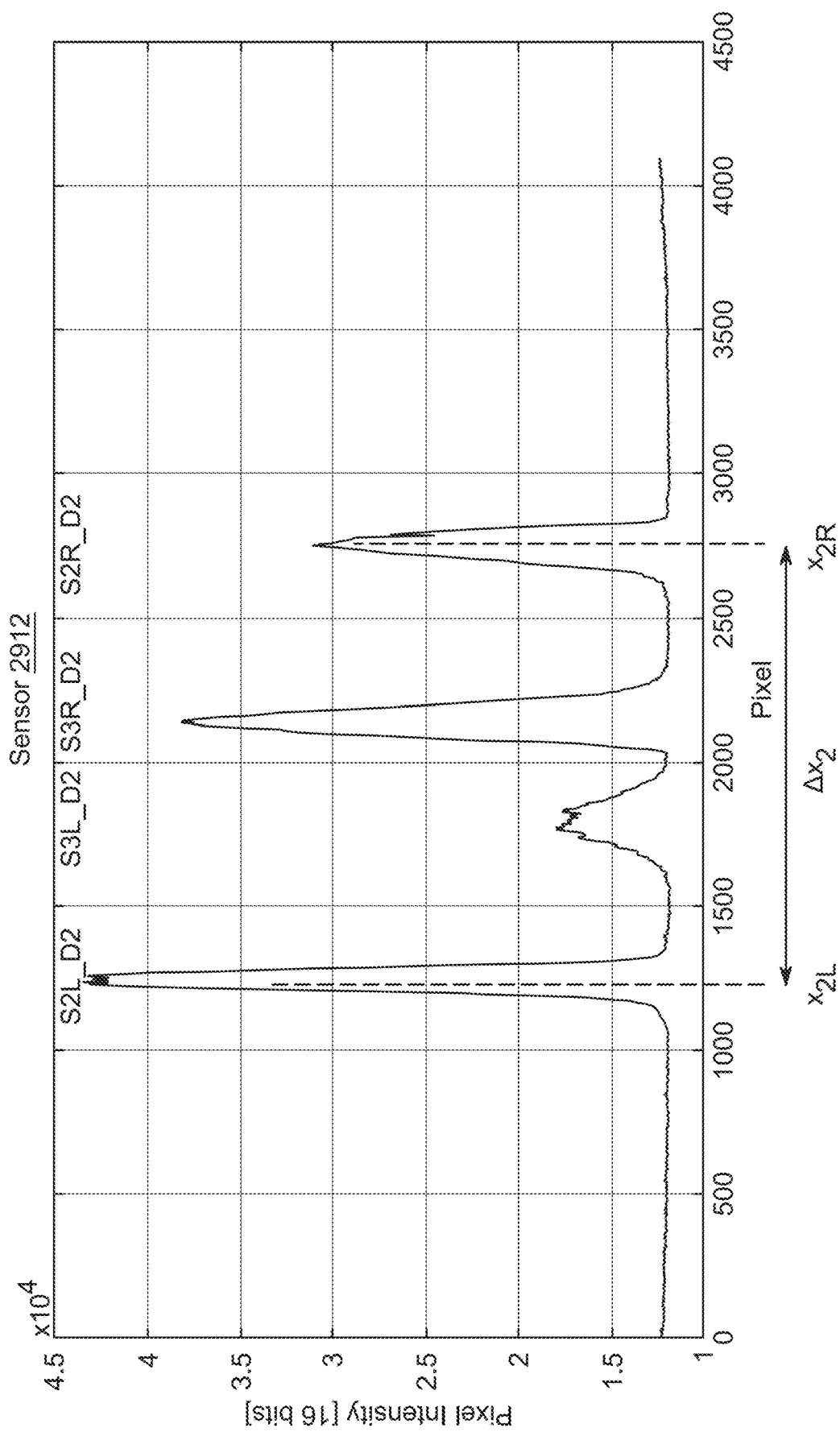
FIG. 30B depicts pixel intensity as a function of pixel number for the other sensor of FIG. 29, after incidence of light corresponding to spot pairs.

FIGS. 29 and 30A-30B illustrate a particular example of the design and operation of a focus tracking system that utilizes two pairs of focus tracking spots per sample surface, in accordance with some implementations of the disclosure. The focus tracking system utilizes a light beam architecture that projects two pairs of spots onto each of first and second surfaces (e.g., top and bottom surfaces) of a sample container (e.g., flow cell lane). In alternative designs, two pairs of spots may be projected on a single sample surface or more than two sample surfaces.

As depicted by FIG. 29, the two reflected light beams corresponding to each pair of spots are incident upon a surface of a respective sensor 2911, 2912 to form beam spots (e.g., spot pairs 2901, 2902 corresponding to light reflected from the top surface of a sample and spot pairs 2903, 2904 corresponding to light reflected from the bottom surface of sample). For simplicity, the discussion will focus on spot pairs 2901 and 2902 projected on one surface. Spot pairs 2901, 2902 have a respective spot separation $\Delta x_1$, $\Delta x_2$, detected using a respective sensor 2911, 2912. In this example, L is the "lever arm", and ROI refers to a region of interest that can be determined dynamically and set around the peak maximum. For example, the ROI can be set around the peak maximum with a width of two times the full width at half maximum (FWHM). The two sensors can function as parallel linear sensor arrays for spot detection. In some implementations, a respective focus tracking module may be associated with a respective light source that projects two spots and a sensor that detects the two spots. For example, a four-beam system as described herein can be associated with two separate focus tracking modules.

FIG. 30A illustrates pixel intensity as a function of pixel number for the sensor 2911, after incidence of light corresponding to spot pairs 2901 and 2903. As depicted, the spot separation $\Delta x_1$ on the sensor 2911 of the left and right spots corresponding to spot pair 2901 can be calculated by determining the pixel corresponding to the peak intensity of each detected spot, and determining the difference. FIG. 30B illustrates pixel intensity as a function of pixel number for the sensor 2912, after incidence of light corresponding to spot pairs 2902 and 2904. As depicted, the spot separation $\Delta x_2$ on the sensor 2912 of the left and right spots corresponding to spot pair 2902 can be calculated by determining the pixel corresponding to the peak intensity of each detected spot, and determining the difference.

In some implementations, the following parameters can be defined for a four-beam focus tracking system as described above. The average of the spot separation of the two pairs of spots in the sensor plane $\Delta x$ can be defined by Equation (1):

$$\Delta x = \frac{\Delta x_1 + \Delta x_2}{2} \tag{1}$$

Where $\Delta x = \Delta x_0$ at best focus. The change in the relative z-stage to sample container flow cell) position $\Delta z$ can be defined by Equation (2):

$$\Delta z = \frac{\Delta x + \Delta x_0}{DSG} \tag{2}$$

Where DSG (pix/μm) is the differential spot gain from best focus. The difference in spot separation between the two pairs of spots in the sensor plane dx can be defined by Equation (3):

$$dx = \Delta x_1 - \Delta x_2 \tag{3}$$

Where $dx = dx_0$ at zero image tilt. The differential tilt gain (DTG) in pix/μrad can be defined by Equation (4):

$$DTG = \frac{DSG \times L}{10^6} \tag{4}$$

Where L is the spot separation at the sample, in μm. The change in tilt angle about they axis can be defined by Equation (5):

$$\Delta\theta_y = \frac{dx - dx_0}{DTG} \tag{5}$$

Figure 31:
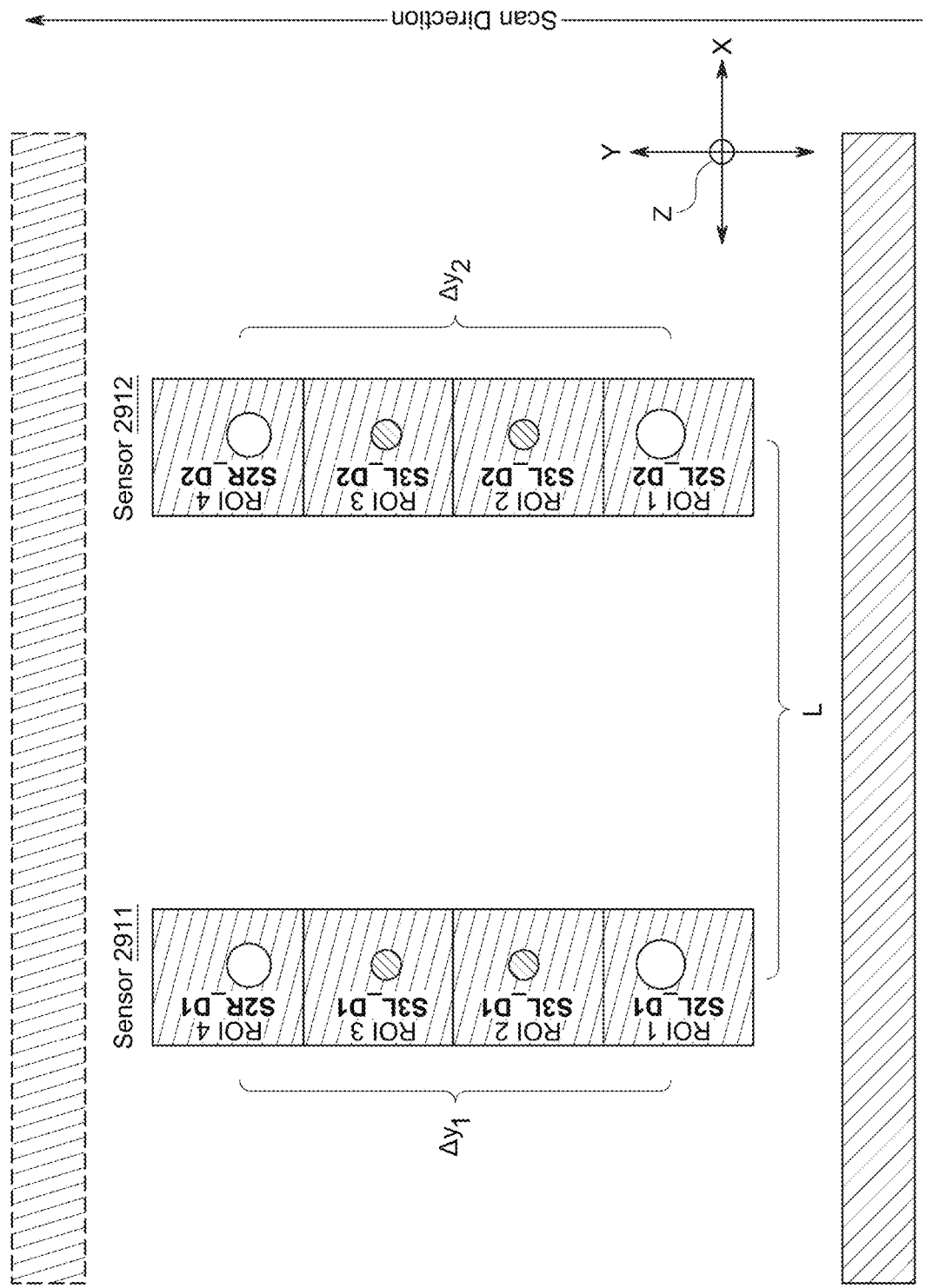
FIG. 31 depicts both the object plane and sensor plane during scanning of a flow cell surface in one example implementation utilizing the focus tracking system described with reference to FIG. 29.
Figure 32:
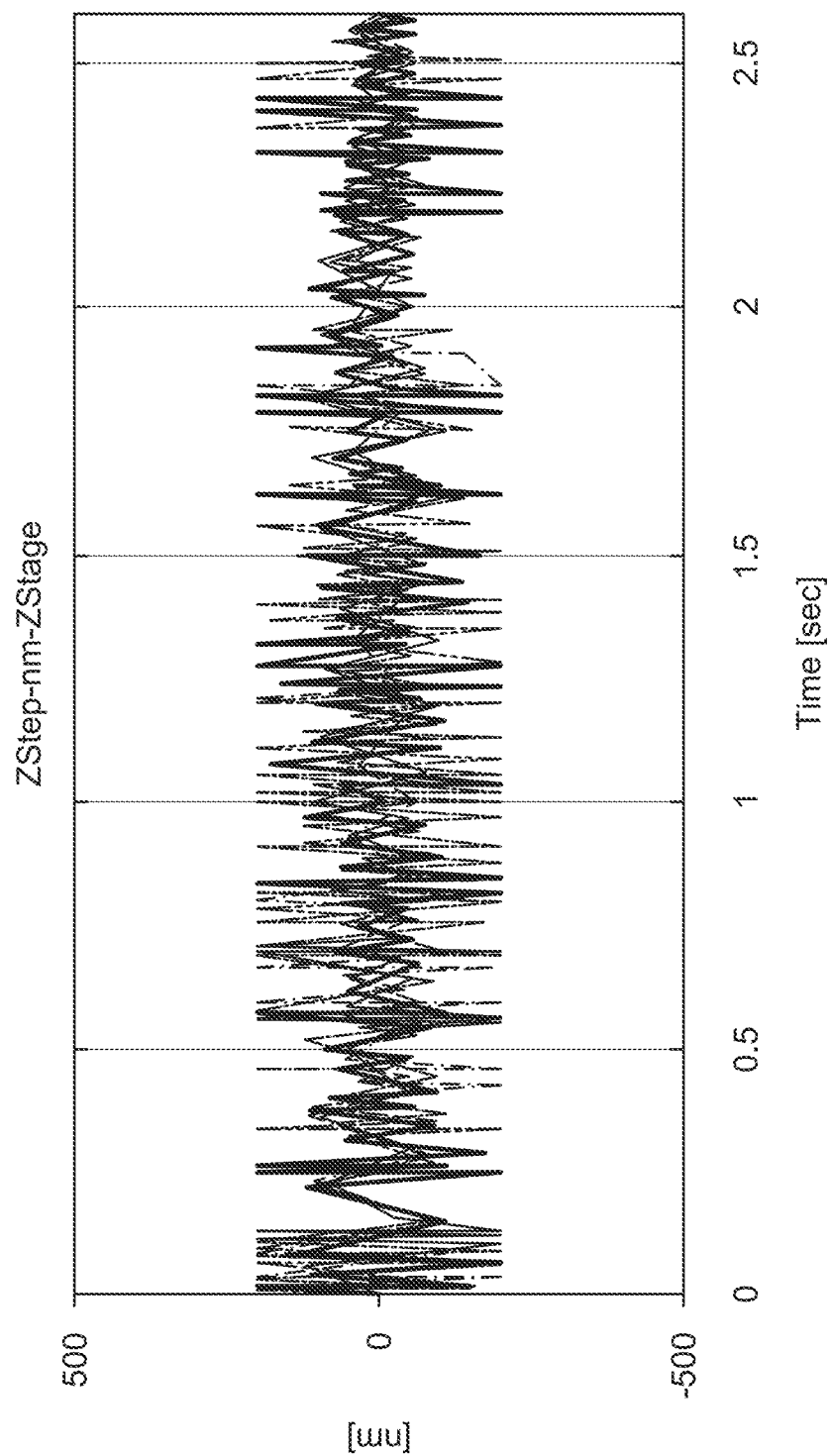
FIG. 32 is a plot showing Z-steps (in nm) as a function of time for a Z-stage used with a focus tracking system that does not implement spot error handling.

FIG. 31 depicts both the object plane and sensor plane during scanning of a flow cell surface in one example implementation utilizing the focus tracking system described with reference to FIG. 29. In this case, $\Delta y_1$ and $\Delta y_2$ refer to spot separation at the surface of the sample, and L refers to the distance between each pair of spots at the flow cell surface. The focus tracking module spots are shown relative to two scanning laser lines. For the purpose of illustration, the sensors 2911, and 2912 with incident light beams are overlaid over the drawing. In one particular embodiment $\Delta y_1$ and $\Delta y_2$ are about 60 μm at best focus, and L is about 900 μm.

Although the imaging systems described herein can utilize estimates of focus tracking spot separations to keep a sample in focus (e.g., by moving a z-stage in the z-direction and/or by tilting a stage holding a sample holder), in some cases it may not be possible to make accurate estimates of spot separations due to "bad spots" caused by an issue with the sample or sample container (e.g., bubbles, defects, debris on the surface), an issue with a sensor (e.g., a glitch in a sensor reading) or some other issue during imaging that affects the readout of one or both spots on a sensor of a focus tracking module. Such issues can cause the detected spot to become saturated or non-Gaussian in nature, which leads to an inaccurate estimate of spot separation. These inaccurate estimates of spot separation can lead to large Z step spikes during focus tracking, which can interact with the Z-stage control loop sensitivity and introduce large errors in movement along the Z direction. This problem illustrated by FIG.

32, which is a plot showing Z-steps (in nm) as a function of time for a Z-stage used with a focus tracking system that does not implement "spot error" handling. These inaccurate estimates of spot separation can also introduce errors in movement of a stage that tilts the sample holder.

To address potential issues with spot errors, some implementations of the disclosure are directed to correcting for spot errors, including potentially inaccurate measurements of spot separation, based at least on prior focus tracking measurements of spot separation. In accordance with some implementations further described below, statistics of prior spot separation measurements, statistics of prior sample tilt measurements, and/or error codes tracking a current condition of measured focus tracking spots can be used to determine what Z-stage and/or tilt adjustments to apply for a given frame, including what spot separation measurements to use for a given frame By virtue of implementing the techniques described herein, a significant improvement in focus tracking performance can be realized. Additionally, the techniques described herein can be implemented to address spot errors and/or spot separation glitches spikes in real-time (e.g., at about a 3.3 kHz update rate).

Although the spot error handling techniques described herein will primarily be described in the context of an imaging system that utilizes two substantially parallel pairs of focus tracking spots that are detected using two substantially parallel sensors, it should be appreciated that the techniques described herein could be applied with focus tracking systems utilizing a single pair of focus tracking spots detected using one or more sensors, focus tracking systems using two substantially parallel pairs of focus tracking spots detected using one or more sensors, or focus tracking systems using more than two substantially parallel pairs of focus tracking spots that are detected using one or more sensors.

Before describing particular implementations of the spot error handling techniques described herein, it is instructive to consider examples of different issues with samples/sample holders and/or sensors that can cause spot errors, focus tracking performance when spot errors are not accounted for, and the improvement in focus tracking performance when spot errors are accounted for in accordance with some implementations of the disclosure. To that end, FIGS. 33A-37C are illustrative.

Figure 33A:
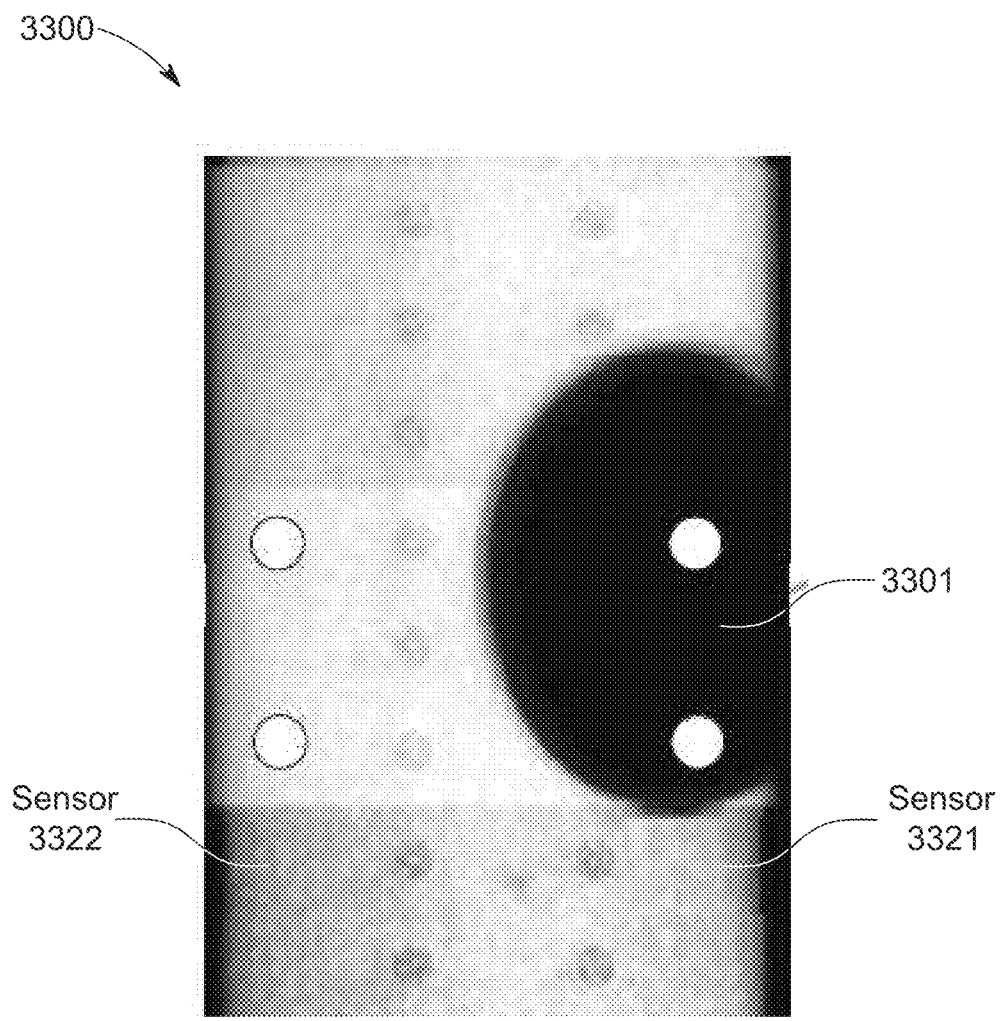
FIG. 33A depicts an image of portion of a flow cell having a large bubble.

FIG. 33A depicts an image of portion of a flow cell 3300 having a large bubble 3301. Overlaid over the image are sensor 3321 and sensor 3322. Sensor 3321 is configured to detect a reflection of a first (right) pair of focus tracking beams, and sensor 3322 is configured to detect a reflection of a second (left) pair of focus tracking beams. The defect 3301 causes higher reflection of the right pair of focus tracking beams. This higher reflection can cause the signal readout of the two reflected light beams incident on sensor 3321 to be saturated, resulting in a noisy sensor signal that does not have clear peak intensity spikes (e.g., corresponding to the center of one or both spots as illustrated in FIGS. 30A-30B) that enables spot separation measurement.

Figure 33B:
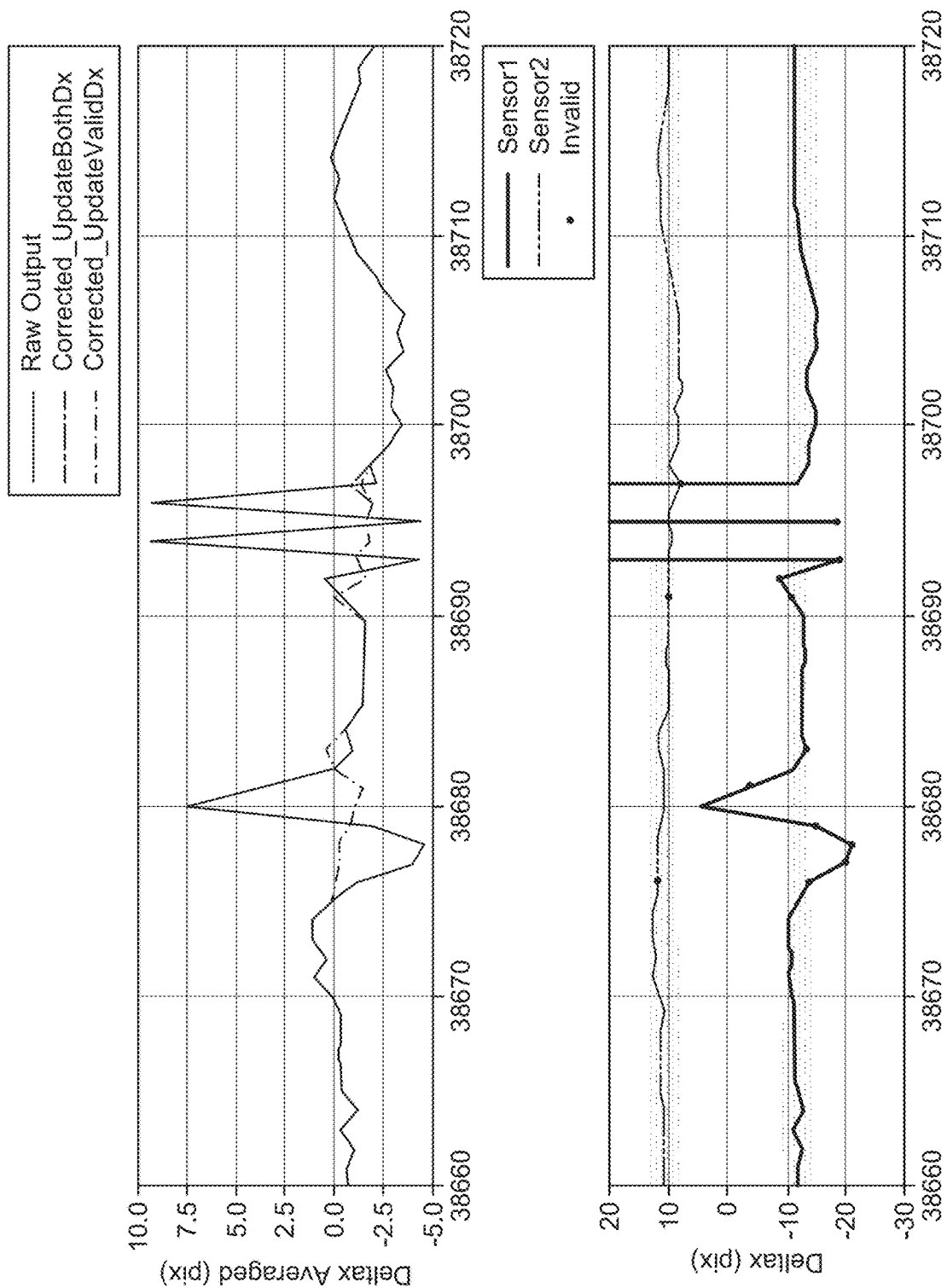
FIG. 33B depicts plots showing focus tracking performance, including a summary of defocus errors, when performing focus tracking on the flow cell of FIG. 33A with spot error handling off.
Figure 33C:
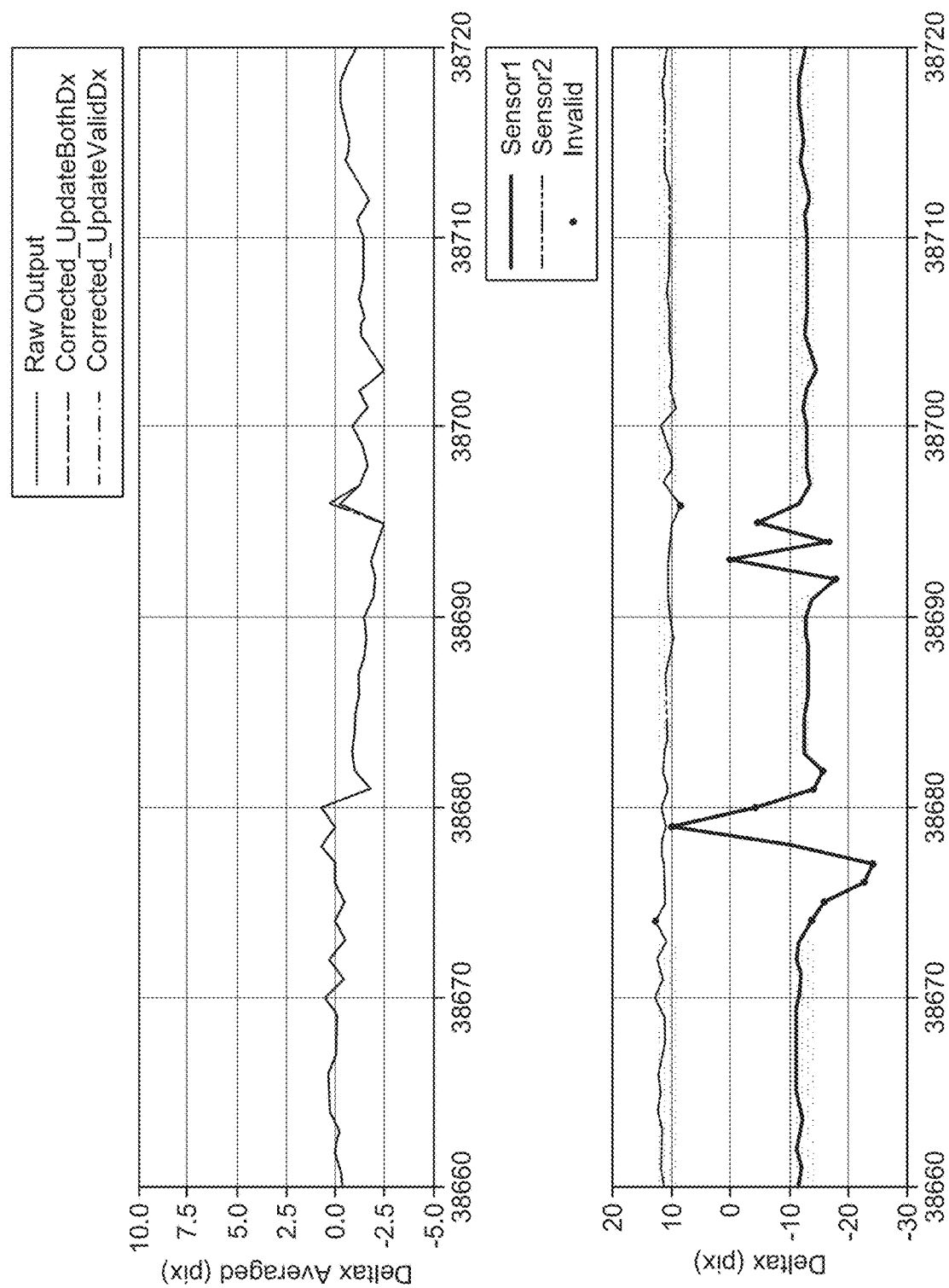

FIGS. 33B-33C depict plots showing focus tracking performance, including a summary of defocus errors, when performing focus tracking on flow cell 3300 with spot error handling off (FIG. 33B) and with spot error handling on (FIG. 33C). In the plots, the x-axis refers to the current focus tracking frame. The y-axis of the bottom plots, measures, for each sensor ("Sensor1" and "Sensor2"), the distance in sensor pixels from the best z focus position. As depicted, the defect occurs between focus tracking frames 38690 and 38700 for sensor 3321 (shown as "Sensor1" in plots). By accounting for spot errors generated by the defect, aggressive Z-stage moves when the focus tracking spots of sensor1 are over defect 3301 can be avoided. As measured, for this flow cell 3300 having defect 3301, focus tracking performance on average improved by about 20 percent. Performance on the worst swath improved by about 50%.

Figure 34A:
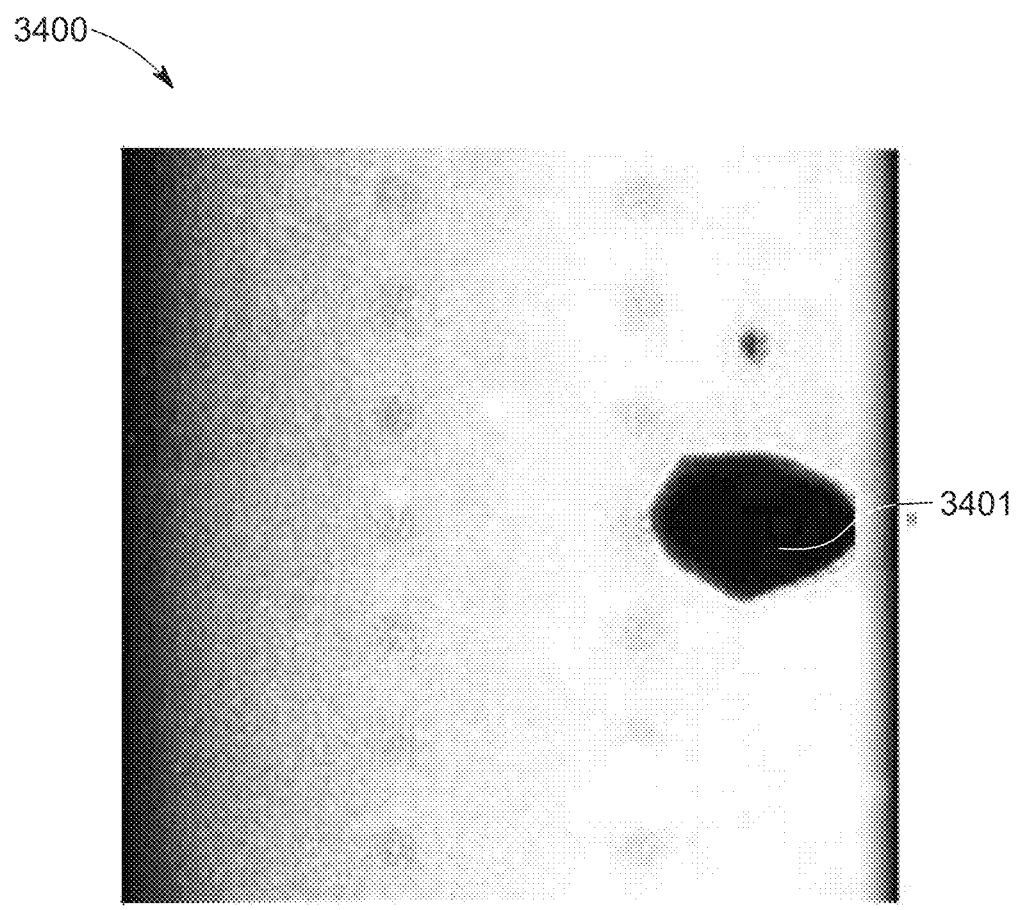
FIG. 34A depicts an image of portion of a flow cell having a defect that causes saturation of the focus tracking spots of a sensor over about eight frames.
Figure 34B:
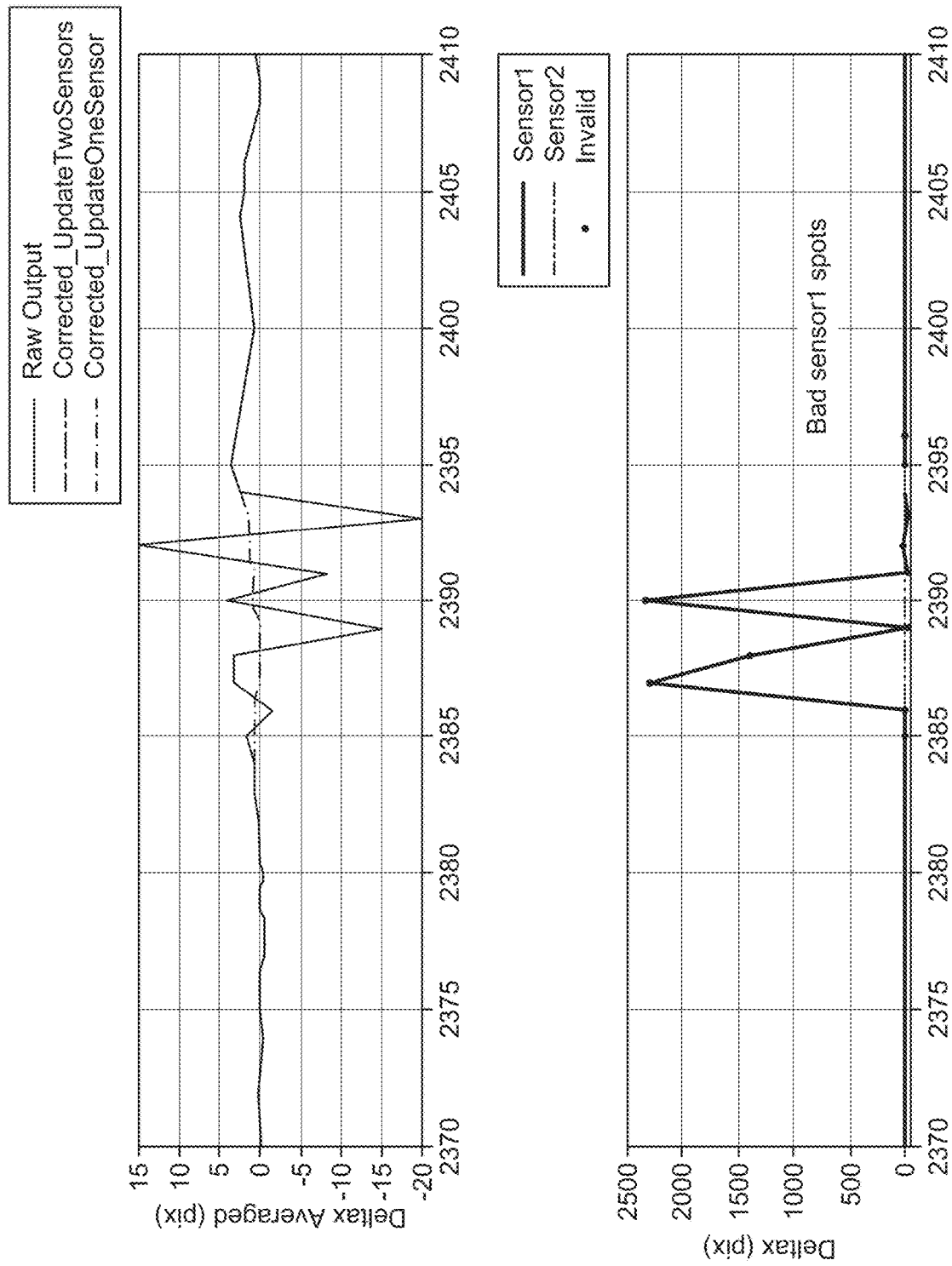

FIG. 34A depicts an image of portion of a flow cell 3400 having a defect 3401 that causes saturation of the focus tracking spots of sensor1 over about 8 frames. FIG. 34B depicts plots showing focus tracking performance, including a summary of defocus errors, when performing focus tracking on flow cell 3400 with spot error handling off and a simulation of performing focus tracking on flow cell 3400 with spot error handling on. In this example, the plots with spot error handling off and the simulation of spot error handling on are overlaid together. As depicted with spot error handling on, the curve becomes smooth, and no Z-step spikes are commanded to the Z-stage when encountering flow cell defects.

Figure 35A:
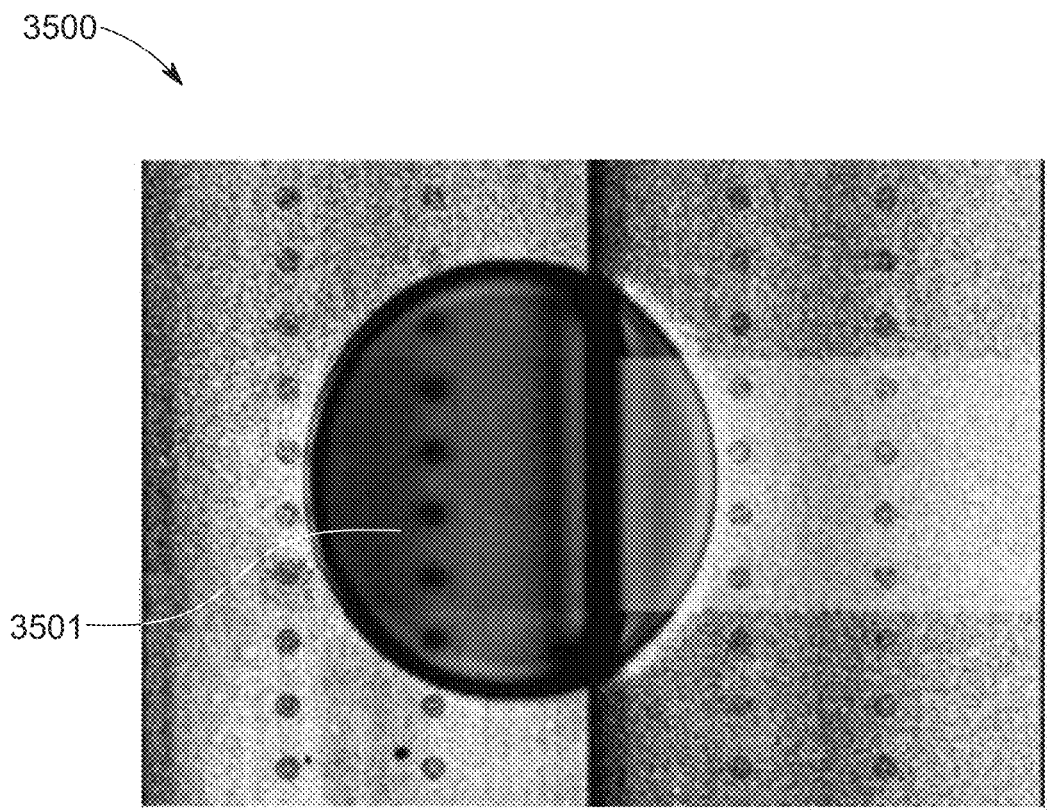
FIG. 35A depicts an image of a portion of a flow cell having a large bubble that causes poor measurement of the focus tracking spots of a sensor over about fifty frames.
Figure 35B:
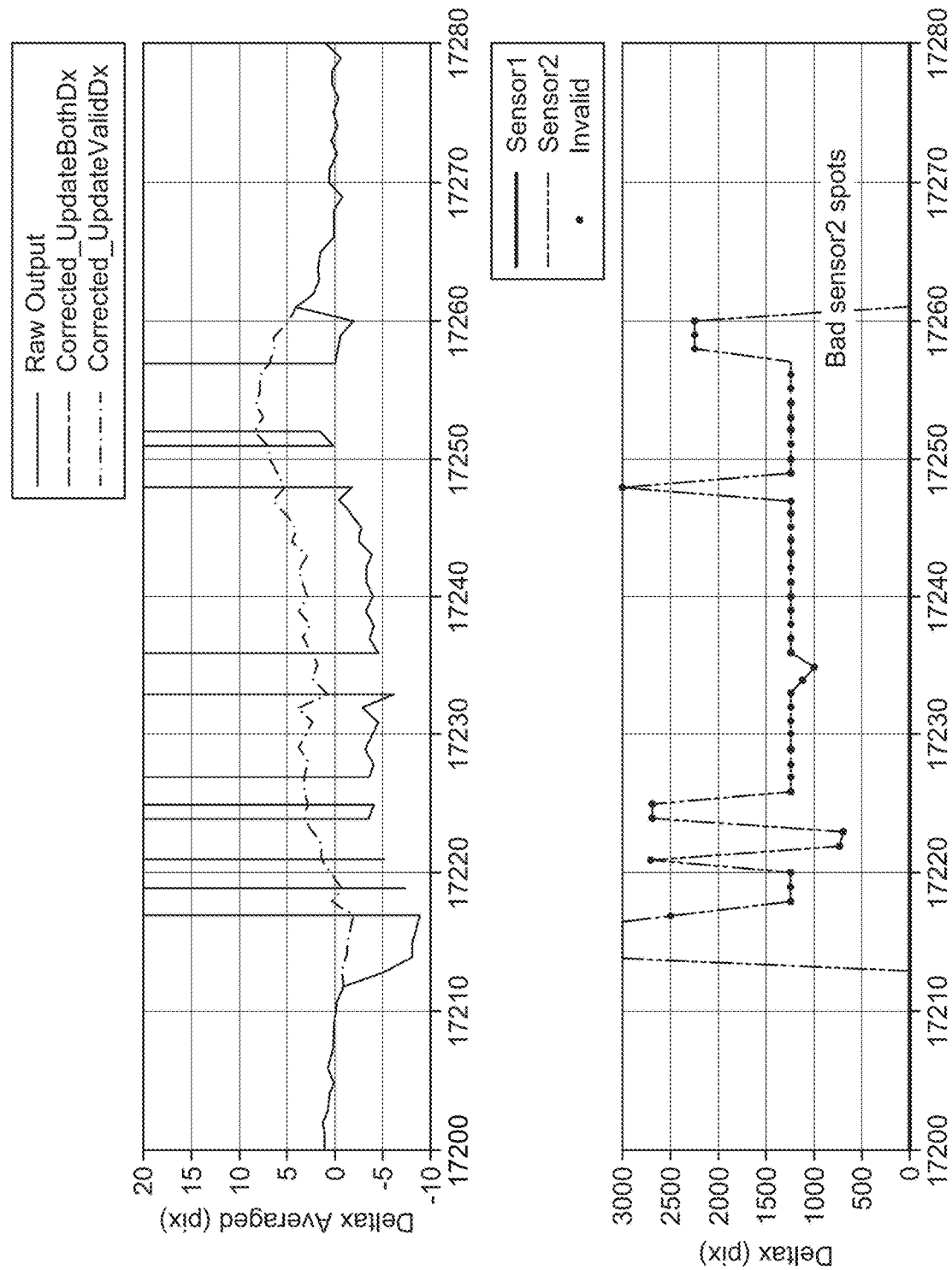

FIG. 35A depicts an image of a portion of a flow cell 3500 having a large bubble 3501 that causes poor measurement of the focus tracking spots of sensor2 over about 50 frames. FIG. 35B depicts plots showing focus tracking performance, including a summary of defocus errors, when performing focus tracking on flow cell 3500 with spot error handling off and a simulation of performing focus tracking on flow cell 3500 with spot error handling on. In this example, the plots with spot error handling off and the simulation of spot error handling on are overlaid together. As depicted with spot error handling on, the curve becomes smooth, and no Z-step spikes are commanded to the Z-stage when encountering flow cell bubbles.

Figure 36A:
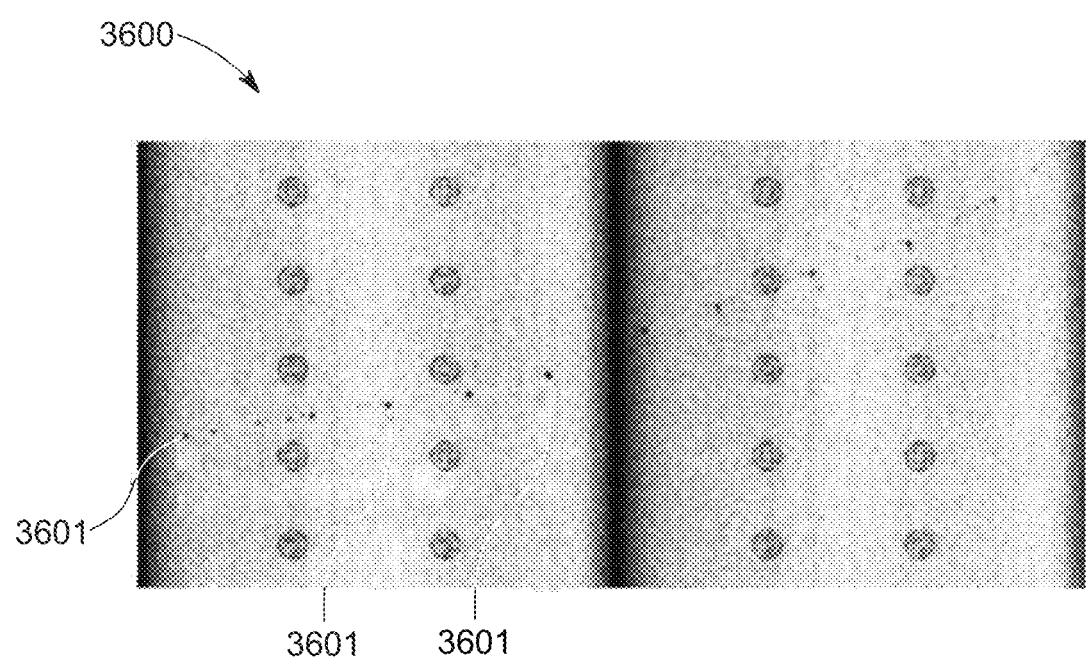
FIG. 36A depicts an image of a portion of a flow cell having debris (appearing as dark dots) on the surface that causes poor measurement of focus tracking spots.
Figure 36B:
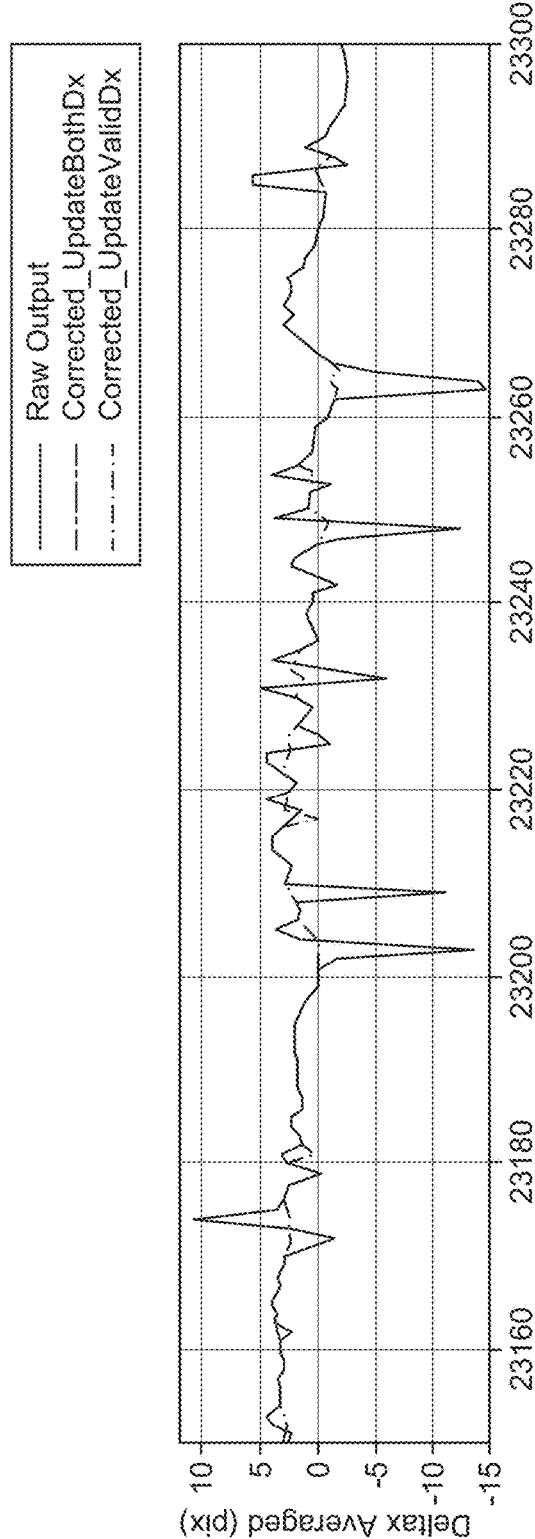
FIG. 36B depicts plots showing focus tracking performance, including a summary of defocus errors, when performing focus tracking on the flow cell of FIG. 36A with spot error handling off.
Figure 36C:
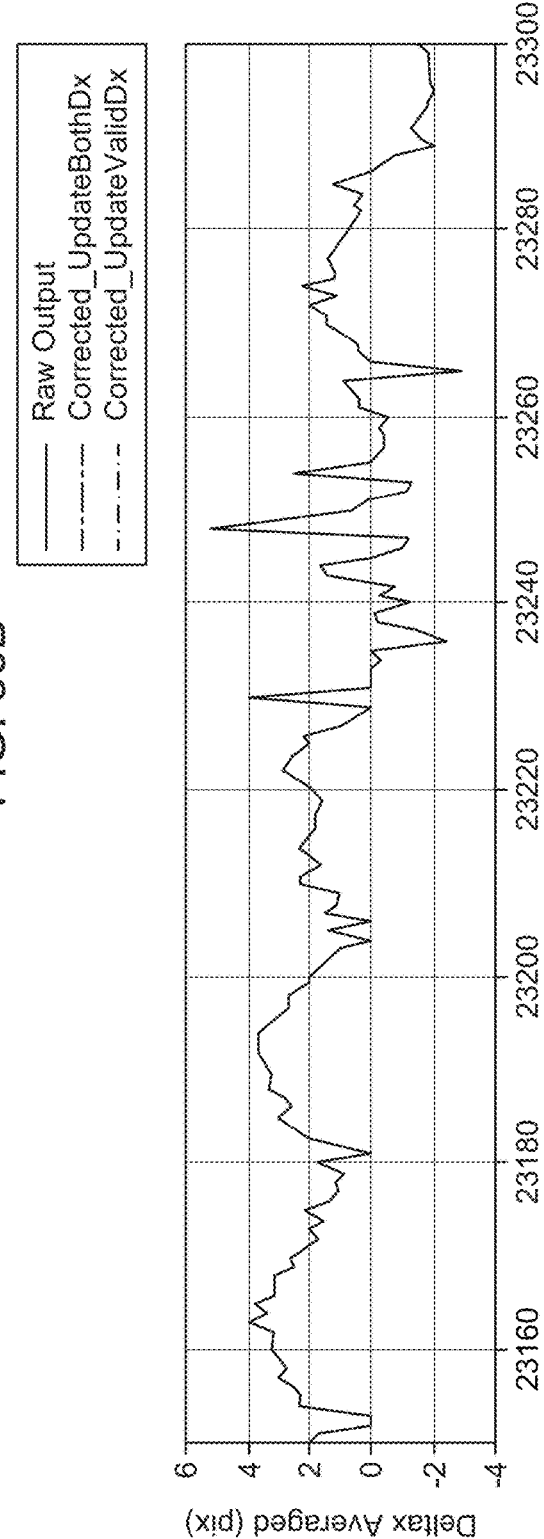

FIG. 36A depicts an image of a portion of a flow cell 3600 having debris 3601 (appearing as dark dots) on the surface that causes poor measurement of the focus tracking spots. For example, the debris prevented some light from reaching the portion of the flow cell it obscured. FIGS. 36B-36C depict plots showing focus tracking performance, including a summary of defocus errors, when performing focus tracking on flow cell 3600 with spot error handling off (FIG. 36B) and with spot error handling on (FIG. 36C). As depicted with spot error handling on, no Z-step spikes are commanded to the Z-stage when encountering debris.

Figure 37A:
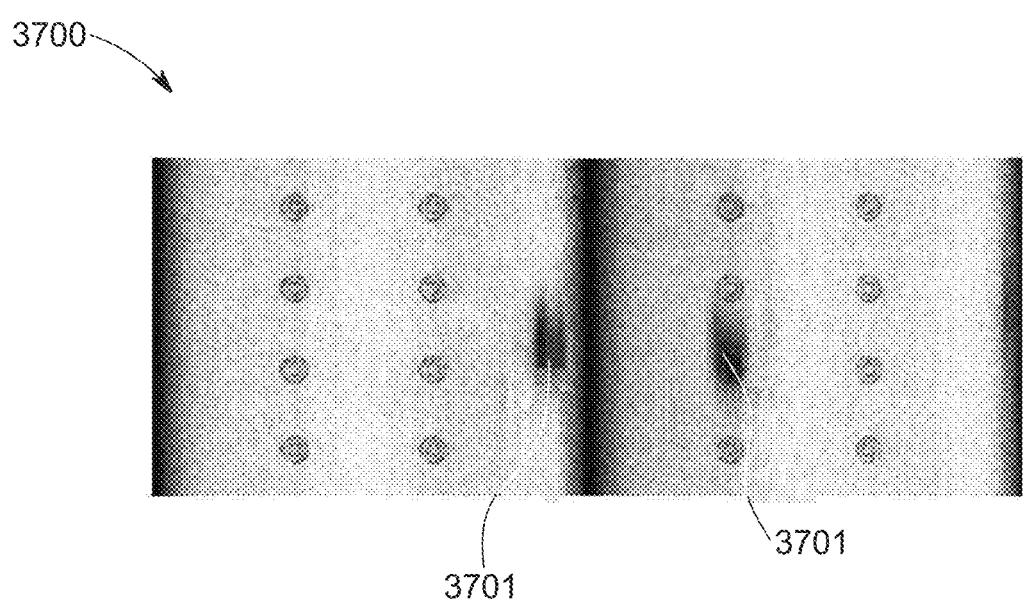
FIG. 37A depicts an image of a portion of a flow cell having residues (appearing as dark patterns) on the surface that causes poor measurement of focus tracking spots.
Figure 37B:
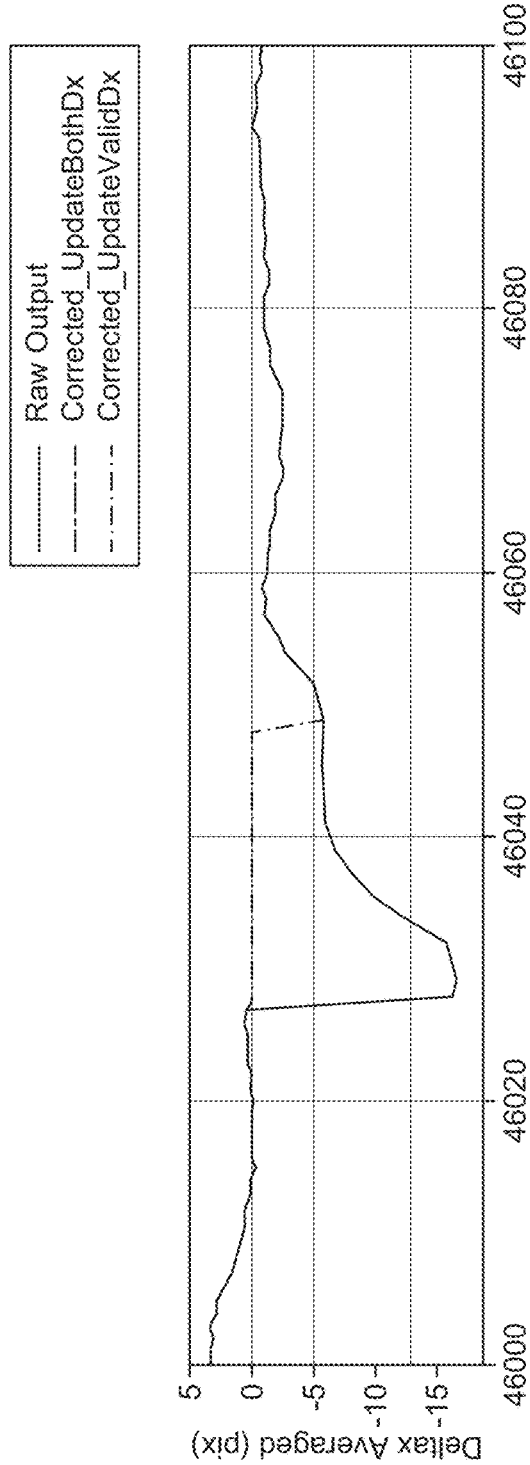
FIG. 37B depicts plots showing focus tracking performance, including a summary of defocus errors, when performing focus tracking on the flow cell of FIG. 37A with spot error handling off.
Figure 37C:
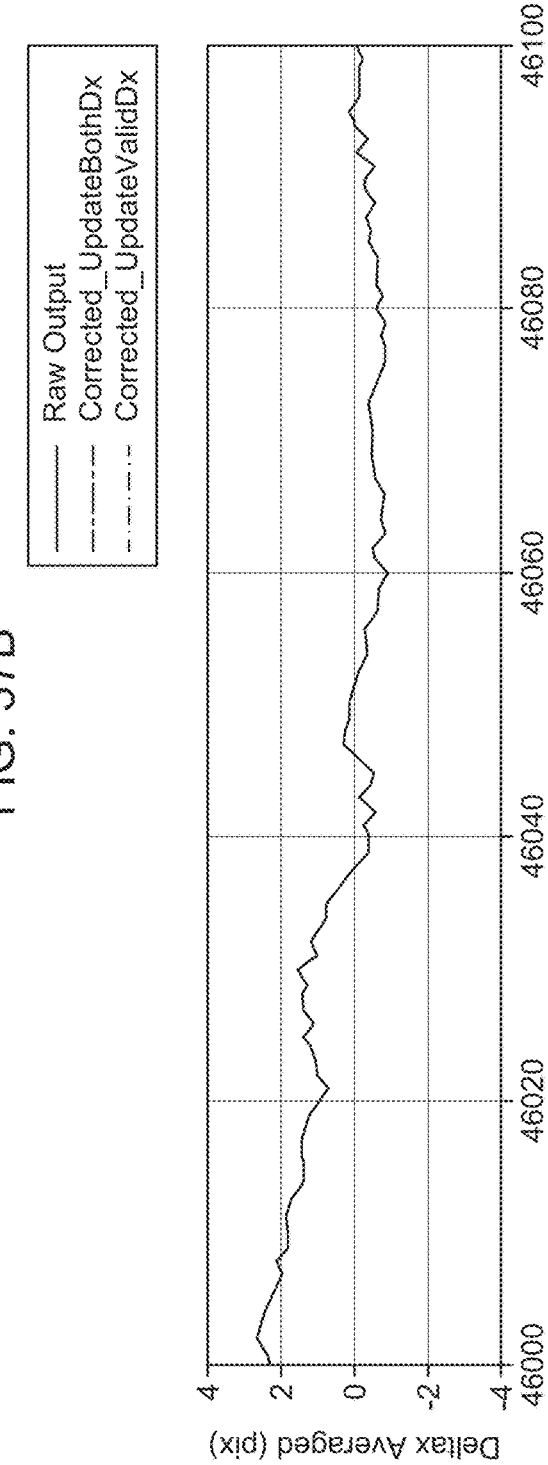

FIG. 37 depicts an image of a portion of a flow cell 3700 having residues 3701 (appearing as dark patterns) on the surface that causes poor measurement of the focus tracking spots. For example, the residues 3701 caused unpredictable reflections of incident focus tracking light that skewed the measured spots. FIGS. 37B-37C depict plots showing focus tracking performance, including a summary of defocus errors, when performing focus tracking on flow cell 3700 with spot error handling off (FIG. 37B) and with spot error handling on (FIG. 37C). As depicted with spot error handling on, no Z-step spikes are commanded to the Z-stage when encountering residues.

Figure 38A:
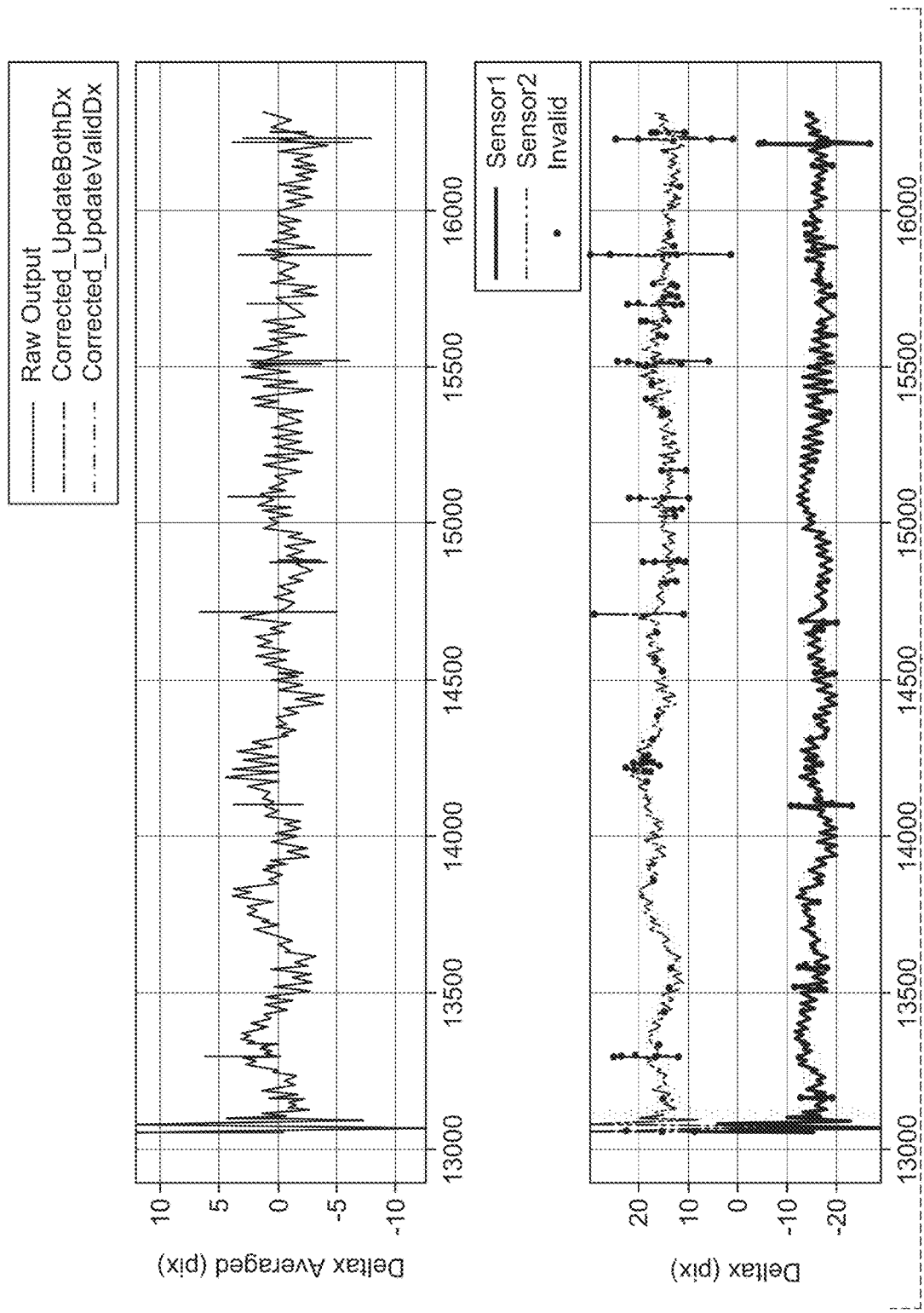
FIG. 38A depicts plots showing focus tracking performed on a flow cell without spot error handling, using a four-beam, two-sensor focus tracking system, in which there are frequent Z step spikes due to the glitches on the measurement of focus tracking spots on one or both detectors.
Figure 38A:
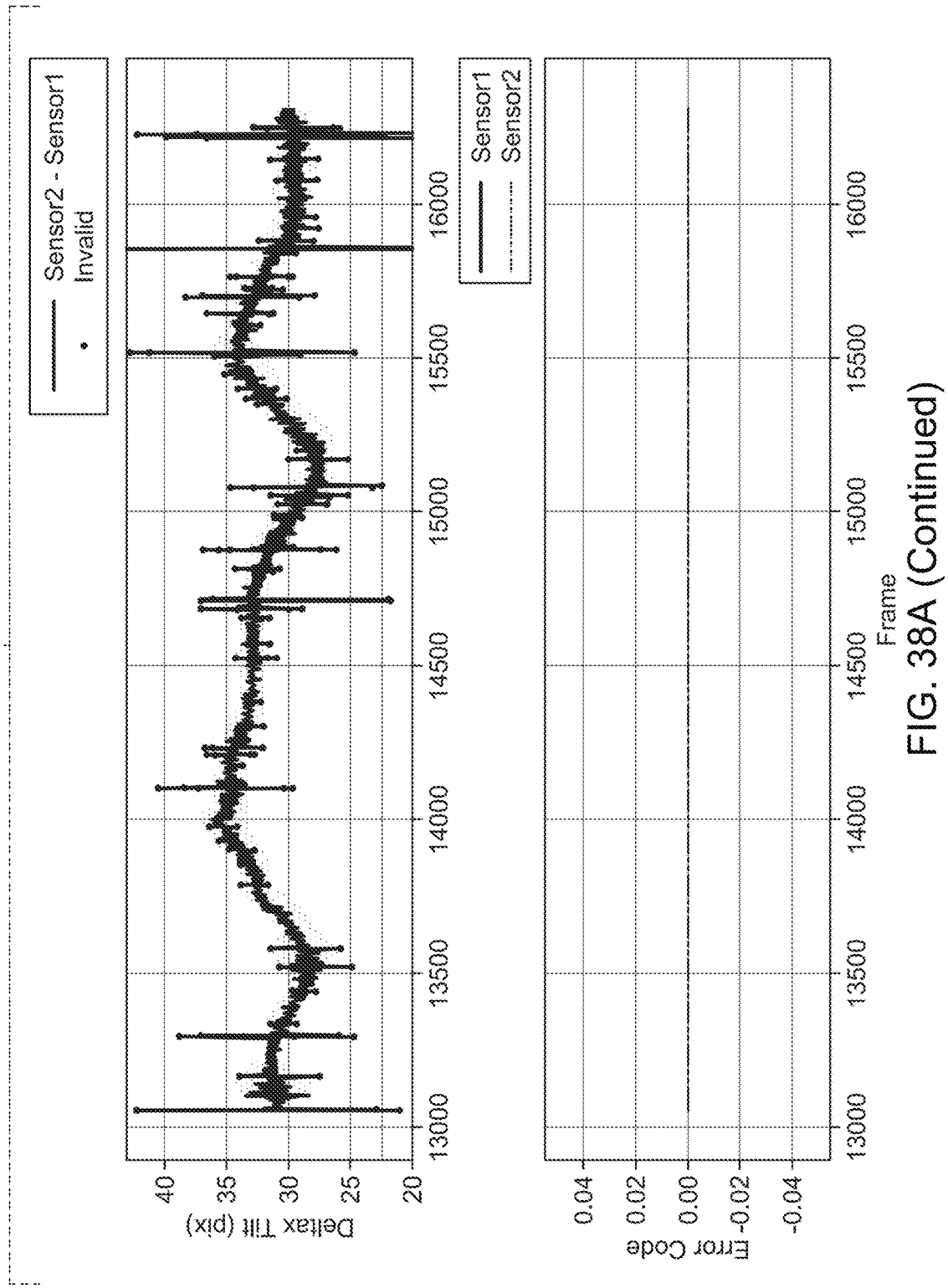
Figure 38B:
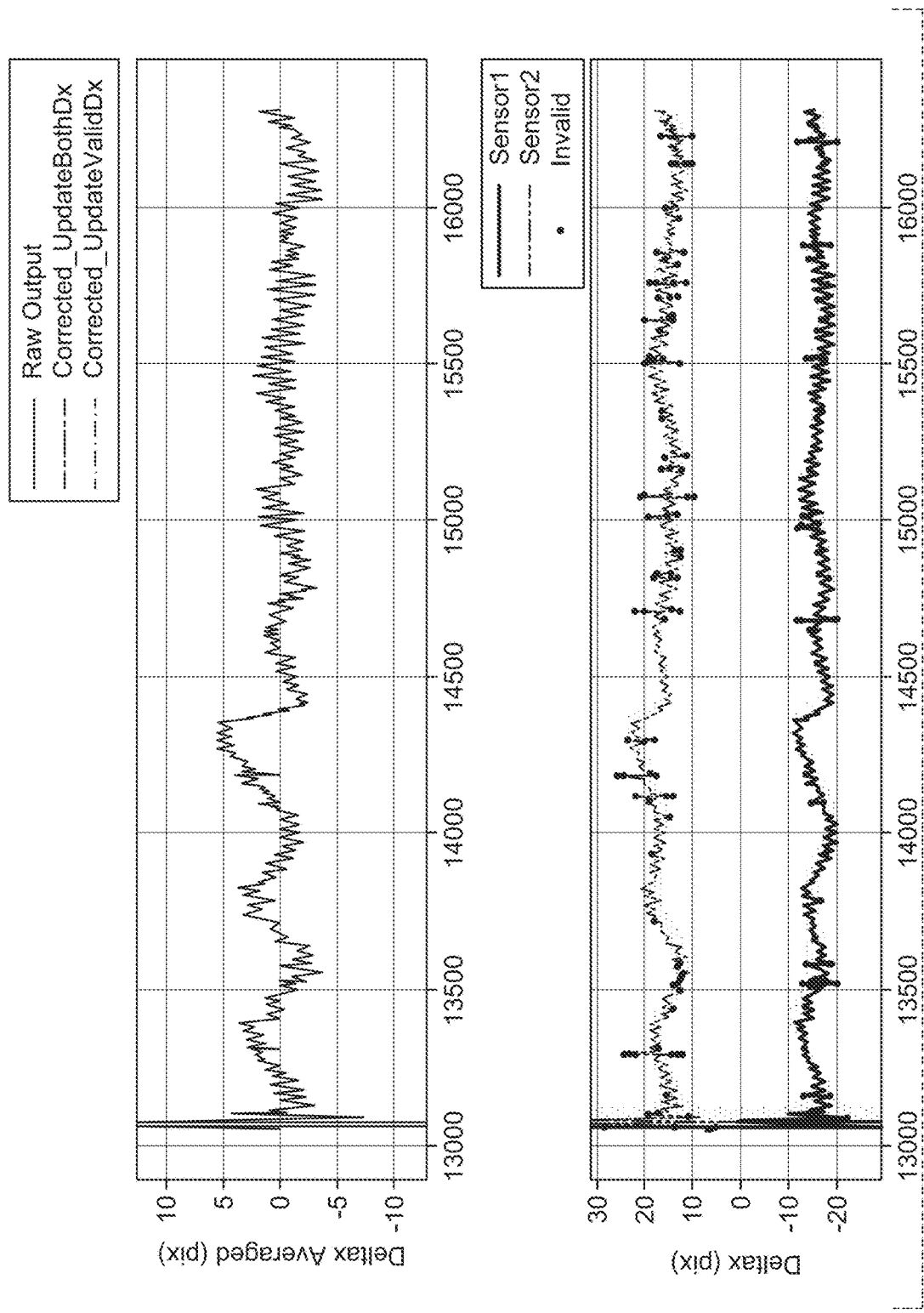
FIG. 38B depicts plots showing a focus tracking performed on the same flow cell as in FIG. 38A with spot error handling, using the four-beam, two-sensor focus tracking system, in which Z step spikes due to the glitched measurements of the focus tracking spots are eliminated.
Figure 38B:
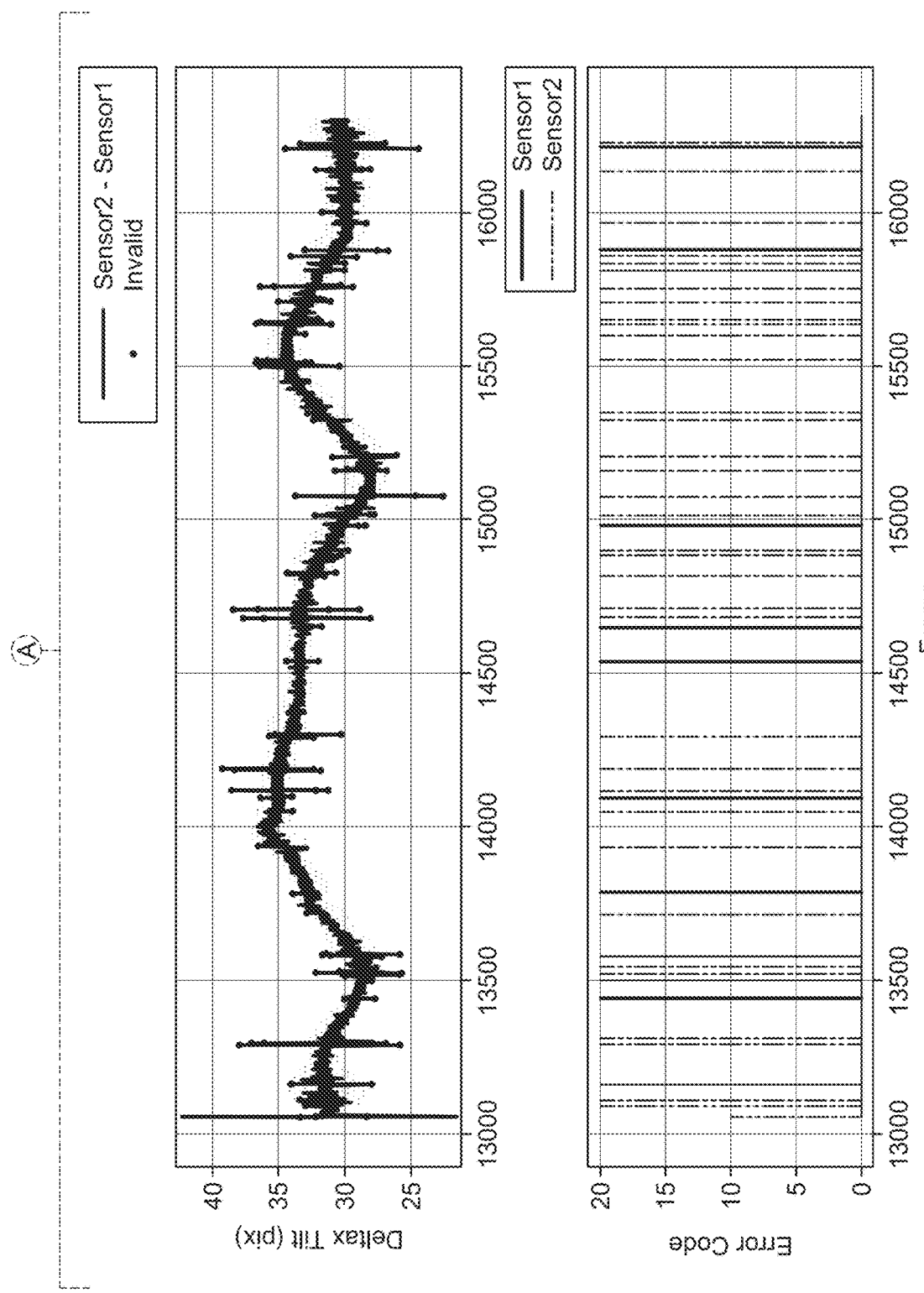

In some cases, glitches in the system electronics (e.g., focus tracking sensors) and/or during data collection and lead to missing and/or incorrect measurements. FIG. 38A depicts plots showing focus tracking performed on a flow cell without spot error handling, using a four-beam, two-sensor focus tracking system. In this example, spot separation glitches on one sensor occurred and were not accounted for. The fourth plot shows that error codes tracking a current condition of measured focus tracking spots were not used. FIG. 38B depicts plots showing a focus tracking performed on the flow cell of FIG. 38A with spot error handling, using the four-beam, two-sensor focus tracking system. In contrast to the example shown by FIG. 38A, smoother Z moves of the Z-stage are commanded despite abnormal spot separation glitches on one or both sensors. The fourth plot shows that error codes tracking a current condition of measured focus tracking spots were used.

Figure 39:
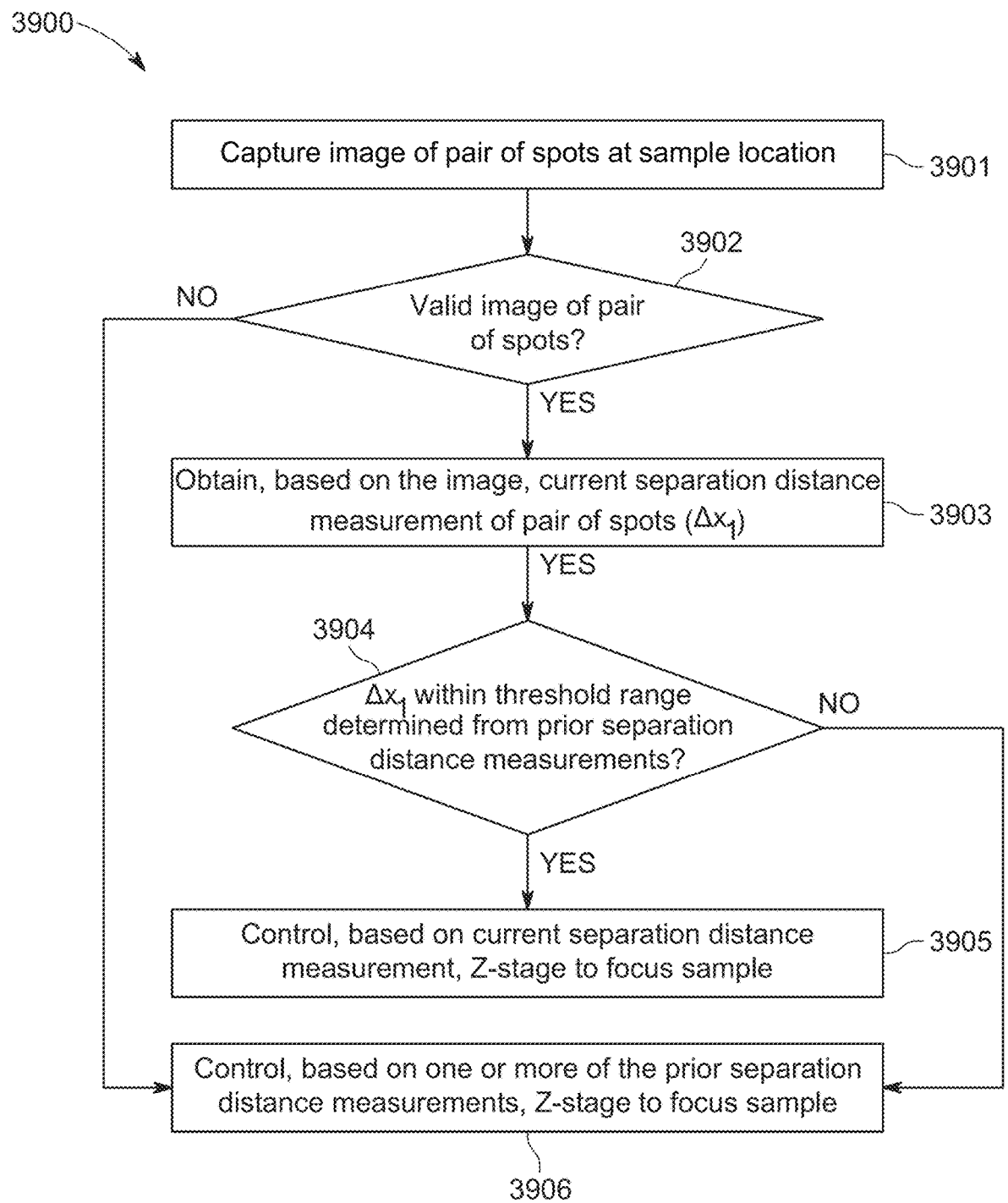
FIG. 39 is a flow diagram illustrating an example method of implementing spot error handling, in accordance with some implementations of the disclosure.

FIG. 39 depicts a flow diagram illustrating an example method 3900 of implementing spot error handling in accordance with some implementations of the disclosure.

Operation 3901 includes a capturing an image of a pair of spots at a sample location. For example, using one or more light sources of an imaging system, a first pair of spots can be projected at a sample location in a sample container, and an image sensor of the imaging system can capture an image of the first pair of spots. Focus tracking systems as described above can be used to capture the image.

At decision 3902, a determination is made as to whether the image of the pair of spots is valid. In some implementations, this determination can be made based on an intensity distribution of pixels in the first image. For example, as discussed above with reference to FIGS. 30A-30B, when detecting a pair of spots on an image sensor, it is expected that a valid image will yield two intensity peaks from a sample that has one surface, or four intensity peaks from a sample that has two surfaces, each having a substantially Gaussian distribution. When this is not the case (e.g., there are no intensity peaks, one intensity peak, three intensity peaks, and/or a non-Gaussian distribution of intensity around the peaks, and/or asymmetric pixel locations of the peaks), this can indicate that a spot error has occurred. As such, in some implementations, one or more of the following parameters can be examined by the system to determine whether or not the image is valid: an intensity distribution of the first spot, an intensity distribution of the second spot, an intensity distribution of the third spot, an intensity distribution of the fourth spot, the pixel locations of peak intensity, the number of intensity peaks, whether there are any saturated pixels, and the like.

In some implementations, when the image is determined to be not valid, an identifier such as an error code can be stored in a system memory, the identifier indicating a reason the image is not valid. In some implementations, the identifier can be a number or other alphanumerical indication associated with a type of error/issue. For example, the system can associate different identifiers with issues such as one or more spots having saturated pixels, non-Gaussian spots, an incorrect number of valid peaks, an incorrect symmetry, other errors, or unidentifiable errors. In some implementations, the system can also associate an identifier with an image that is determined to be valid. As such, an identifier indicating whether the image is valid or invalid (and, optionally, the reason it is invalid) can be stored for every frame. By virtue of implementing and storing identifiers in memory, the system can main a history of errors over different frames that can be used to implement spot error handling. In some cases, the identifiers can also be used to troubleshoot the imaging system (e.g., the sensor of the focus tracking system that collects the image) or sample container during a sample pre-scan, during sample scanning, and/or after sample scanning. For example, an identifier of saturated pixels may identify the presence of a bubble. As another example, an identifier of non-Gaussian spots may identify the presence of debris or scratches on the sample container. In some implementations, the identifiers can be stored in a circular buffer that maintains a history of most recent identifiers (e.g., during a current swath scan or other sample scan). In implementations where multiple spot pairs are detected using multiple respective sensors, the system can store a history of identifiers associated with each sensor.

When the image is determined to be valid, at operation 3903 a current separation distance measurement of the pair of spots (e.g., $\Delta x_1$ as described above) is obtained based on the image. As described herein, the separation distance measurements can be made in pixels as depicted by FIGS. 30A-30B.

At decision 3904, a determination is made as to whether the current separation distance measurement is within a threshold range determined from prior separation distance measurements. For example, to prevent large Z-steps that could be indicative of a measurement error and/or be detrimental to imaging, the system can maintain a recent history of prior separation distance measurements (e.g., in a circular buffer or other fixed sized data structure). The threshold range can be based on an average/moving average of the most recent measurements, or the changes between neighboring frames from the most recent measurements, or the frequency contents of the most recent measurements. For example, the threshold range can be set as a number of standard deviations (e.g., 1, 1.5, 2, 2.5, 3, 3.5, 4, etc.) above/below the averaged past valid measurements, or the averaged change above/below the last valid measurement. If the most recent measurement is outside this threshold range, it can indicate an unusually large Z-step that should not be performed. In some implementations, the threshold range can be set such that the most recent measurements in the fixed data structure are weighted more (e.g., the average of the measurements or the average of the changes in measurement between neighboring frames, weighs the most recent measurement in the data structure more than the last measurement in the data store). In some implementations, the threshold range can be set based on the most recently valid separation distance measurement that was used during Z-stage adjustment.

When the separation distance measurement is within the threshold range, at operation 3905 the Z-stage can be controlled, based at least on the current separation distance measurement, to focus the imaging system at the sample location. When the image of the pair of spots is determined to be invalid (decision 3902) or the current separation distance measurement is not within threshold range (decision 304), at operation 3906 the Z-stage can be controlled, based on the more prior separation distance measurements, to focus the imaging system at the sample location. For example, the Z-stage can be controlled based on a most recent one of the prior separation distance measurements that was determined to be valid or a combination of the prior separation distance measurements (e.g., a moving average that is weighted toward more recent measurements).

During operation, the Z-stage can be controlled based on a Z step that is commanded based one or more separation distance measurements. The Z-step can cause an objective of the imaging system and/or a stage holding the sample container to move up or down in the Z direction. As discussed above, the Z-step can be calculated as a function of one or more separation distance measurements (e.g., the current separation distance measurement) and a gain value associated with the optics of the focus tracking module. For example, the Z-step can be calculated by taking the current separation distance measurement in pixels and multiplying it by a gain value in nm/pixels.

In alternative implementations, method 3900 can be implemented without decision 3904 (e.g., after the image is determined to be valid and the current separation distance measurement is obtained, it is used to control the Z-stage).

Although method 3900 has been described in the context of spot error handling for imaging/focus tracking systems that generate one pair of spots that are imaged, it should be appreciated that method 3900 can be extended to imaging/focus tracking systems that generate multiple pairs of spots imaged using one or more sensors (e.g., two pairs of substantially parallel pairs of spots imaged by two sensors). In such systems, operations 3901-3904 as described above can be implemented for each pair of detected spots (e.g., for each sensor of the system).

Figure 40:
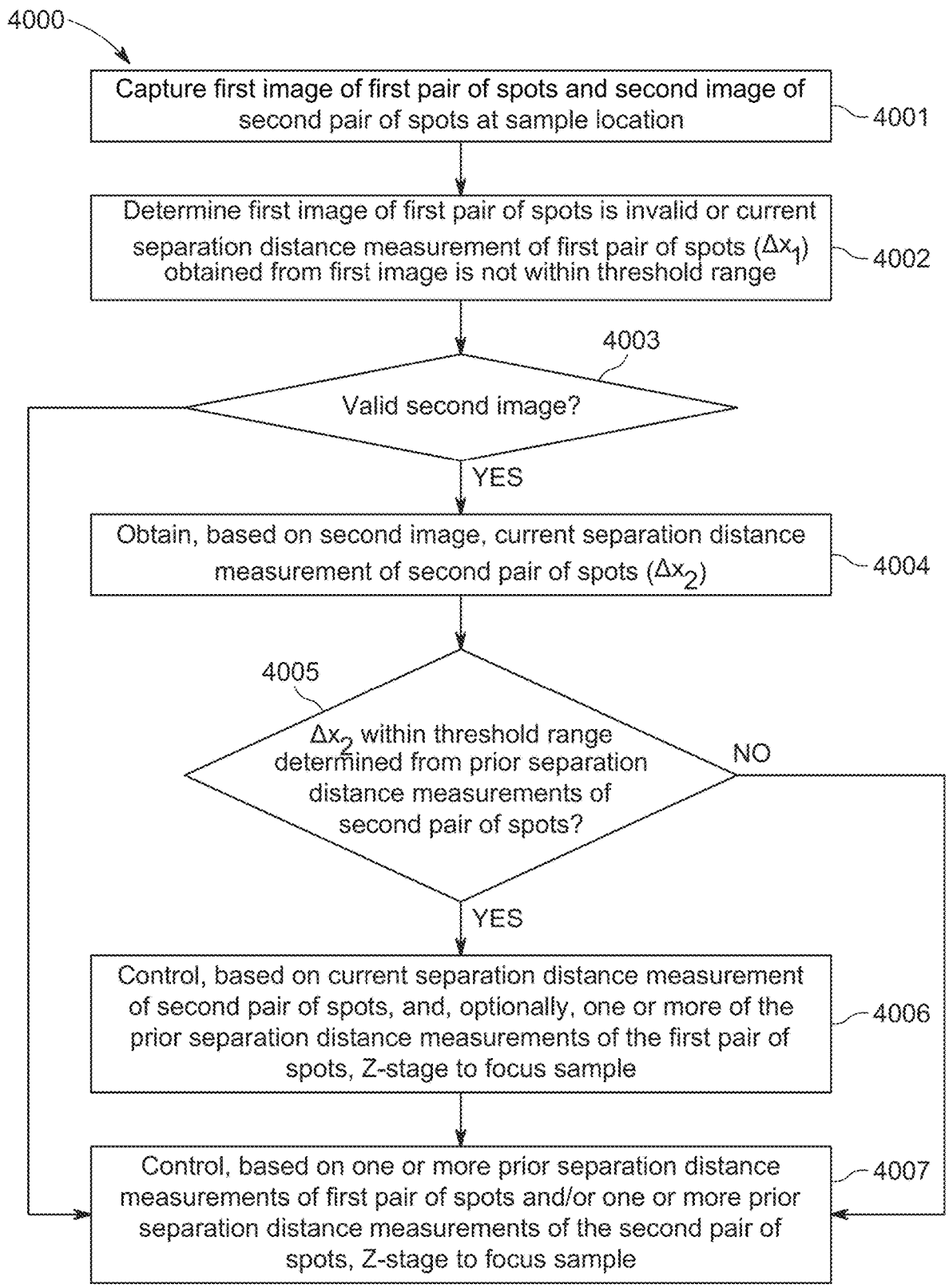
FIG. 40 is a flow diagram depicting a method of spot error handling in systems that perform focus tracking using at least two pairs of substantially parallel spots, in accordance with some implementations of the disclosure.

To that end, FIG. 40 is a flow diagram depicting a method 4000 of spot error handling in systems that perform focus tracking using at least two pairs of substantially parallel spots, in accordance with some implementations of the disclosure. Operation 4001 includes capturing a first image of a first pair of spots and a second image of a second pair of spots at a sample location. The two pairs of spots can be substantially parallel and captured by one sensor or multiple sensors (e.g., two substantially parallel linear sensors as described above).

Operation 4002 includes determining that the first image of first pair of spots is invalid or a current separation distance measurement of the first pair of spots (e.g., $\Delta x_1$) obtained from first image is not within a threshold range. For example, operation 4002 can be performed as described above with reference to operations 3902-3904 of method 3900.

At decision 4003, a determination is made as to whether the second image of the second pair of spots is valid. For example, the determination can be made based on an intensity distribution of pixels in the second image, following the techniques described above with reference to decision 3902 of method 3900. When the second image is determined to be valid, at operation 4004 a current separation distance measurement of the second pair of spots (e.g., $\Delta x_2$ as described above) is obtained based on the second image.

At decision 4005, a determination is made as to whether the current separation distance measurement of the second pair of spots is within a threshold range determined from prior separation distance measurements of the second pair of spots. In alternative implementations, comparisons of the obtained separation distance measurements against a threshold can be skipped. In such implementations, operation 4005 can be skipped, and operation 4002 only includes determining that the first image of the first pair of spots is invalid.

In instances where the first image is invalid but the second image is valid, operation 4006 can be performed, which includes controlling, based on the current separation distance measurement of the second pair of spots, and, optionally, one or more of the prior separation distance measurements of the first pair of spots, the Z-stage to focus the imaging system at the sample location. As such, by virtue of using two pairs of spots, even if there is a detected error at one of the spot pairs, the separation distance measurement of the other spot pair can be used to determine the Z-step. In some implementations, the current separation distance measurement of the second pair of spots can be averaged with a separation distance measurement determined from one or more of the prior separation distance measurements of the first pair spots (e.g., the most recently valid one, or some type of average of the prior measurements). This average can then be used to command the Z-stage.

In instances where both the first image and the second image are invalid, operation 4007 can be performed, which includes controlling, based on one or more prior separation distance measurements of the first pair of spots and/or one or more prior separation distance measurements of the second pair of spots, the Z-stage to focus the imaging system at the sample location. For example, an average of the most recently valid separation distance measurement of the first pair spots and the most recently valid separation distance measurement of the second pair of spots can be used to determine the Z-step.

Although the foregoing examples have been described in the context of spot error handling to detect/prevent Z-spikes, the spot error handling techniques described herein could also be implemented to detect/prevent tilt spikes. For example, the techniques described herein, could be implemented to prevent any tilt spikes of a tilt stage configured to tilt a sample container in a direction orthogonal to a scanning direction.

Figure 41:
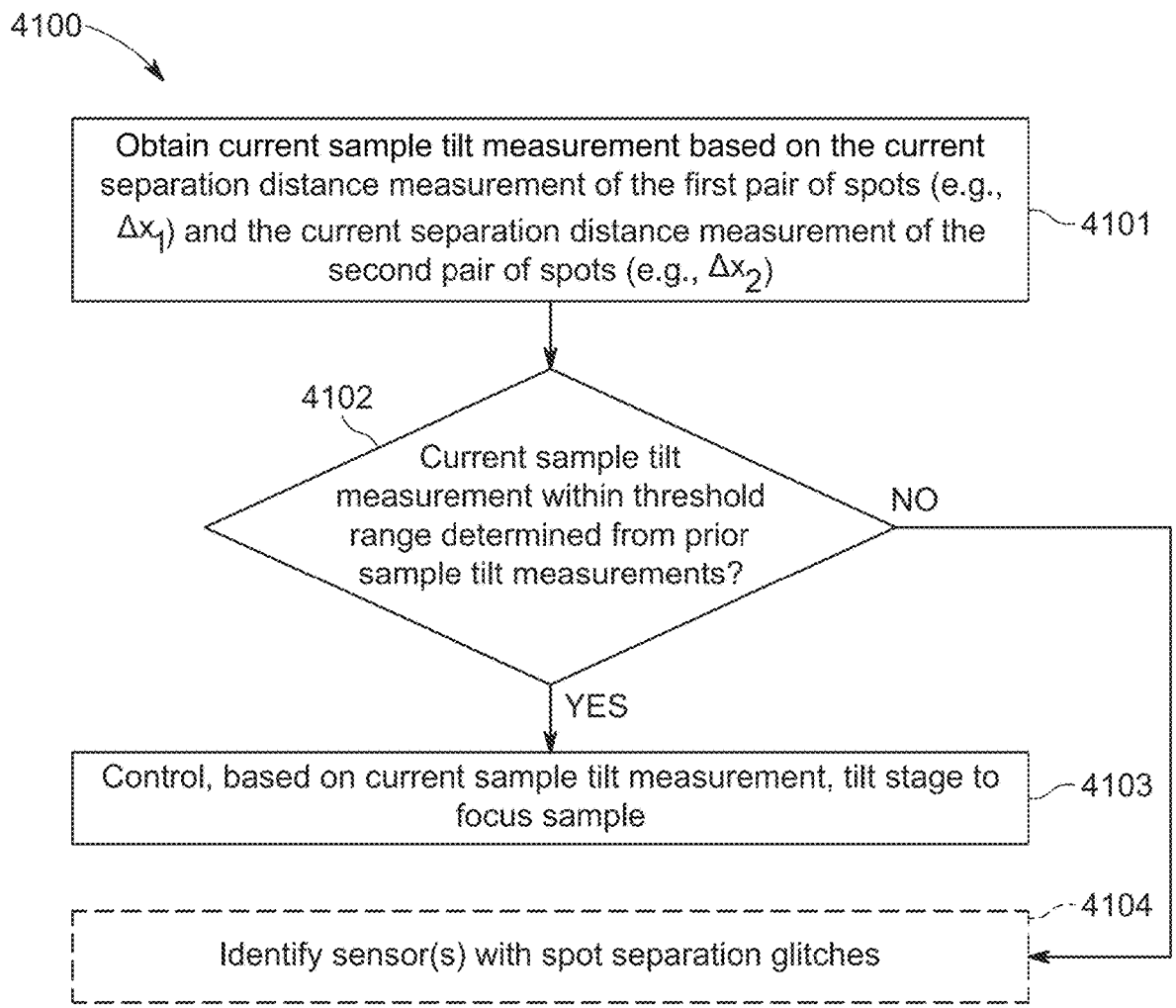
FIG. 41 is a flow diagram depicting a method of detecting tilt spikes in systems that perform focus tracking using at least two pairs of substantially parallel spots projected onto at least two locations of the sample, in accordance with some implementations of the disclosure.

To this end, FIG. 41 is a flow diagram depicting a method 4100 of detecting tilt spikes in systems that perform focus tracking using at least two pairs of substantially parallel spots projected onto at least two locations of the sample, in accordance with some implementations of the disclosure. Prior to performing method 4100 two separation distance measurements can be obtained for two pair of spots (e.g., by following the techniques described above).

Operation 4101 includes obtaining a current sample tilt measurement based on the current separation distance measurement of the first pair of spots (e.g., $\Delta x_1$) and the current separation distance measurement of the second pair of spots (e.g., $\Delta x_2$). For example, the measurement can be obtained based on a difference of the two separation distance measurements (e.g., Equation (3) described above).

At decision 4102, a determination is made as to whether the current sample tilt measurement is within a threshold range determined from prior sample tilt measurements. For example, to prevent large tilt steps, the system can maintain a recent history of prior sample tilt measurements (e.g., in a circular buffer or other fixed sized data structure). As discussed above, each tilt measurement can be obtained by taking a difference between two separation distance measurements of two pairs of substantially parallel spots. The threshold range can be based on an average/moving average of the most recent measurements, or the changes between neighboring frames from the most recent measurements, or the frequency contents of the most recent measurements. For example, the threshold range can be set as a number of standard deviations (e.g., 1, 1.5, 2, 2.5, 3, 3.5, 4, etc.) above/below the averaged past valid measurements, or the averaged change above/below the last valid measurement. If the most recent tilt measurement is outside this threshold range, it can indicate a tilt spike that should be avoided. In some implementations, the threshold range can be set such that the most recent measurements in the fixed data structure are weighted more (e.g., the average of the measurements weighs the most recent measurement in the data structure more than the last measurement in the data store). In some implementations, the threshold range can be set based on the most recently valid sample tilt measurement that was used during tilt-stage adjustment.

When the current sample tilt measurement is within the threshold range, operation 4103 includes controlling, based on the current sample tilt measurement, a tilt stage to focus the sample at a desired location. When the current sample tilt measurement is not within the threshold range, optional operation 4104 includes identifying sensor(s) with spot separation glitches. For example, in implementation where two parallel sensors are used to detect two corresponding pairs of spots, a determination can be made as to whether the current separation distance measurement of one sensor has deviated significantly, or the current separation distance measurements of both sensors have deviated significantly. In some implementations, the system can store an error code when it is detected that the current sample tilt measurement is not within the threshold range.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

To the extent applicable, the terms "first," "second," "third," etc. herein are merely employed to show the respective objects described by these terms as separate entities and are not meant to connote a sense of chronological order, unless stated explicitly otherwise herein.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

To the extent applicable, the terms "first," "second," "third," etc. herein are merely employed to show the respective objects described by these terms as separate entities and are not meant to connote a sense of chronological order, unless stated explicitly otherwise herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

It should be appreciated that all combinations of the foregoing concepts (provided such concepts are not mutually inconsistent) are contemplated as being part of the inventive subject matter disclosed herein. In particular, all combinations of claimed subject matter appearing in this disclosure are contemplated as being part of the inventive subject matter disclosed herein.

What is claimed is:

1. A non-transitory computer-readable medium having executable instructions stored thereon that, when executed by a processor, causes an imaging system to perform operations comprising:
capturing, using one or more image sensors of the imaging system, a first image of a first pair of spots projected at a first sample location of a sample;
determining, based on an intensity distribution of pixels in the first image, whether or not the first image of the first pair of spots is valid by determining whether:
an intensity distribution of each of a first spot of the first pair of spots and a second spot of the first pair of spots in the first image is Gaussian;
there is a first peak intensity in the first image corresponding to the first spot and a second peak intensity in the first image corresponding to the second spot;
a number of intensity peaks in the first image matches a valid number; or
one or more of the pixels are saturated; and
when the first image is determined to be valid:
obtaining, based on the first image, a current separation distance measurement of the first pair of spots; and
controlling, based at least on the current separation distance measurement, a Z-stage of the imaging system to focus the imaging system at the first sample location.

2. The non-transitory computer-readable medium of claim 1, wherein:
determining whether or not the first image of the first pair of spots is valid comprises determining that the first image is not valid; and
in response to determining that the first image is not valid, storing in a memory of the imaging system an identifier indicating a reason the first image is not valid.

3. A non-transitory computer-readable medium having executable instructions stored thereon that, when executed by a processor, causes an imaging system to perform operations comprising:
capturing, using one or more image sensors of the imaging system, a first image of a first pair of spots projected at a first sample location of a sample;
determining whether or not the first image of the first pair of spots is valid; and
when the first image is determined to be valid:
obtaining, based on the first image, a current separation distance measurement of the first pair of spots;
determining that the current separation distance measurement of the first pair of spots is within a threshold range determined from a plurality of prior separation distance measurements of the first pair of spots that are associated with other sample locations of the sample; and
after determining that the current separation distance measurement of the first pair of spots is within the threshold range, controlling, based at least on the current separation distance measurement, a Z-stage of the imaging system to focus the imaging system at the first sample location.

4. The non-transitory computer-readable medium of claim 3, wherein the threshold range is within a number of standard deviations above or below an average of the plurality of prior separation distance measurements, the number being greater than 0 and less than 4.

5. The non-transitory computer-readable medium of claim 3, wherein the operations further comprise: storing the current separation distance measurement in a circular buffer including the plurality of prior separation distance measurements.

6. A non-transitory computer-readable medium having executable instructions stored thereon that, when executed by a processor, causes an imaging system to perform operations comprising:
capturing, using one or more image sensors of the imaging system, a first image of a first pair of spots projected at a first sample location of a sample;
determining whether or not the first image of the first pair of spots is valid;
when the first image is determined to be valid:
obtaining, based on the first image, a current separation distance measurement of the first pair of spots; and
controlling, based at least on the current separation distance measurement, a Z-stage of the imaging system to focus the imaging system at the first sample location; and
when the first image is determined to be invalid, controlling, based at least on one or more prior separation distance measurements of the first pair of spots that are associated with one or more other sample locations of the sample, the Z-stage to focus on the sample at the first sample location.

7. The non-transitory computer-readable medium of claim 6, wherein:
the one or more prior separation distance measurements are a plurality of prior separation distance measurements stored in a memory of the imaging system; and
controlling, based at least on the one or more prior separation distance measurements, the Z-stage to focus on the sample at the first sample location includes:
retrieving a most recent one of the plurality of prior separation distance measurements stored in the memory; and
controlling, based on the most recent one of the plurality of prior separation distance measurements, the Z-stage to focus on the sample at the first sample location.

8. The non-transitory computer-readable medium of claim 6, wherein:
the one or more prior separation distance measurements are a plurality of prior separation distance measurements stored in a memory of the imaging system; and
controlling, based at least on the one or more prior separation distance measurements, the Z-stage to focus on the sample at the first sample location includes:
controlling, based on a combination of two or more of the prior separation distance measurements, the Z-stage to focus on the sample at the first sample location.

9. A non-transitory computer-readable medium having executable instructions stored thereon that, when executed by a processor, causes an imaging system to perform operations comprising:
capturing, using one or more image sensors of the imaging system, a first image of a first pair of spots projected at a first sample location of a sample;
determining whether or not the first image of the first pair of spots is valid;
when the first image is determined to be valid:
obtaining, based on the first image, a current separation distance measurement of the first pair of spots; and
controlling, based at least on the current separation distance measurement, a Z-stage of the imaging system to focus the imaging system at the first sample location;

capturing, using the one or more image sensors of the imaging system, a second image of a second pair of spots projected at the first sample location substantially parallel to the first pair of spots;
determining whether or not the second image of the second pair of spots is valid; and
when the second image is determined to be valid, obtaining, based on the second image, a current separation distance measurement of the second pair of spots.

10. The non-transitory computer-readable medium of claim 9, wherein the operations further comprise: when the first image is determined to be invalid and the second image is determined to be valid, controlling, based at least on the current separation distance measurement of the second pair of spots, the Z-stage of the imaging system to focus the imaging system at the first sample location.

11. The non-transitory computer-readable medium of claim 9, wherein the operations further comprise: when the first image is determined to be invalid and the second image is determined to be valid, controlling, based at least on the current separation distance measurement of the second pair of spots and one or more prior separation distance measurements of the first pair of spots that are associated with one or more other sample locations of the sample, the Z-stage of the imaging system to focus the imaging system at the first sample location.

12. The non-transitory computer-readable medium of claim 9, wherein the operations further comprise: when both the first image and the second image are determined to be valid, controlling, based at least on the current separation distance measurement of the first pair of spots and the current separation distance measurement of the second pair of spots, the Z-stage of the imaging system to focus the imaging system at the first sample location.

13. The non-transitory computer-readable medium of claim 12, wherein controlling, based at least on the current separation distance measurement of the first pair of spots and the current separation distance measurement of the second pair of spots, the Z-stage of the imaging system to focus the imaging system at the first sample location, comprises:
determining an average of the current separation distance measurement of the first pair of spots and the current separation distance measurement of the second pair of spots; and
controlling, based at least on the average, the Z-stage of the imaging system to focus the imaging system at the first sample location.

14. The non-transitory computer-readable medium of claim 9, wherein the operations further comprise: when both the first image and the second image are determined to be valid, determining a tilt measurement based on a difference between the current separation distance measurement of the first pair of spots and the current separation distance measurement of the second pair of spots.

15. The non-transitory computer-readable medium of claim 14, wherein the operations further comprise: determining whether the tilt measurement is within a threshold range determined from prior sample tilt measurements.

16. A system, comprising:
one or more light sources to project a first pair of spots at a first sample location of a sample;
one or more image sensors to capture a first image of the first pair of spots projected at the first sample location;
a memory to store one or more prior separation distance measurements that are associated with one or more other sample locations of the sample; and
one or more processors to perform operations comprising:
determining whether or not the first image of the first pair of spots is valid;
when the first image is determined to be valid:
obtaining, based on the first image, a current separation distance measurement of the first pair of spots; and
controlling, based at least on the current separation distance measurement, a Z-stage to focus at the first sample location; and
when the first image is determined to be invalid, controlling, based at least on the one or more prior separation distance measurements, the Z-stage to focus on the sample at the first sample location.

17. The system of claim 16, wherein determining whether or not the first image of the first pair of spots is valid comprises: determining, based on an intensity distribution of pixels in the first image, whether or not the first image of the first pair of spots is valid.

18. The system of claim 16, further comprising the Z-stage, wherein the Z-stage includes an objective.

19. A system, comprising:
one or more light sources to project a first pair of spots at a first sample location of a sample and a second pair of spots at the first sample location substantially parallel to the first pair of spots;
one or more image sensors to capture a first image of the first pair of spots projected at the first sample location and a second image of the second pair of spots projected at the first sample location; and
one or more processors to perform operations comprising:
determining whether or not the first image of the first pair of spots is valid; and
when the first image is determined to be valid:
obtaining, based on the first image, a current separation distance measurement of the first pair of spots; and
controlling, based at least on the current separation distance measurement, a Z-stage to focus at the first sample location.

20. The system of claim 19, wherein:
the one or more light sources include a first light source to project the first pair of spots at the first sample location, and a second light source to project the second pair of spots at the first sample location; and
the one or more image sensors include a first image sensor to capture the first image and a second image sensor to capture the second image.

21. The system of claim 20, wherein the first image sensor and the second image sensor are substantially parallel linear sensors.

22. The system of claim 19, wherein the operations further comprise:
determining whether or not the second image of the second pair of spots is valid; and
when the second image is determined to be valid, obtaining, based on the second image, a current separation distance measurement of the second pair of spots.

23. The system of claim 22, wherein the operations further comprise: when the first image is determined to be invalid and the second image is determined to be valid, controlling, based at least on the current separation distance measurement of the second pair of spots, the Z-stage to focus at the first sample location.

24. The system of claim 22, wherein:
the system further comprises a tilt assembly including one or more actuators to tilt a sample holder of the sample during imaging of the sample; and
the operations further comprise:
   when both the first image and the second image are determined to be valid, determining a tilt measurement based on a difference between the current separation distance measurement of the first pair of spots and the current separation distance measurement of the second pair of spots; and
   controlling, based at least on the tilt measurement, the tilt assembly to tilt the sample holder to focus at the first sample location.

* * * * *